US012743367B2

(12) United States Patent
Young et al.

(10) Patent No.: US 12,743,367 B2
(45) Date of Patent: Sep. 22, 2026

(54) SUPPORT TOOLS FOR AUTONOMOUS VEHICLE TESTING

(71) Applicant: Five AI Limited, Cambridge (GB)

(72) Inventors: Tim Young, Cambridge (GB); Ben Graves, Cambridge (GB); Maurizio Morriello, Cambridge (GB); Jamie Cruickshank, Cambridge (GB)

(73) Assignee: Five AI Limited, Cambridge (GB)

( * ) Notice: Subject to any disclaimer, the term of this patent is extended or adjusted under 35 U.S.C. 154(b) by 171 days.

(21) Appl. No.: 18/568,214

(22) PCT Filed: Jun. 8, 2022

(86) PCT No.: PCT/EP2022/065487
§ 371 (c)(1),
(2) Date: Dec. 7, 2023

(87) PCT Pub. No.: WO2022/258660
PCT Pub. Date: Dec. 15, 2022

(65) Prior Publication Data

US 2025/0124748 A1 Apr. 17, 2025

(30) Foreign Application Priority Data

Jun. 8, 2021 (GB) ..................................... 2108182
Jun. 22, 2021 (GB) ..................................... 2108952
(Continued)

(51) Int. Cl.
*G06F 11/3668* (2025.01)
*G06F 11/32* (2006.01)
*G07C 5/08* (2006.01)

(52) U.S. Cl.
CPC ........ *G06F 11/3692* (2013.01); *G06F 11/323* (2013.01); *G06F 11/3688* (2013.01); *G07C 5/0808* (2013.01); *G07C 5/0825* (2013.01)

(58) Field of Classification Search
CPC ............... G06F 11/3692; G06F 11/323; G06F 11/3688; G07C 5/0808; G07C 5/0825
See application file for complete search history.

(56) References Cited

U.S. PATENT DOCUMENTS 10,394,704 B2 8/2019 Wiechowski et al.
2017/0277195 A1* 9/2017 Frazzoli ................ B60W 30/09
(Continued)

FOREIGN PATENT DOCUMENTS

CN 108844754 A 11/2018
EP 3789920 A1 3/2021
(Continued)

OTHER PUBLICATIONS

Japanese Office Action dated Dec. 6, 2024, from related Japanese Patent Application 2023-575617 (6 pages).
(Continued)

*Primary Examiner* — Angela Y Ortiz
*Assistant Examiner* — Jeffrey R Chalhoub
(74) *Attorney, Agent, or Firm* — Andrew J. Tibbetts; Samuel S. Stone; Greenberg Traurig, LLP

(57) ABSTRACT

A computer-implemented method for assessing autonomous vehicle performance comprising receiving, at an input, performance data of at least one autonomous driving run, the performance data comprising at least one time series of perception errors and at least one time series of driving performance results; and generating, at a rendering component, rendering data for rendering a graphical user interface, the graphical user interface for visualizing the performance data and comprising: a perception error timeline, and a driving assessment timeline, wherein the timelines are aligned in time, and divided into multiple time steps of the at least one driving run, wherein, for each time step: the perception timeline comprises a visual indication of whether (Continued)

a perception error occurred at that time step, and the driving assessment timeline comprises a visual indication of driving performance at that time step.

20 Claims, 35 Drawing Sheets

(30) Foreign Application Priority Data

Jun. 22, 2021 (GB) ..................................... 2108958
Aug. 17, 2021 (GB) ..................................... 2111765

(56) References Cited

U.S. PATENT DOCUMENTS

2020/0050536 A1 2/2020 Nygaard et al.
2020/0250473 A1 8/2020 Elluswamy et al.
2020/0409829 A1 12/2020 Bedi et al.
2021/0089433 A1 3/2021 Mattar et al.
2021/0094540 A1* 4/2021 Bagschik ............... G06V 20/58
2021/0096571 A1* 4/2021 Modalavalasa ...... G07C 5/0816
2021/0139023 A1 5/2021 Crego et al.
2024/0338273 A1 10/2024 Philip et al.

FOREIGN PATENT DOCUMENTS

JP H11-125584 A 5/1999
JP 2017-174244 A 9/2017
JP 2018-079732 A 5/2018
JP 2019-512824 A 5/2019
JP 2019-527813 A 10/2019
JP 2020-042014 A 3/2020
JP 2020-123259 A 8/2020
JP 2021-019275 A 2/2021
WO 2017/165286 A1 9/2017
WO 2018/232680 A1 12/2018
WO 2021/065559 A1 4/2021
WO 2021/245200 A1 12/2021
WO 2021/245201 A1 12/2021
WO 2022/171819 A1 8/2022

OTHER PUBLICATIONS

Japanese Office Action dated Jan. 31, 2025, from related Japanese Patent Application 2023-575619 (9 pages).
International Search Report and Written Opinion from the International Searching Authority from related PCT Application No. PCT/EP2022/065509, dated Jan. 11, 2023, (22 pages).
Mitra Pallavi et al: “Towards Modeling of Perception Errors in Autonomous Vehicles”, 2018 21st : International Conference on Intelligent Transportation Systems (ITSC), IEEE, Nov. 4, 2018 (Nov. 4, 2018), pp. 3024-3029.
International Search Report and Written Opinion from the International Searching Authority from related PCT Application No. PCT/EP2022/065484, dated Oct. 19, 2022, (16 pages).
Vector: “Virtual. Test Driving: Stimulation of ADAS Control Units equivalent to Real Driving Tests”, Apr. 29, 202 (Apr. 29, 2020).
Charles R. Qi , et al: Offboard 3D Object Detection from Point Cloud Sequences; Mar. 8, 2021 (18 pages).
Japanese Office Action date Nov. 22, 2024, from related Japanese Patent Application 2023-575621.
International Search Report, PCT/EP2022/065487 Date: Nov. 4, 2022 By: Authorized Officer: Bozas, Ioannis.
Msc Software., “Virtual Test Drive (VTD): Webinar-Leverage Simulation to Achieve Safety for Autonomous Vehicles,” Jun. 10, 2019.
U.S Notice of Allowance dated Sep. 10, 2025, from related U.S Appl. No. 18/568,188.
U.S Office Action dated Oct. 1, 2025, from related U.S Appl. No. 18/568,136.

* cited by examiner

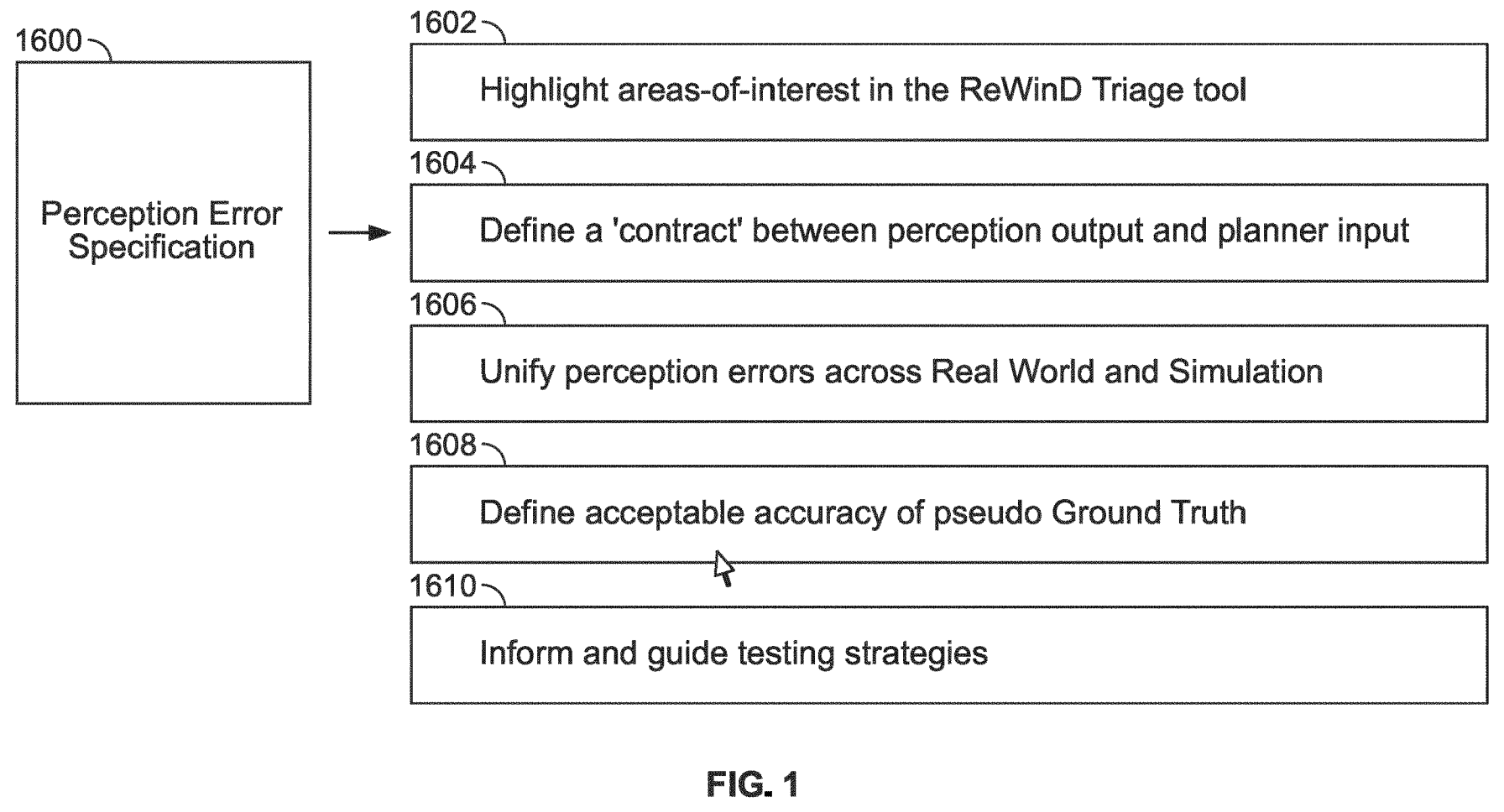

1600
Perception Error Specification

1602
Highlight areas-of-interest in the ReWinD Triage tool

1604
Define a 'contract' between perception output and planner input

1606
Unify perception errors across Real World and Simulation

1608
Define acceptable accuracy of pseudo Ground Truth

1610
Inform and guide testing strategies

FIG. 1

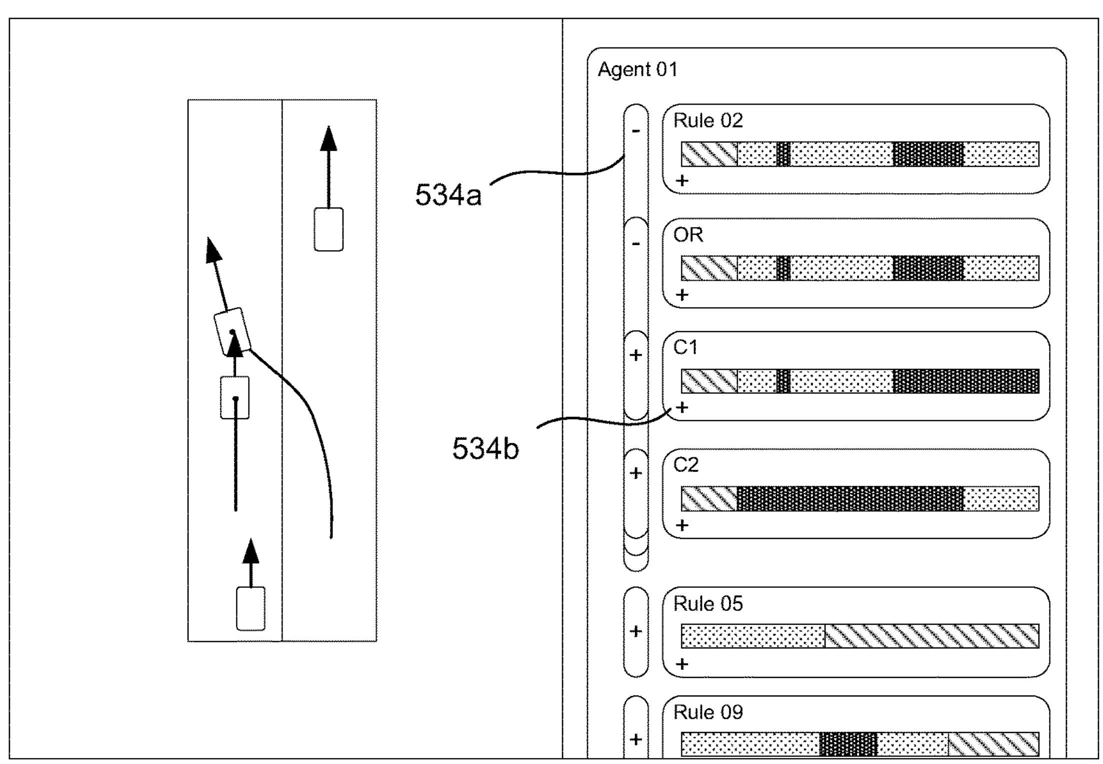
FIG.9C
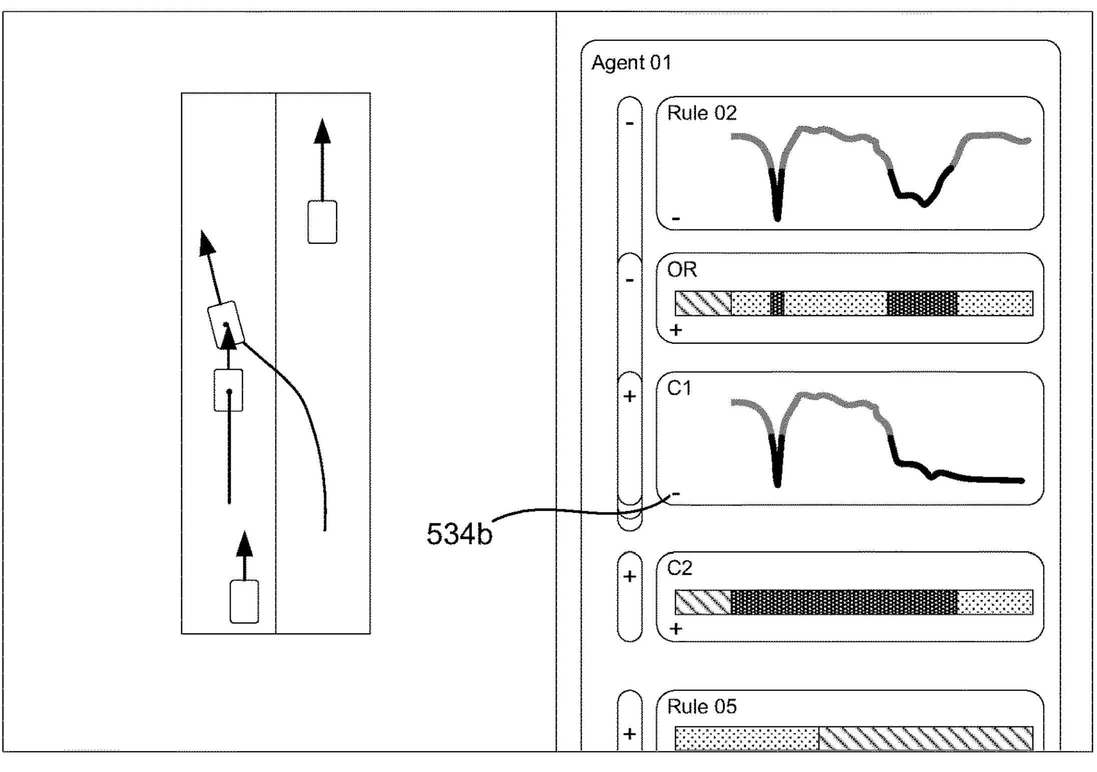
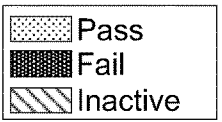
FIG.9D

1400

```
/* A configurable lookup table for safe translation errors at given speeds. */
let TRANSLATION_ERROR_TABLE = {
    2.0   , 0.1   ;  // 2m away, 10cm error
    2.78 , 0.2   ;
    5.56 , 0.5   ;  // etc...
    8.33 , 4.8   ;
    11.11, 5.6   ;
    13.89, 6.8   ;
    16.67, 10    ;
    20    , 100  //  Beyond 20m, we are not interested, so use a large error
}

perception rule TRANSLATION_ERROR : "Acceptable translation error"
    description "The acceptable translation error"
    ego.agents.forAllOf(agent | acceptable_translation_error(agent))
    where
        acceptable_translation_error(agent) = euclidean_distance(agent.GroundTruthCentrePoint,agent.Det
                                              > TRANSLATION_ERROR_TABLE[vehicle.GroundTruthDepth]


//The OrientationError measures the minimum angle in radians required to rotate the
//  detected box to match the orientation of the ground truth box.
perception rule ORIENTATION_ERROR : "Acceptable orientation error"
    description "The acceptable orientation error"
    ego.agents.forAllOf(agent | acceptable_orientation_error(agent))
    where
        acceptable_orientation_error(agent) = abs(agent.GroundTruthOrientation - agent.DetectionOrienta
                                              > ORIENTATION_ERROR_TABLE[agent.GroundTruthDepth]
```

SUPPORT TOOLS FOR AUTONOMOUS VEHICLE TESTING

CROSS-REFERENCE TO RELATED APPLICATIONS

This application is the U.S. National Stage application, pursuant to 35 U.S.C. § 371, of PCT International Patent Application No. PCT/EP2022/065487, filed Jun. 8, 2022, designating the United States and published in English, which claims priority under 35 U.S.C. §§ 119 and 365 to Great Britain Patent Application No. 2108182.3, filed Jun. 8, 2021, Great Britain Patent Application No. 2108952.9, filed Jun. 22, 2021, Great Britain Patent Application No. 2108958.6, filed Jun. 22, 2021, and Great Britain Patent Application No. 2111765.0, filed Aug. 17, 2021. The contents of each of the aforementioned applications are incorporated herein by reference in their entirety.

TECHNICAL FIELD

The present disclosure pertains to tools and methods for evaluating the performance of autonomous vehicle systems and trajectory planners in real or simulated scenarios, and computer programs and systems for implementing the same. Example applications include ADS (Autonomous Driving System) and ADAS (Advanced Driver Assist System) performance testing.

BACKGROUND

There have been major and rapid developments in the field of autonomous vehicles. An autonomous vehicle (AV) is a vehicle which is equipped with sensors and control systems which enable it to operate without a human controlling its behaviour. An autonomous vehicle is equipped with sensors which enable it to perceive its physical environment, such sensors including for example cameras, radar and lidar. Autonomous vehicles are equipped with suitably programmed computers which are capable of processing data received from the sensors and making safe and predictable decisions based on the context which has been perceived by the sensors. An autonomous vehicle may be fully autonomous (in that it is designed to operate with no human supervision or intervention, at least in certain circumstances) or semi-autonomous. Semi-autonomous systems require varying levels of human oversight and intervention, such systems including Advanced Driver Assist Systems and level three Autonomous Driving Systems. There are different facets to testing the behaviour of the sensors and control systems aboard a particular autonomous vehicle, or a type of autonomous vehicle.

A "level 5" vehicle is one that can operate entirely autonomously in any circumstances, because it is always guaranteed to meet some minimum level of safety. Such a vehicle would not require manual controls (steering wheel, pedals etc.) at all.

By contrast, level 3 and level 4 vehicles can operate fully autonomously but only within certain defined circumstances (e.g. within geofenced areas). A level 3 vehicle must be equipped to autonomously handle any situation that requires an immediate response (such as emergency braking); however, a change in circumstances may trigger a "transition demand", requiring a driver to take control of the vehicle within some limited timeframe. A level 4 vehicle has similar limitations; however, in the event the driver does not respond within the required timeframe, a level 4 vehicle must also be capable of autonomously implementing a "minimum risk maneuver" (MRM), i.e. some appropriate action(s) to bring the vehicle to safe conditions (e.g. slowing down and parking the vehicle). A level 2 vehicle requires the driver to be ready to intervene at any time, and it is the responsibility of the driver to intervene if the autonomous systems fail to respond properly at any time. With level 2 automation, it is the responsibility of the driver to determine when their intervention is required; for level 3 and level 4, this responsibility shifts to the vehicle's autonomous systems and it is the vehicle that must alert the driver when intervention is required.

Safety is an increasing challenge as the level of autonomy increases and more responsibility shifts from human to machine. In autonomous driving, the importance of guaranteed safety has been recognized. Guaranteed safety does not necessarily imply zero accidents, but rather means guaranteeing that some minimum level of safety is met in defined circumstances. It is generally assumed this minimum level of safety must significantly exceed that of human drivers for autonomous driving to be viable.

According to Shalev-Shwartz et al. "On a Formal Model of Safe and Scalable Self-driving Cars" (2017), arXiv: 1708.06374 (the RSS Paper), which is incorporated herein by reference in its entirety, human driving is estimated to cause of the order $10^{-6}$ severe accidents per hour. On the assumption that autonomous driving systems will need to reduce this by at least three order of magnitude, the RSS Paper concludes that a minimum safety level of the order of $10^{-9}$ severe accidents per hour needs to be guaranteed, noting that a pure data-driven approach would therefore require vast quantities of driving data to be collected every time a change is made to the software or hardware of the AV system.

The RSS paper provides a model-based approach to guaranteed safety. A rule-based Responsibility-Sensitive Safety (RSS) model is constructed by formalizing a small number of "common sense" driving rules:

"1. Do not hit someone from behind.
2. Do not cut-in recklessly.
3. Right-of-way is given, not taken.
4. Be careful of areas with limited visibility.
5. If you can avoid an accident without causing another one, you must do it."

The RSS model is presented as provably safe, in the sense that, if all agents were to adhere to the rules of the RSS model at all times, no accidents would occur. The aim is to reduce, by several orders of magnitude, the amount of driving data that needs to be collected in order to demonstrate the required safety level.

A safety model (such as RSS) can be used as a basis for evaluating the quality of trajectories that are planned or realized by an ego agent in a real or simulated scenario under the control of an autonomous system (stack). The stack is tested by exposing it to different scenarios, and evaluating the resulting ego trajectories for compliance with rules of the safety model (rules-based testing). A rules-based testing approach can also be applied to other facets of performance, such as comfort or progress towards a defined goal.

SUMMARY

Techniques are described which enable an expert to assess both perception errors and driving performance of an AV system. Evaluating perception outputs of an AV's perception system by comparison with a ground truth perception output enables an expert to assess the contribution of perception issues to the overall performance of a given AV system. A UI is described herein that presents perception errors and driving performance in a single visualisation to provide a correlation between perception and driving performance and assist an expert in determining sources of perception error which may contribute to overall driving performance.

A first aspect herein is directed to a computer system for testing a real-time perception system, the real-time perception system for deployment in a sensor-equipped vehicle, the computer system comprising:

at least one input configured to receive data of at least one real-world driving run performed by a sensor-equipped vehicle, the data comprising (i) a time series of sensor data captured by the sensor-equipped vehicle and (ii) at least one associated time series of run-time perception outputs extracted therefrom by the real-time perception system under testing;

a rendering component configured to generate rendering data for rendering a graphical user interface (GUI), the graphical user interface comprising a perception error timeline having, for each of multiple time steps of the at least one real-world driving run, a visual indication of any perception error that occurred at that time step;

a ground truthing pipeline configured to process at least one of (i) the time series of sensor data and (ii) the time series of run-time perception outputs, by applying at least one non-real-time and/or non-causal perception algorithm thereto, in order to extract at least one time series of ground truth perception outputs ('pseudo-ground truth') for comparison with the run-time perception outputs; and a perception oracle configured compare the time series of run-time perception outputs with the time series of ground-truth perception outputs, and thereby identify any perception errors that occurred in one or more time intervals for generating the perception error timeline.

In embodiments, the perception errors may be identified by computing numerical error values between the time series of run-time perception outputs and the time series of ground-truth perception outputs, and comparing the numerical error values with at least one perception error threshold.

For example, a numerical error value may only be identified as a perception error if the numerical error value exceeds an error threshold.

An error threshold may be fixed or variable. For example, different perception error thresholds may be applied to different actors/agents, or different types thereof (e.g. different thresholds for vehicles vs pedestrians etc.).

The error threshold(s) may be adjustable or otherwise configurable, e.g. via the GUI or via rule definition instructions provided to the perception oracle (e.g. coded in a Domain-Specific Language (DSL)). A rule editor may be provided for coding the rule definition instructions in DSL, in the form of a perception error specification. The latter approach provides what is referred to herein as a "perception error framework".

An error threshold may also be varied in dependence on one or more scene variables (run variables) of the driving run, e.g. variable(s) of an object to which the error threshold applies. For example, for a given object (e.g. agent or static object), a perception error threshold may be increased for that object with distance between that object an ego agent (on the basis that smaller perception errors are more material for nearby objects). The same effect can be achieved with the use of a fixed threshold, but with the numerical error values weighted according to the scene variable(s) (e.g. weighted by inverse distance). Herein, references to "variable thresholds" encompasses the latter implementation, unless otherwise indicated.

The (weighted) numerical perception errors may be normalized; that is, transformed to some predetermined scale, optionally with a fixed error threshold, e.g. to the range [−1,1] with the failure threshold set as zero. A normalized perception error may be referred to as a perception "robustness" score.

The weighting criteria/variable threshold(s) may be configurable, e.g. via the GUI or DSL.

The (normalized) error values may be rendered accessible via the GUI, in addition to the identified perception error(s).

More complex rules can be applied e.g. to map multiple perception error values, or combinations thereof, to identify perception errors based on one or more error thresholds.

A "perception error" could be a binary indicator of perception error (error/no-error), or a non-binary categorical indicator (e.g. a red-green-blue 'traffic light'-style classification).

A perception error could also be a perception error count, e.g. aggregating across multiple objects and/or sensors and/or sensor modalities.

For example, perception error rules may be defined hierarchically. For example, with multiple sensors and/or sensor modalities (e.g. lidar, radar, camera etc.) and/or multiple objects, aggregate perception errors may be extracted, aggregating over the multiple modalities/objects. In this case, multiple perception error timelines may be derived, e.g. with a "top-level" aggregate timeline that is populated by applying predetermined rules to "lower-level" timelines (e.g. for specific objects, sensors and/or sensor modalities). The top-level timeline may be expandable to view the lower-level timelines. Perception errors may also be aggregated over time windows in order to provide a 'zoomed out' view of the driving run.

The perception oracle may be configured to filter out at least one time interval of the run, wherein that time interval is omitted from the perception error timeline, wherein the filtering may be performed based on one or more filtering criteria applied to: the perception error (e.g. to filter out a time interval in which no perception error occurred) and/or one or more tags/labels associated with the real-world driving run (e.g. to include only intervals in which a certain type of scene element, such as a vulnerable road user, is present). For example, the tags may comprise ontology tag(s) pertaining to dynamic and/or static scene elements or conditions (actors, weather, lighting etc.). Such filtering may also be referred to as a "slicing" of the timeline.

The timeline may aggregate multiple driving runs. Slicing is a useful tool in this context, as a way to reduce the extent of 'uninteresting' information displayed on the timelines.

The tags may be accessible via the GUI.

A schematic representation of the driving run may be displayed on the GUI. The static representation may display a static snapshot of the driving run at a current time step, wherein the current time step is selectable via instructions to the GUI. As the current time step is varied, a visual indicator may be varied to mark the current time step on the perception error timeline.

(Raw) data of at least one real-world driving run may also be displayed, together with the schematic representation. For example, a schematic top-down view may be displayed, overlaid with at least one 3D point cloud of the real-world driving run (e.g. lidar, radar, or mono/stereo depth point cloud, or any combination/aggregation thereof). Alternatively or additionally, at least one captured image from one real-world driving run may be displayed for the current time step (changing the current time step changes causes the GUI to be updated with a corresponding image accordingly).

The schematic representation of the driving run may be rendered using the time series of run-time perception outputs. For example, the time series of run-time perception outputs may comprise a time series of ground truth bounding boxes (location, pose, size) for each of multiple detected objects, and an identified object type for each object, which are used to render a visual icon of that object on a known road layout (e.g. map-derived) of the driving run.

The time series of run-time perception outputs may also be displayed via the GUI for visual comparison with the ground truth perception outputs. For example, the time series of run-time perception outputs may be overlaid on the schematic representation derived from the latter. For example, the run-time perception outputs may comprise multiple time series of detected real-time bounding boxes, and a subset of run-time bounding boxes associated with the current time step may be overlaid on the snapshot of the current time step.

The perception ground truths may be in the form of a trace of each agent (ego and/or other agent(s)), where a trace is a time-sequence of spatial and motion states (such as bounding boxes and detected velocity vectors or other motion vectors).

The extracted traces may be used to visualize the run at the GUI.

An option may be provided to "replay" the scenario at the GUI dynamically, with the video indicator moving along the perception error timeline as the scenario progresses.

A second driving performance timeline may also be displayed on the GUI, which conveys results of a driving performance assessment applied to the same ground-truth perception outputs (e.g. traces). For example, a test oracle may be provided for this purpose.

The run-data may comprise multiple sensor modalities, for example two or more of lidar, radar, and image (e.g. depth data from stereo or mono imaging).

In some embodiments, one sensor modality (or combination of sensor modalities) may be used to provide ground-truth for another sensor modality (or combination of sensor modalities). For example, more accurate lidar may be used to derive pseudo-ground truth that is used as a baseline for detections or other perception outputs derived from radar or image (mono or stereo) data.

A relatively small amount of manually labelled ground truth may be used within the system, for example as a baseline to verify or measure the accuracy of the pseudo-ground truth or the run-time perception outputs.

Whilst the above considered perception errors derived from pseudo-ground truth, in other aspects of the invention, the present invention, the above GUI can be used to render perception errors derived in other ways (including from real-world data without the use of pseudo-ground truth, and perception errors of a simulated driving run generated in a simulator). With simulated runs, the above description applies equally with ground truth provided directly by the simulator (without the need for the ground truthing pipeline), and scene variable(s) of the simulated run.

A second aspect herein provides a computer system for assessing autonomous vehicle performance, the computer system comprising:

at least one input configured to receive performance data of at least one autonomous driving run, the performance data comprising at least one time series of perception errors and at least one time series of driving performance results; and a rendering component configured to generate rendering data for rendering a graphical user interface, the graphical user interface for visualizing the performance data and comprising:

(i) a perception error timeline, and (ii) a driving assessment timeline, wherein the timelines are aligned in time, and divided into multiple time steps of the at least one driving run, wherein, for each time step: the perception timeline comprises a visual indication of whether a perception error occurred at that time step, and the driving assessment timeline comprises a visual indication of driving performance at that time step.

The driving assessment timeline and the perception timeline may be mutually parallel.

The above tool visually links driving performance to perception error, assisting an expert in a determination as to the case of poor/unacceptable ADS/ADAS performance. For example, by focusing on a region of the driving performance timeline where a material driving rule failure has occurred, an expert can view the perception error timeline at the same time assistant, to see whether perception error might have contributed to the rule failure.

In embodiments, the driving performance may be assessed with respect to one or more predefined driving rule(s).

The driving performance timeline may aggregate driving performance across multiple individual driving rules, and may be expandable to view respective driving performance timelines for the individual driving rules.

The (or each) driving performance may be expandable, to view a computational graph representation of the rule (as described below).

The driving run may be a real-world run, with driving rules applied to real-world trace(s).

In some cases, a ground truthing pipeline may be used to extract (pseudo-) ground truth trace(s)/perception outputs, which is used to determine perception errors and to assess performance with respect to driving rules (as in the first aspect above).

Alternatively, perception errors may be identified without the use of pseudo-ground truth. For example, such error may be identified from "flickering" objects (which appear/disappear as a run-time object detector fails) or "jumping" objects (which can be seen to jump across a scene in a kinematically unfeasible manner—e.g. the run-time detector might "swap" two nearby objects at some point in the run).

The performance data may comprise at least one time series of numerical perception scores indicating perception areas of interest, and the graphical user interface may comprise at least a corresponding timeline of numerical perception scores, wherein for each time step the numerical perception score timeline comprises a visual indication of the numerical perception score associated with that time step.

The time series of numerical perception scores may be a time series of hardness scores indicating a measure of difficulty for the perception system at each time step.

The performance data may comprise at least one time series of user-defined scores, and the graphical user interface may comprise at least one corresponding custom timeline, wherein, for each time step, the custom timeline comprises a visual indication of the user-defined score evaluated at that time step.

Alternatively, the run may be a simulated run, and the perception errors may be simulated.

For example, one or more perception error (or perception performance) models may be used to sample perception errors or, more generally, convert ground-truth simulator state to more realistic perception errors that are then provided to higher-level component of the stack under testing during simulation.

As another example, synthetic sensor data may be generated in simulation, and processed by a perception system of the stack in the same way as real sensor data. In this case, simulated perception errors can be derived in the same way as real-world perception errors (although no ground-truth in pipeline is needed in this case, as perception errors can be identified by comparison with the ground truth inherent to the simulator.

Filter/slicing may also be applied to the timelines, e.g. to show only time periods around a failure on a particular rule(s)/rule combination. The perception error timeline can thus be filtered/slice based on rules applied to the driving performance timeline, and vice versa.

The graphical user interface may comprise a progress bar aligned with the timelines, the progress bar having one or more markers indicating regular time intervals, each interval comprising one or more timesteps of the driving run. A subset of markers may be labelled with a numerical time indicator.

The graphical user interface may comprise a scrubber bar which extends across the timelines, and which indicates a selected timestep of the driving run. The scrubber bar may move along the timelines in response to a user selecting a new timestep of the driving run by clicking on a point on one of the timelines, such that the scrubber bar extends across the timelines at the selected point.

The graphical user interface may comprise a zoom input usable to increase or decrease the number of timesteps of the driving run included in the timeline. The timelines may be configured such that, when the zoom input is used to increase or decrease the number of timesteps in the timeline, the visual indicator for each timestep contracts or expands, respectively, such that the timeline maintains a constant length.

The progress bar may be configured such that, when the zoom input is used to decrease the number of timesteps in the timeline below a threshold value, the markers are adjusted to indicate shorter time intervals. When the zoom input is used to increase the number of timesteps in the timeline above a threshold value, the markers may be adjusted to indicate longer time intervals.

When the zoom input is used to adjust the number of timesteps of the driving run, the timeline may be adjusted to include only timesteps within a defined range of a reference point on the timeline. The reference point may be the start of the driving run. Alternatively, the reference point may be a currently selected timestep of the driving run. The currently selected point may be indicated by the scrubber bar.

The zoom input may comprise a zoom slider bar which may be used to adjust the number of timesteps in the timeline by moving an indicator along the slider bar. The indicator may be moved by clicking and dragging the slider along the bar, or by clicking the point on the slider to which the indicator should be moved. The zoom input may comprise a pinch gesture on a touch screen which adjusts the number of timesteps in the timeline based on a change in distance between two fingers touching the screen. Alternatively, the zoom input may comprise a mouse wheel which adjusts the number of timesteps in the timeline in response to a user rolling the wheel forwards or backwards.

The timelines may be scrollable, such that the multiple timesteps displayed in the timelines are adjusted to shift forward or backward in time in response to a user scrolling action.

A portion of a driving run between may be selected by clicking a first point on the progress bar indicating a start time of the portion and dragging to a second point along the progress bar defining an end time of the portion. Driving data corresponding to the selected portion may be extracted and stored to a database.

The first aspect above refers to testing of a real-time perception system by comparing the run-time perception outputs with a set of derived (pseudo-) ground truth perception outputs. In another aspect, any of the above features of embodiments can be applied more generally to evaluate any sequence of perception outputs by comparison against a corresponding sequence of ground truth perception outputs. In this context, ground truth may be any baseline taken to be accurate for the purposes of evaluating perception outputs by comparison with that baseline.

A third aspect herein is directed to a computer system comprising:

- at least one input configured to receive data pertaining to at least one driving run, the data comprising (i) a first time series of perception outputs and (ii) a second time series of ground truth perception outputs the time series of ground truth perception outputs and the time series of run-time perception outputs being associated with at least one time interval;
- a rendering component configured to generate rendering data for rendering a graphical user interface (GUI), the graphical user interface comprising a perception error timeline having, for each of multiple time steps of the at least one driving run, a visual indication of any perception error that occurred at that time step;
- a perception oracle configured to compare the time series of perception outputs with the time series of ground-truth perception outputs, and thereby identify any perception errors that occurred in one or more time intervals for generating the perception error timeline.

Note that the term 'perception output' is used broadly in this context, and includes perception data obtained from human annotation as well as outputs of a vehicle's perception stack.

The computer system may additionally comprise a ground truthing pipeline. The ground truthing pipeline may be configured to generate the first time series of perception outputs by processing data of at least one driving run by applying at least one non-real-time and/or non-causal perception algorithm thereto, the data comprising a time series of sensor data from the driving run and an associated time series of run-time perception outputs extracted therefrom by a perception system. The ground-truth perception outputs may be generated by manual annotation of at least one driving run. The perception outputs generated by the perception system in this embodiment are 'pseudo' ground truth perception outputs, which may be compared with manually annotated ground truth perception outputs received for the same driving run to identify perception errors in the pseudo ground truth perception outputs. This comparison may be used as a way to evaluate the suitability of the pseudo ground truth perception outputs obtained from the ground truthing pipeline to be used as ground truth for comparison with another set of perception outputs to be evaluated. This comparison may be based on only a subset of driving data which is manually annotated, to enable the pseudo GT to be used to assess perception outputs for a larger set of data for which human annotation is not available.

Alternatively, the perception system may comprise a real-time perception system for deployment in a sensor-equipped vehicle, and the perception outputs may comprise a time series of run-time perception outputs extracted from a time series of sensor data for the given driving run by the real-time perception system. The ground truth perception outputs may be generated by processing, by a ground truthing pipeline, at least one of the time series of sensor data or the time series of run-time perception outputs by applying at least one non-real-time and/or non-causal perception algorithm thereto. The ground truth perception outputs may alternatively be generated by manual annotation of the driving run.

The driving run may be a real-world driving run.

Alternatively, the driving run may be a simulated driving run, with sensor data generated by a simulator, and the run-time perception outputs may be obtained by applying the real-time perception system to the simulated sensor data. The ground truth perception outputs may be obtained directly from the simulator for comparison with the run-time perception outputs.

A further aspect herein provides a computer-implemented method for testing a real-time perception system, the real-time perception system for deployment in a sensor-equipped vehicle, the method comprising:

- receiving, at an input, data of at least one real-world driving run performed by a sensor-equipped vehicle, the data comprising (i) a time series of sensor data captured by the sensor-equipped vehicle and (ii) at least one associated time series of run-time perception outputs extracted therefrom by the real-time perception system under testing;
- generating, by a rendering component, rendering data for rendering a graphical user interface (GUI) comprising a perception error timeline, the perception error timeline having, for each of multiple time steps of the at least one real-world driving run, a visual indication of any perception error that occurred at that time step;
- processing, at a ground truthing pipeline, at least one of (i) the time series of sensor data and (ii) the time series of run-time perception outputs, by applying at least one non-real-time and/or non-causal perception algorithm thereto, in order to extract at least one time series of ground truth perception outputs for comparison with the run-time perception outputs; and
- comparing, at a perception oracle, the time series of run-time perception outputs with the time series of ground-truth perception outputs, and thereby identifying any perception errors that occurred in one or more time intervals for generating the perception error timeline.

Further aspects provide an executable program instructions for programming a computer system to implement any method described herein.

BRIEF DESCRIPTION OF FIGURES

For a better understanding of the present disclosure, and to show how embodiments of the same may be carried into effect, reference is made by way of example only to the following figures in which:

FIG. 1 shows a set of use cases for a perception error specification;

FIGS. 9B, 9C and 9D show different views available within a graphical user interface;

FIG. 14 shows an example rule definition within a perception error framework;

DETAILED DESCRIPTION

Figure 11:
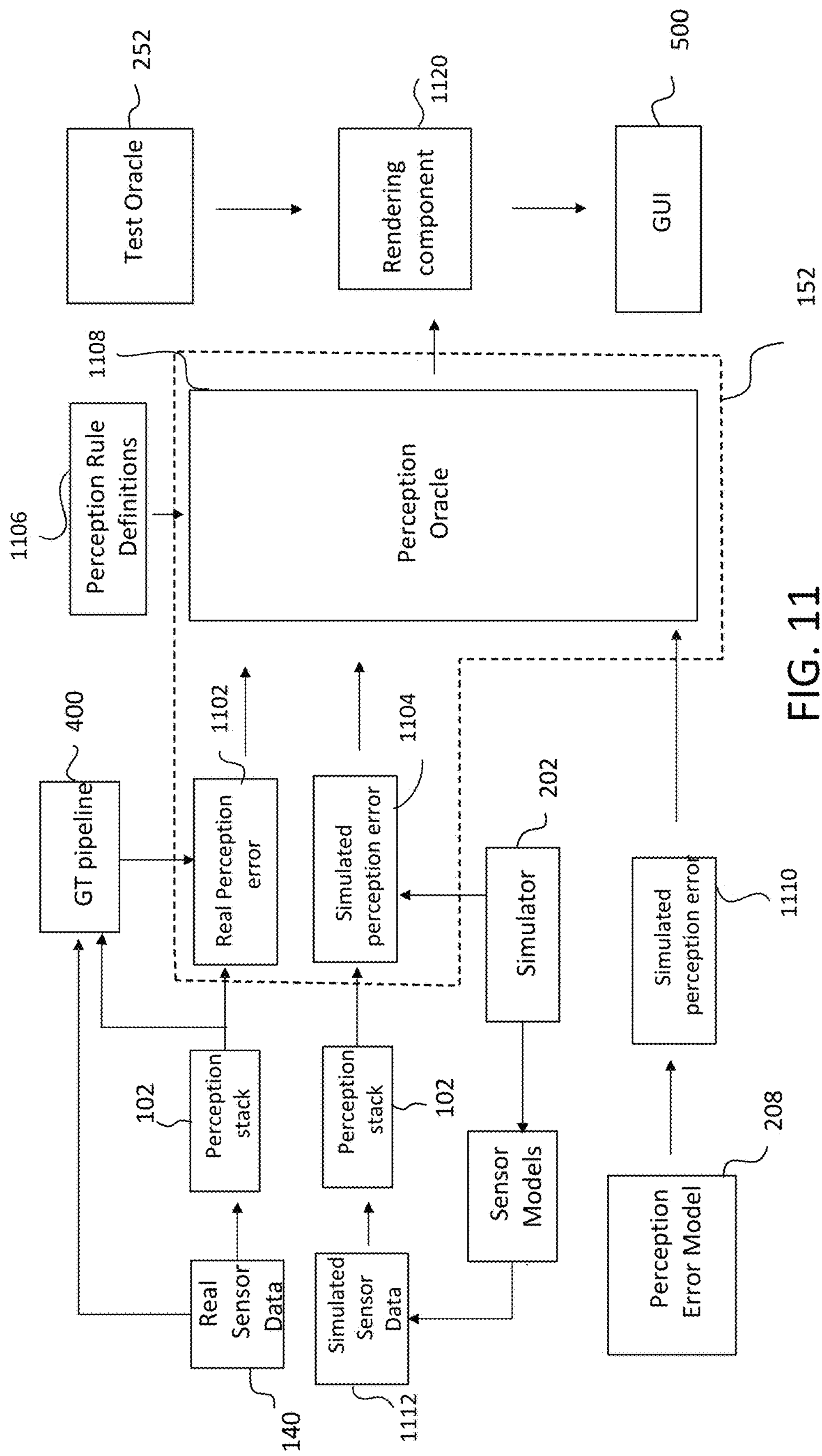
FIG. 11 shows an example architecture for evaluating perception errors.

FIG. 11 shows an example architecture, in which a "perception oracle" 1108 receives perception error data from multiple sources (real and/or simulated), and uses those data to populate a "perception triage" graphical user interface (GUI) 500.

A test oracle 252 assesses driving performance, and certain implementations of the GUI 500 allow the driving performance assessment together with perception information on respective timelines.

Certain perception errors may be derived from ground truth traces of a real or simulated run, and those same ground truth traces are used by the test oracle to assess driving performance.

The test oracle 252 and perception oracle 1108 mirror each other, in so far as each applies configurable rule-based logic to populate the timelines on the GUI 500. The former applies hierarchical rule trees to (pseudo-) ground truth traces in order to assess driving performance over a run (or runs), whiles the latter applies similar logic to identify salient perception errors. A rendering component 1120 generates rendering data for rendering the GUI on a display(s).

Our co-pending International Patent Application Nos. PCT/EP2022/053406 and PCT/EP2022/053413, incorporated herein by reference, describe a Domain Specific Language (DSL) for coding rules in the test oracle. An extension of the DSL, to encode rules for identifying salient perception errors in the perception oracle, is described below.

The described embodiments provide a testing pipeline to facilitate rules-based testing of mobile robot stacks in real or simulated scenarios, which incorporates additional functionality for identifying and communicating the existence of perception errors in a flexible manner.

A "full" stack typically involves everything from processing and interpretation of low-level sensor data (perception), feeding into primary higher-level functions such as prediction and planning, as well as control logic to generate suitable control signals to implement planning-level decisions (e.g. to control braking, steering, acceleration etc.). For autonomous vehicles, level 3 stacks include some logic to implement transition demands and level 4 stacks additionally include some logic for implementing minimum risk maneuvers. The stack may also implement secondary control functions e.g. of signalling, headlights, windscreen wipers etc.

The term "stack" can also refer to individual sub-systems (sub-stacks) of the full stack, such as perception, prediction, planning or control stacks, which may be tested individually or in any desired combination. A stack can refer purely to software, i.e. one or more computer programs that can be executed on one or more general-purpose computer processors.

The testing framework described below provides a pipeline for generating scenario ground truth from real-world data. This ground truth may be used as a basis for perception testing, by comparing the generated ground truth with the perception outputs of the perception stack being tested, as well as assessing driving behaviour against driving rules.

Agent (actor) behaviour in real or simulated scenarios is evaluated by a test oracle based on defined performance evaluation rules. Such rules may evaluate different facets of safety. For example, a safety rule set may be defined to assess the performance of the stack against a particular safety standard, regulation or safety model (such as RSS), or bespoke rule sets may be defined for testing any aspect of performance. The testing pipeline is not limited in its application to safety, and can be used to test any aspects of performance, such as comfort or progress towards some defined goal. A rule editor allows performance evaluation rules to be defined or modified and passed to the test oracle.

Similarly, vehicle perception can be evaluated by a 'perception oracle' based on defined perception rules. These may be defined within a perception error specification which provides a standard format for defining errors in perception.

FIG. 1 shows a set of possible use cases for a perception error framework. Defining rules in a perception error framework allows areas of interest in a real-world driving scenario to be highlighted to a user (1602), for example by flagging these areas in a replay of the scenario presented in a user interface. This enables the user to review an apparent error in the perception stack, and identify possible reasons for the error, for example occlusion in the original sensor data. The evaluation of perception errors in this way also allows for a 'contract' to be defined between perception and planning components of an AV stack (1604), wherein requirements for perception performance can be specified, and where the stack meeting these requirements for perception performance commits to being able to plan safely. A unified framework may be used to evaluate real perception errors from real-world driving scenarios as well as simulated errors (1606), either directly simulated using a perception error model, or computed by applying a perceptions stack to simulated sensor data, for example photorealistic simulation of camera images.

The ground truth determined by the pipeline can itself be evaluated within the same perception error specification (1608) by comparing it according to the defined rules against a 'true' ground truth determined by manually reviewing and annotating the scenario. Finally, the results of applying a perception error testing framework can be used to guide testing strategies to test both perception and prediction subsystems of the stack (1610).

Whether real or simulated, a scenario requires an ego agent to navigate a real or modelled physical context. The ego agent is a real or simulated mobile robot that moves under the control of the stack under testing. The physical context includes static and/or dynamic element(s) that the stack under testing is required to respond to effectively. For example, the mobile robot may be a fully or semi-autonomous vehicle under the control of the stack (the ego vehicle). The physical context may comprise a static road layout and a given set of environmental conditions (e.g. weather, time of day, lighting conditions, humidity, pollution/particulate level etc.) that could be maintained or varied as the scenario progresses. An interactive scenario additionally includes one or more other agents ("external" agent(s), e.g. other vehicles, pedestrians, cyclists, animals etc.).

The following examples consider applications to autonomous vehicle testing. However, the principles apply equally to other forms of mobile robot.

Scenarios may be represented or defined at different levels of abstraction. More abstracted scenarios accommodate a greater degree of variation. For example, a "cut-in scenario" or a "lane change scenario" are examples of highly abstracted scenarios, characterized by a maneuver or behaviour of interest, that accommodate many variations (e.g. different agent starting locations and speeds, road layout, environmental conditions etc.). A "scenario run" refers to a concrete occurrence of an agent(s) navigating a physical context, optionally in the presence of one or more other agents. For example, multiple runs of a cut-in or lane change scenario could be performed (in the real-world and/or in a simulator) with different agent parameters (e.g. starting location, speed etc.), different road layouts, different environmental conditions, and/or different stack configurations etc. The terms "run" and "instance" are used interchangeably in this context.

In the following examples, the performance of the stack is assessed, at least in part, by evaluating the behaviour of the ego agent in the test oracle against a given set of performance evaluation rules, over the course of one or more runs. The rules are applied to "ground truth" of the (or each) scenario run which, in general, simply means an appropriate representation of the scenario run (including the behaviour of the ego agent) that is taken as authoritative for the purpose of testing. Ground truth is inherent to simulation; a simulator computes a sequence of scenario states, which is, by definition, a perfect, authoritative representation of the simulated scenario run. In a real-world scenario run, a "perfect" representation of the scenario run does not exist in the same sense; nevertheless, suitably informative ground truth can be obtained in numerous ways, e.g. based on manual annotation of on-board sensor data, automated/semi-automated annotation of such data (e.g. using offline/non-real time processing), and/or using external information sources (such as external sensors, maps etc.) etc.

The scenario ground truth typically includes a "trace" of the ego agent and any other (salient) agent(s) as applicable. A trace is a history of an agent's location and motion over the course of a scenario. There are many ways a trace can be represented. Trace data will typically include spatial and motion data of an agent within the environment. The term is used in relation to both real scenarios (with real-world traces) and simulated scenarios (with simulated traces). The trace typically records an actual trajectory realized by the agent in the scenario. With regards to terminology, a "trace" and a "trajectory" may contain the same or similar types of information (such as a series of spatial and motion states over time). The term trajectory is generally favoured in the context of planning (and can refer to future/predicted trajectories), whereas the term trace is generally favoured in relation to past behaviour in the context of testing/evaluation.

In a simulation context, a "scenario description" is provided to a simulator as input. For example, a scenario description may be encoded using a scenario description language (SDL), or in any other form that can be consumed by a simulator. A scenario description is typically a more abstract representation of a scenario, that can give rise to multiple simulated runs. Depending on the implementation, a scenario description may have one or more configurable parameters that can be varied to increase the degree of possible variation. The degree of abstraction and parameterization is a design choice. For example, a scenario description may encode a fixed layout, with parameterized environmental conditions (such as weather, lighting etc.). Further abstraction is possible, however, e.g. with configurable road parameter(s) (such as road curvature, lane configuration etc.). The input to the simulator comprises the scenario description together with a chosen set of parameter value(s) (as applicable). The latter may be referred to as a parameterization of the scenario. The configurable parameter(s) define a parameter space (also referred to as the scenario space), and the parameterization corresponds to a point in the parameter space. In this context, a "scenario instance" may refer to an instantiation of a scenario in a simulator based on a scenario description and (if applicable) a chosen parameterization.

For conciseness, the term scenario may also be used to refer to a scenario run, as well as a scenario in the more abstracted sense. The meaning of the term scenario will be clear from the context in which it is used.

Trajectory planning is an important function in the present context, and the terms "trajectory planner", "trajectory planning system" and "trajectory planning stack" may be used interchangeably herein to refer to a component or components that can plan trajectories for a mobile robot into the future. Trajectory planning decisions ultimately determine the actual trajectory realized by the ego agent (although, in some testing contexts, this may be influenced by other factors, such as the implementation of those decisions in the control stack, and the real or modelled dynamic response of the ego agent to the resulting control signals).

A trajectory planner may be tested in isolation, or in combination with one or more other systems (e.g. perception, prediction and/or control). Within a full stack, planning generally refers to higher-level autonomous decision-making capability (such as trajectory planning), whilst control generally refers to the lower-level generation of control signals for carrying out those autonomous decisions. However, in the context of performance testing, the term control is also used in the broader sense. For the avoidance of doubt, when a trajectory planner is said to control an ego agent in simulation, that does not necessarily imply that a control system (in the narrower sense) is tested in combination with the trajectory planner.

Example AV Stack:

To provide relevant context to the described embodiments, further details of an example form of AV stack will now be described.

Figure 2A:
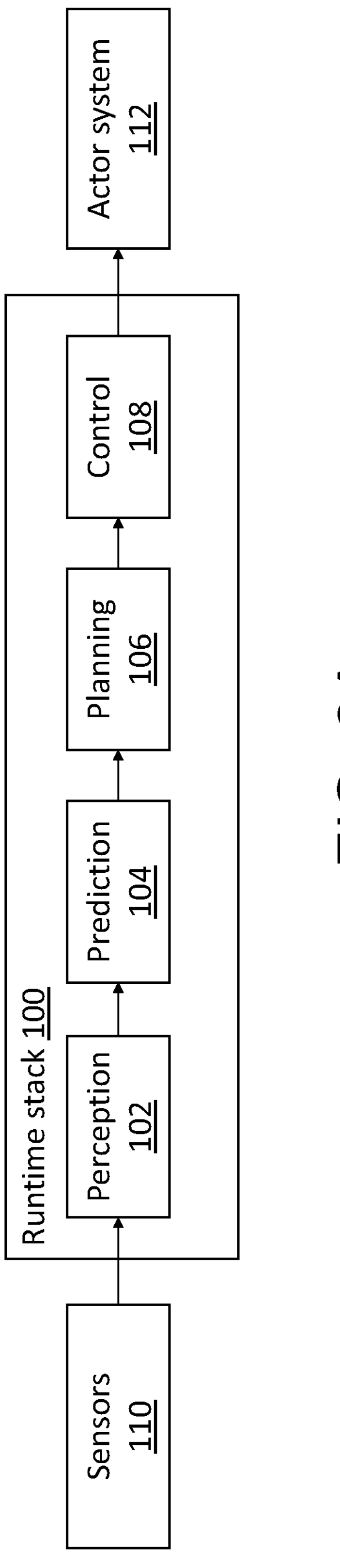
FIG. 2A shows a schematic function block diagram of an autonomous vehicle stack.

FIG. 2A shows a highly schematic block diagram of an AV runtime stack 100. The run time stack 100 is shown to comprise a perception (sub-) system 102, a prediction (sub-) system 104, a planning (sub-) system (planner) 106 and a control (sub-) system (controller) 108. As noted, the term (sub-) stack may also be used to describe the aforementioned components 102-108.

In a real-world context, the perception system 102 receives sensor outputs from an on-board sensor system 110 of the AV, and uses those sensor outputs to detect external agents and measure their physical state, such as their position, velocity, acceleration etc. The on-board sensor system 110 can take different forms but generally comprises a variety of sensors such as image capture devices (cameras/optical sensors), lidar and/or radar unit(s), satellite-positioning sensor(s) (GPS etc.), motion/inertial sensor(s) (accelerometers, gyroscopes etc.) etc. The onboard sensor system 110 thus provides rich sensor data from which it is possible to extract detailed information about the surrounding environment, and the state of the AV and any external actors (vehicles, pedestrians, cyclists etc.) within that environment. The sensor outputs typically comprise sensor data of multiple sensor modalities such as stereo images from one or more stereo optical sensors, lidar, radar etc. Sensor data of multiple sensor modalities may be combined using filters, fusion components etc.

The perception system 102 typically comprises multiple perception components which co-operate to interpret the sensor outputs and thereby provide perception outputs to the prediction system 104.

In a simulation context, depending on the nature of the testing—and depending, in particular, on where the stack 100 is "sliced" for the purpose of testing (see below)—it may or may not be necessary to model the on-board sensor system 100. With higher-level slicing, simulated sensor data is not required therefore complex sensor modelling is not required.

The perception outputs from the perception system 102 are used by the prediction system 104 to predict future behaviour of external actors (agents), such as other vehicles in the vicinity of the AV.

Predictions computed by the prediction system 104 are provided to the planner 106, which uses the predictions to make autonomous driving decisions to be executed by the AV in a given driving scenario. The inputs received by the planner 106 would typically indicate a drivable area and would also capture predicted movements of any external agents (obstacles, from the AV's perspective) within the drivable area. The driveable area can be determined using perception outputs from the perception system 102 in combination with map information, such as an HD (high definition) map.

A core function of the planner 106 is the planning of trajectories for the AV (ego trajectories), taking into account predicted agent motion. This may be referred to as trajectory planning. A trajectory is planned in order to carry out a desired goal within a scenario. The goal could for example be to enter a roundabout and leave it at a desired exit; to overtake a vehicle in front; or to stay in a current lane at a target speed (lane following). The goal may, for example, be determined by an autonomous route planner (not shown).

The controller 108 executes the decisions taken by the planner 106 by providing suitable control signals to an on-board actor system 112 of the AV. In particular, the planner 106 plans trajectories for the AV and the controller 108 generates control signals to implement the planned trajectories. Typically, the planner 106 will plan into the future, such that a planned trajectory may only be partially implemented at the control level before a new trajectory is planned by the planner 106. The actor system 112 includes "primary" vehicle systems, such as braking, acceleration and steering systems, as well as secondary systems (e.g. signalling, wipers, headlights etc.).

Note, there may be a distinction between a planned trajectory at a given time instant, and the actual trajectory followed by the ego agent. Planning systems typically operate over a sequence of planning steps, updating the planned trajectory at each planning step to account for any changes in the scenario since the previous planning step (or, more precisely, any changes that deviate from the predicted changes). The planning system 106 may reason into the future, such that the planned trajectory at each planning step extends beyond the next planning step. Any individual planned trajectory may, therefore, not be fully realized (if the planning system 106 is tested in isolation, in simulation, the ego agent may simply follow the planned trajectory exactly up to the next planning step; however, as noted, in other real and simulation contexts, the planned trajectory may not be followed exactly up to the next planning step, as the behaviour of the ego agent could be influenced by other factors, such as the operation of the control system 108 and the real or modelled dynamics of the ego vehicle). In many testing contexts, the actual trajectory of the ego agent is what ultimately matters; in particular, whether the actual trajectory is safe, as well as other factors such as comfort and progress. However, the rules-based testing approach herein can also be applied to planned trajectories (even if those planned trajectories are not fully or exactly realized by the ego agent). For example, even if the actual trajectory of an agent is deemed safe according to a given set of safety rules, it might be that an instantaneous planned trajectory was unsafe; the fact that the planner 106 was considering an unsafe course of action may be revealing, even if it did not lead to unsafe agent behaviour in the scenario. Instantaneous planned trajectories constitute one form of internal state that can be usefully evaluated, in addition to actual agent behaviour in the simulation. Other forms of internal stack state can be similarly evaluated.

The example of FIG. 2A considers a relatively "modular" architecture, with separable perception, prediction, planning and control systems 102-108. The sub-stack themselves may also be modular, e.g. with separable planning modules within the planning system 106. For example, the planning system 106 may comprise multiple trajectory planning modules that can be applied in different physical contexts (e.g. simple lane driving vs. complex junctions or roundabouts). This is relevant to simulation testing for the reasons noted above, as it allows components (such as the planning system 106 or individual planning modules thereof) to be tested individually or in different combinations. For the avoidance of doubt, with modular stack architectures, the term stack can refer not only to the full stack but to any individual sub-system or module thereof.

The extent to which the various stack functions are integrated or separable can vary significantly between different stack implementations—in some stacks, certain aspects may be so tightly coupled as to be indistinguishable. For example, in other stacks, planning and control may be integrated (e.g. such stacks could plan in terms of control signals directly), whereas other stacks (such as that depicted in FIG. 2A) may be architected in a way that draws a clear distinction between the two (e.g. with planning in terms of trajectories, and with separate control optimizations to determine how best to execute a planned trajectory at the control signal level). Similarly, in some stacks, prediction and planning may be more tightly coupled. At the extreme, in so-called "end-to-end" driving, perception, prediction, planning and control may be essentially inseparable. Unless otherwise indicated, the perception, prediction planning and control terminology used herein does not imply any particular coupling or modularity of those aspects.

It will be appreciated that the term "stack" encompasses software, but can also encompass hardware. In simulation, software of the stack may be tested on a "generic" off-board computer system before it is eventually uploaded to an on-board computer system of a physical vehicle. However, in "hardware-in-the-loop" testing, the testing may extend to underlying hardware of the vehicle itself. For example, the stack software may be run on the on-board computer system (or a replica thereof) that is coupled to the simulator for the purpose of testing. In this context, the stack under testing extends to the underlying computer hardware of the vehicle. As another example, certain functions of the stack 110 (e.g. perception functions) may be implemented in dedicated hardware. In a simulation context, hardware-in-the loop testing could involve feeding synthetic sensor data to dedicated hardware perception components.

Figure 2B:
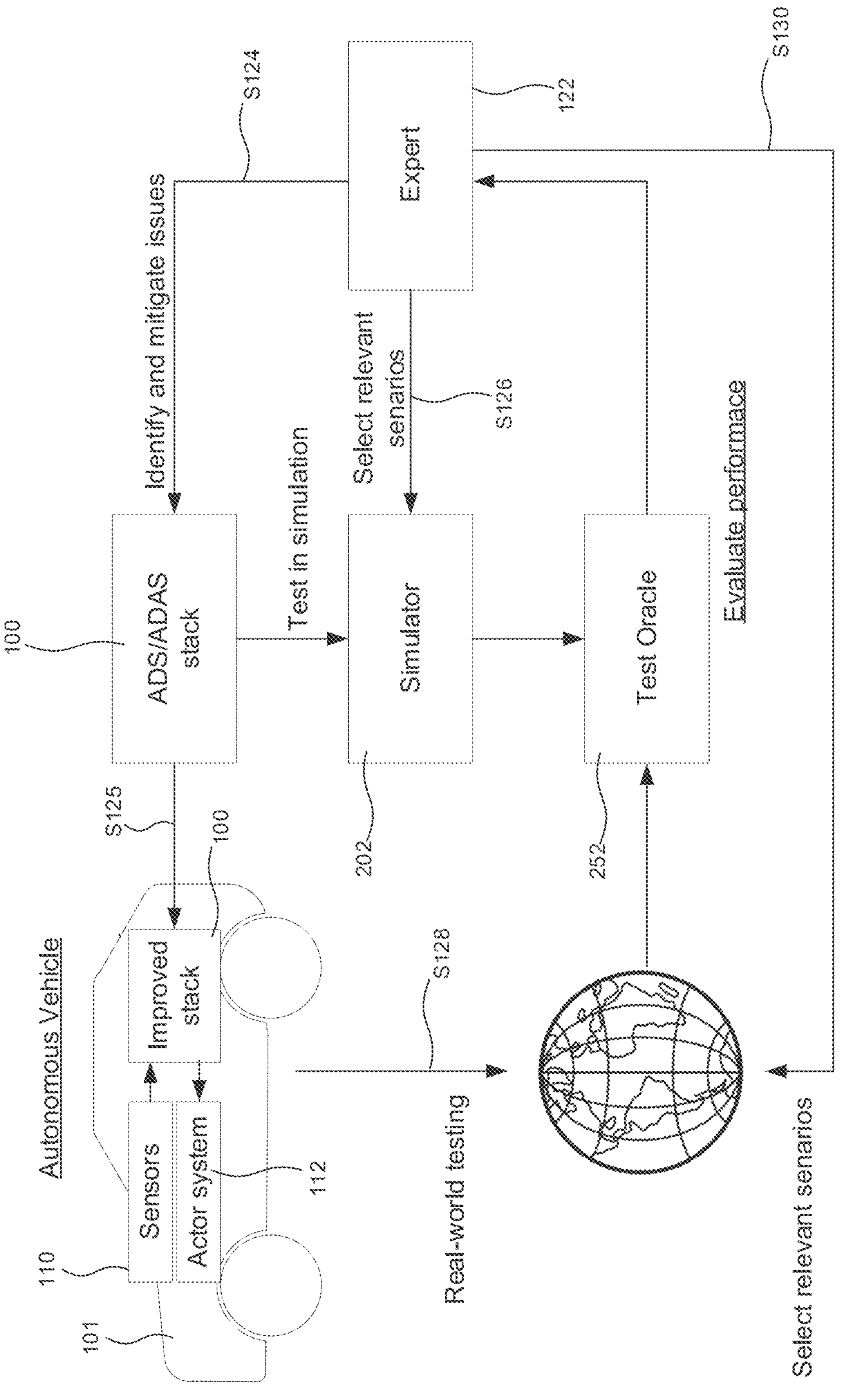
FIG. 2B shows a schematic overview of an autonomous vehicle testing paradigm.

Example Testing Paradigm:

FIG. 2B shows a highly schematic overview of a testing paradigm for autonomous vehicles. An ADS/ADAS stack 100, e.g. of the kind depicted in FIG. 2A, is subject to repeated testing and evaluation in simulation, by running multiple scenario instances in a simulator 202, and evaluating the performance of the stack 100 (and/or individual subs-stacks thereof) in a test oracle 252. The output of the test oracle 252 is informative to an expert 122 (team or individual), allowing them to identify issues in the stack 100 and modify the stack 100 to mitigate those issues (S124). The results also assist the expert 122 in selecting further scenarios for testing (S126), and the process continues, repeatedly modifying, testing, and evaluating the performance of the stack 100 in simulation. The improved stack 100 is eventually incorporated (S125) in a real-world AV 101, equipped with a sensor system 110 and an actor system 112. The improved stack 100 typically includes program instructions (software) executed in one or more computer processors of an on-board computer system of the vehicle 101 (not shown). The software of the improved stack is uploaded to the AV 101 at step S125. Step S125 may also involve modifications to the underlying vehicle hardware. On board the AV 101, the improved stack 100 receives sensor data from the sensor system 110 and outputs control signals to the actor system 112. Real-world testing (S128) can be used in combination with simulation-based testing. For example, having reached an acceptable level of performance through the process of simulation testing and stack refinement, appropriate real-world scenarios may be selected (S130), and the performance of the AV 101 in those real scenarios may be captured and similarly evaluated in the test oracle 252.

Scenarios can be obtained for the purpose of simulation in various ways, including manual encoding. The system is also capable of extracting scenarios for the purpose of simulation from real-world runs, allowing real-world situations and variations thereof to be re-created in the simulator 202.

Figure 2C:
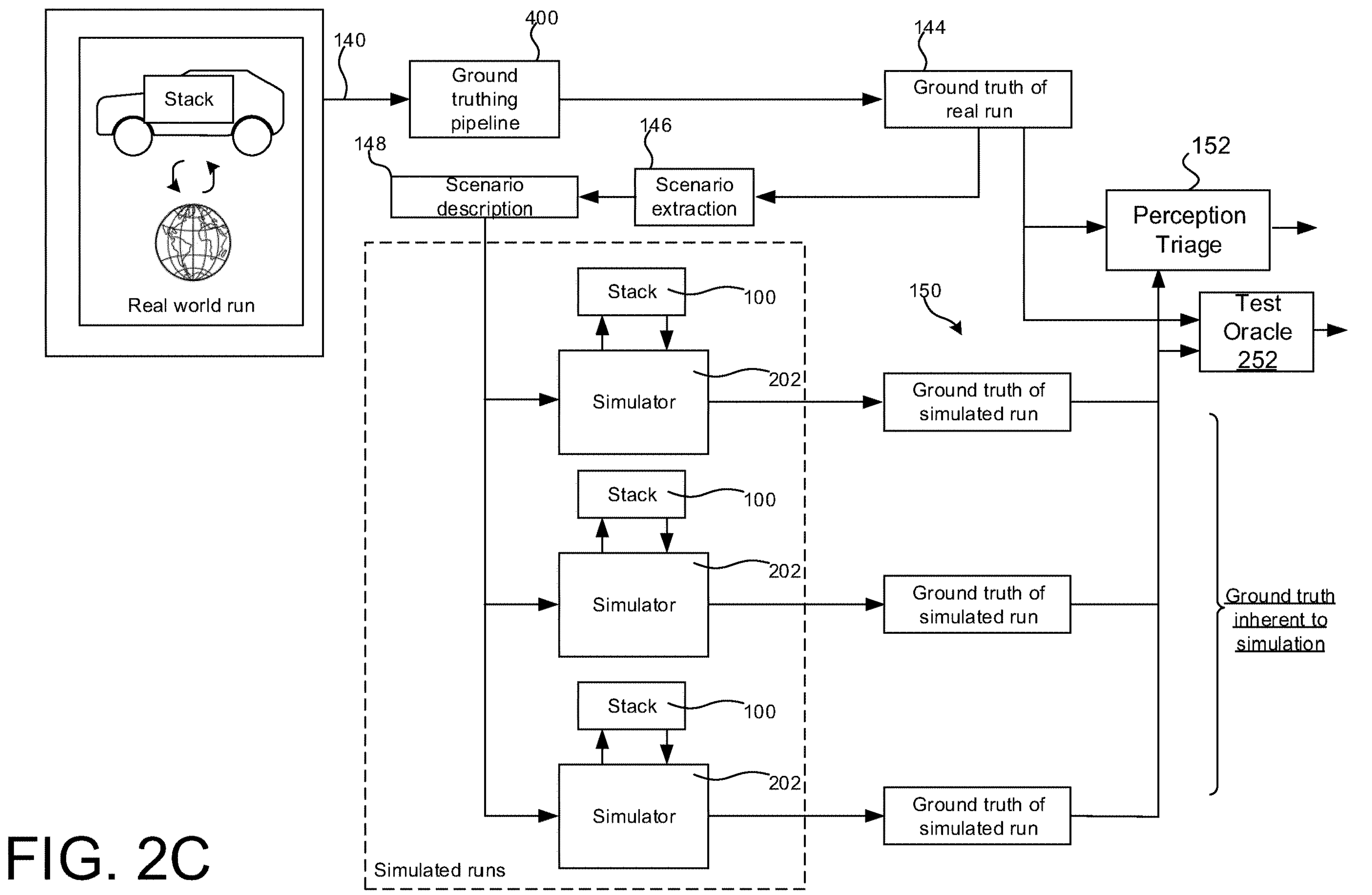
FIG. 2C shows a schematic block diagram of a scenario extraction pipeline.

FIG. 2C shows a highly schematic block diagram of a scenario extraction pipeline. Data 140 of a real-world run is passed to a 'ground-truthing' pipeline 400 for the purpose of generating scenario ground truth. The run data 140 could comprise, for example, sensor data and/or perception outputs captured/generated on board one or more vehicles (which could be autonomous, human-driven or a combination thereof), and/or data captured from other sources such external sensors (CCTV etc.). The run data is processed within the ground truthing pipeline 400, in order to generate appropriate ground truth 144 (trace(s) and contextual data) for the real-world run. As discussed, the ground-truthing process could be based on manual annotation of the 'raw' run data 140, or the process could be entirely automated (e.g. using offline perception method(s)), or a combination of manual and automated ground truthing could be used. For example, 3D bounding boxes may be placed around vehicles and/or other agents captured in the run data 140, in order to determine spatial and motion states of their traces. A scenario extraction component 146 receives the scenario ground truth 144, and processes the scenario ground truth 144 to extract a more abstracted scenario description 148 that can be used for the purpose of simulation. The scenario description 148 is consumed by the simulator 202, allowing multiple simulated runs to be performed. The simulated runs are variations of the original real-world run, with the degree of possible variation determined by the extent of abstraction. Ground truth 150 is provided for each simulated run.

The real scenario ground truth 144 and simulated ground truths 150 may be processed by a perception triage tool 152 to evaluate the perception stack, and/or a test oracle 252 to assess the stack based on the ground truth 144 or simulator ground truth 150.

In the present off-board content, there is no requirement for the traces to be extracted in real-time (or, more precisely, no need for them to be extracted in a manner that would support real-time planning); rather, the traces are extracted "offline". Examples of offline perception algorithms include non-real time and non-causal perception algorithms. Offline techniques contrast with "on-line" techniques that can feasibly be implemented within an AV stack 100 to facilitate real-time planning/decision making.

For example, it is possible to use non-real time processing, which cannot be performed on-line due to hardware or other practical constraints of an AV's onboard computer system. For example, one or more non-real time perception algorithms can be applied to the real-world run data 140 to extract the traces. A non-real time perception algorithm could be an algorithm that it would not be feasible to run in real time because of the computation or memory resources it requires.

It is also possible to use "non-causal" perception algorithms in this context. A non-causal algorithm may or may not be capable of running in real-time at the point of execution, but in any event could not be implemented in an online context, because it requires knowledge of the future. For example, a perception algorithm that detects an agent state (e.g. location, pose, speed etc.) at a particular time instant based on subsequent data could not support real-time planning within the stack 100 in an on-line context, because it requires knowledge of the future (unless it was constrained to operate with a short look ahead window). For example, filtering with a backwards pass is a non-causal algorithm that can sometimes be run in real-time, but requires knowledge of the future.

The term "perception" generally refers to techniques for perceiving structure in the real-world data 140, such as 2D or 3D bounding box detection, location detection, pose detection, motion detection etc. For example, a trace may be extracted as a time-series of bounding boxes or other spatial states in 3D space or 2D space (e.g. in a birds-eye-view frame of reference), with associated motion information (e.g. speed, acceleration, jerk etc.).

Ground Truth Pipeline

A problem when testing real-world performance of autonomous vehicle stacks is that an autonomous vehicle generates vast amounts of data. This data can be used afterwards to analyse or evaluate the performance of the AV in the real world. However, a potential challenge is finding the relevant data within this footage and determining what interesting events have occurred in a drive. One option is to manually parse the data and identify interesting events by human annotation. However, this can be costly.

Figure 3:
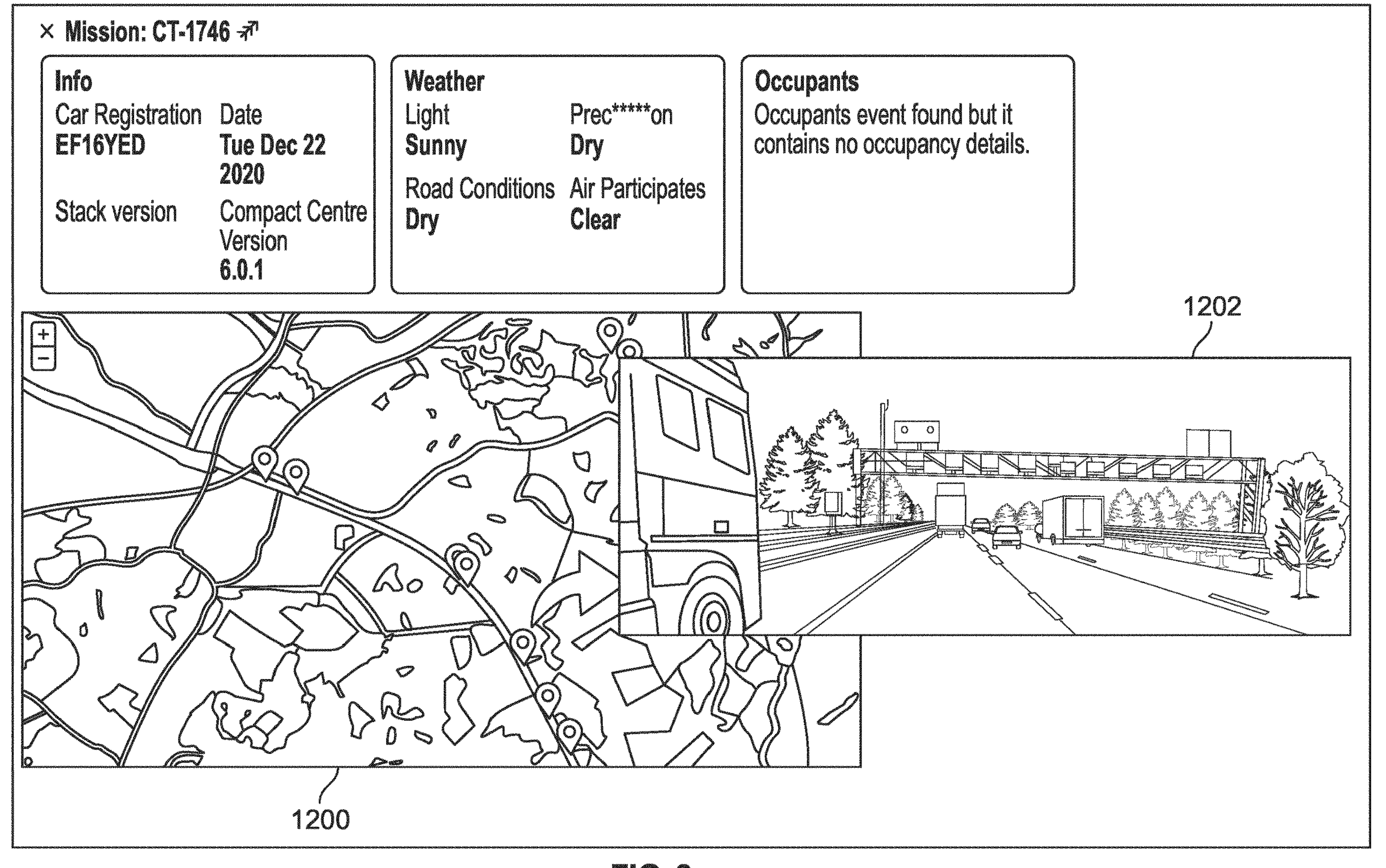
FIG. 3 shows a user interface for reviewing a manually-tagged driving run.

FIG. 3 shows an example of manually tagging real-world driving data while driving. The AV is equipped with sensors including, for example, a camera. Footage is collected by the camera along the drive, as shown by the example image 1202. In an example drive with a human driver on a motorway, if the driver notes anything of interest, the driver can provide a flag to the AV and tag that frame within the data collected by the sensors. The image shows a visualisation of the drive on a map 1200, with bubbles showing points along the drive where the driver tagged something. Each tagged point corresponds with a frame of the camera image in this example, and this is used to filter the data that is analysed after the drive, such that only frames that have been tagged are inspected afterwards.

As shown in the map 1200, there are large gaps in the driving path between tagged frames, where none of the data collected in these gaps is tagged, and therefore this data goes unused. By using manual annotation by the ego vehicle driver to filter the data, the subsequent analysis of the driving data is limited only to events that the human driver or test engineer found significant enough, or had enough time, to flag. However, there may be useful insights into the vehicle's performance at other times from the remaining data, and it would be useful to determine an automatic way to process and evaluate the driving performance more completely. Furthermore, identifying more issues than manual tagging for the same amount of data provides the opportunity to make more improvements to the AV system for the same amount of collected data.

A possible solution is to create a unified analysis pipeline which uses the same metrics to assess both scenario simulations and real world driving. A first step is to extract driving traces from the data actually collected. For example, the approximate position of the ego vehicle and the approximate positions of other agents can be estimated based on on-board detections. However, on-board detections are imperfect due to limited computing resources, and due to the fact that the on-board detections work in real-time, which means that the only data which informs a given detection is what the sensors have observed up to that point in time. This means that the detections can be noisy and inaccurate.

Figure 4A:
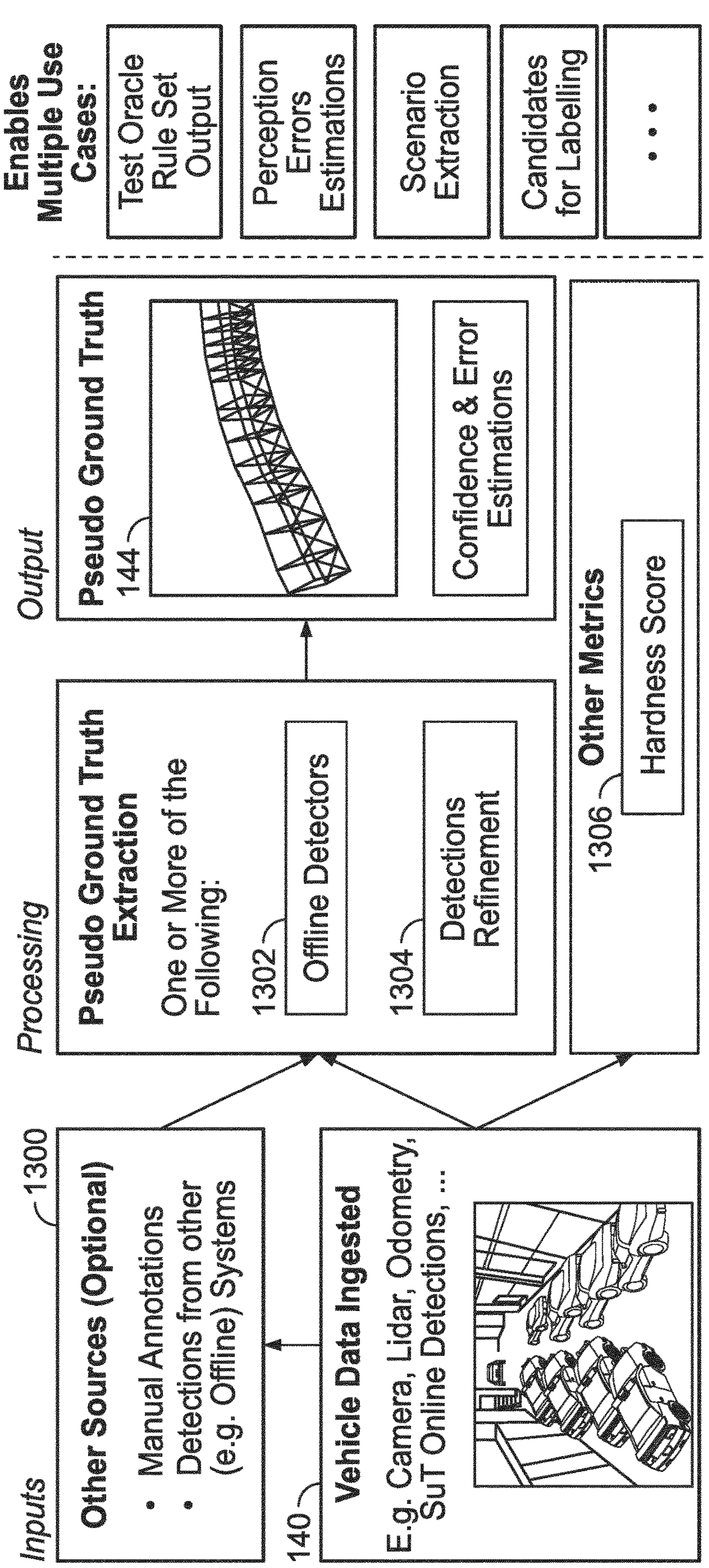
FIG. 4A shows an overview of a ground truthing pipeline.

FIG. 4A shows how data is processed and refined in a data ingestion pipeline to determine a pseudo ground truth 144 for a given set of real-world data. Note that no 'true' ground truth can be extracted from real-world data and the ground truth pipeline described herein provides an estimate of ground truth sufficient for evaluation. This pseudo ground truth 144 may also be referred to herein simply as 'ground truth'.

The data ingestion pipeline (or 'ingest' tool) takes in perception data 140 from a given stack, and optionally any other data sources 1300, such as manual annotation, and refines the data to extract a pseudo ground truth 144 for the real-world driving scenarios captured in the data. As shown, sensor data and detections from vehicles are ingested, optionally with additional inputs such as offline detections or manual annotations. These are processed to apply offline detectors 1302 to the raw sensor data, and/or to refine the detections 1304 received from the vehicle's on-board perception stack. The refined detections are then output as the pseudo ground truth 144 for the scenario. This may then be used as a basis for various use cases, including evaluating the ground truth against driving rules by a test oracle (described later), determining perception errors by comparing the vehicle detections against the pseudo ground truth and extracting scenarios for simulation. Other metrics may be computed for the input data, including a perception 'hardness' score 1306, which could apply, for example, to a detection or to a camera image as a whole, which indicates how difficult the given data is for the perception stack to handle correctly.

Figure 4B:
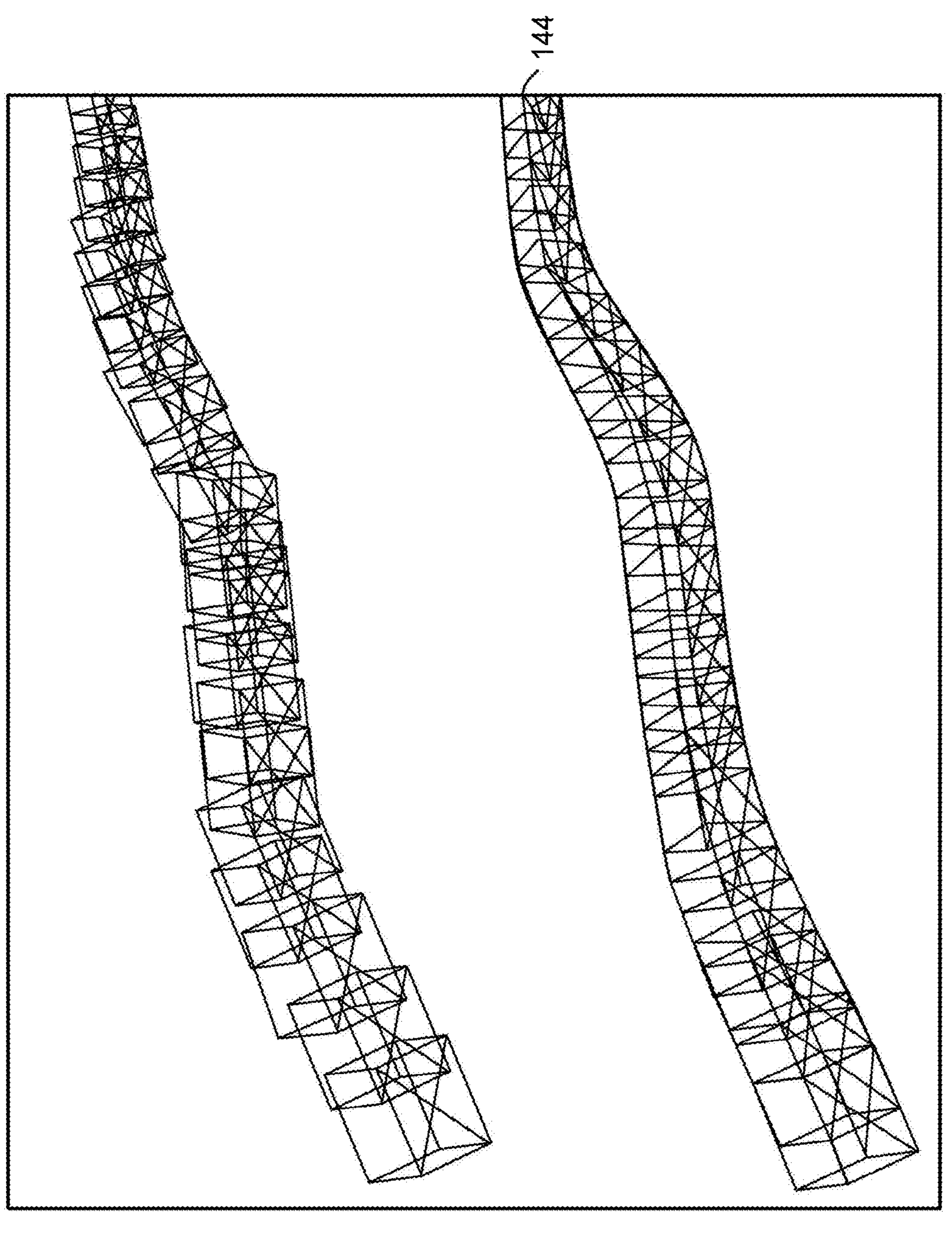
FIG. 4B shows a set of noisy bounding boxes and a set of refined bounding boxes.

FIG. 4B shows an example set of bounding boxes before and after refinement. In the example of FIG. 4B, the top image shows an 'unrefined' noisy set of 3D bounding boxes defining a location and orientation of the vehicle at each timestep, where these bounding boxes represent the ground truth with added noise. While the example shown applies to bounding boxes with noise added, the same effect is achieved for refining vehicle detections from a real-world driving stack. As shown in FIG. 4B, the bounding boxes are noisy and both the location and the orientation of the detected bounding boxes vary in time due to perception errors.

A refinement pipeline can use various methods to remove this noise. The bottom trajectory of FIG. 4B shows a pseudo ground truth trace 144 of the vehicle with noise removed. As shown, the orientation of the vehicle and its location are consistent from frame to frame, forming a smooth driving trajectory. The multiple possible methods used by the pipeline to perform this smoothing will not be described in detail. However, the pipeline benefits from greater computing power than online detectors to enable more accurate detectors to be used, as well as benefitting from the use of past and future detections to smooth out the trajectory, where the real-world detections collected from the car operate in real time and therefore are only based on past data. For example, where an object is partially occluded at time t, but at time t+n becomes fully visible by the car's sensors, for the offline refinement pipeline the detections at time t+n can be used to inform the earlier detections based on the partially occluded data, leading to more complete detections overall.

Figure 5A:
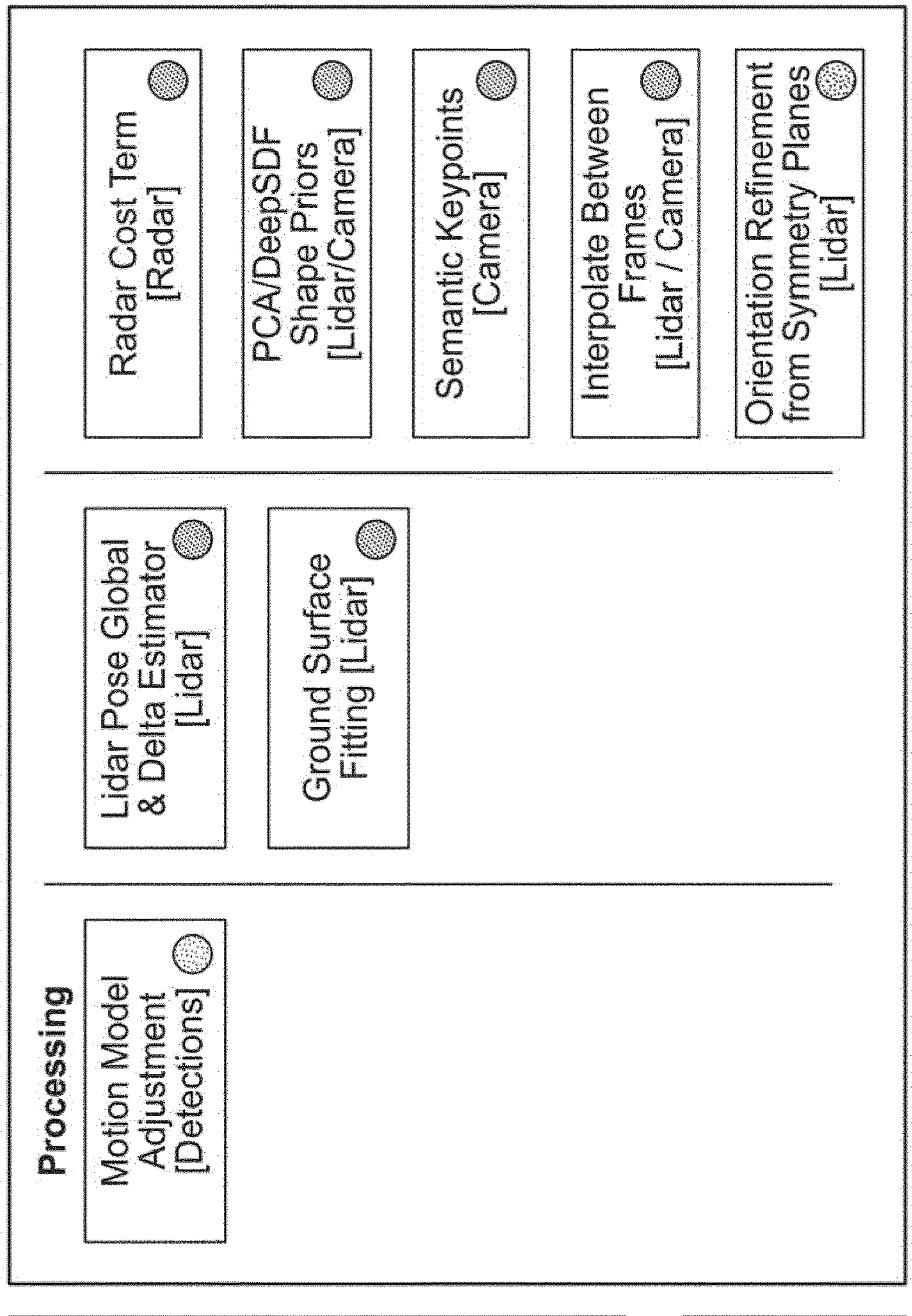
FIG. 5A shows a set of detection refinement techniques to be used in a ground-truthing pipeline.
Figure 5B:
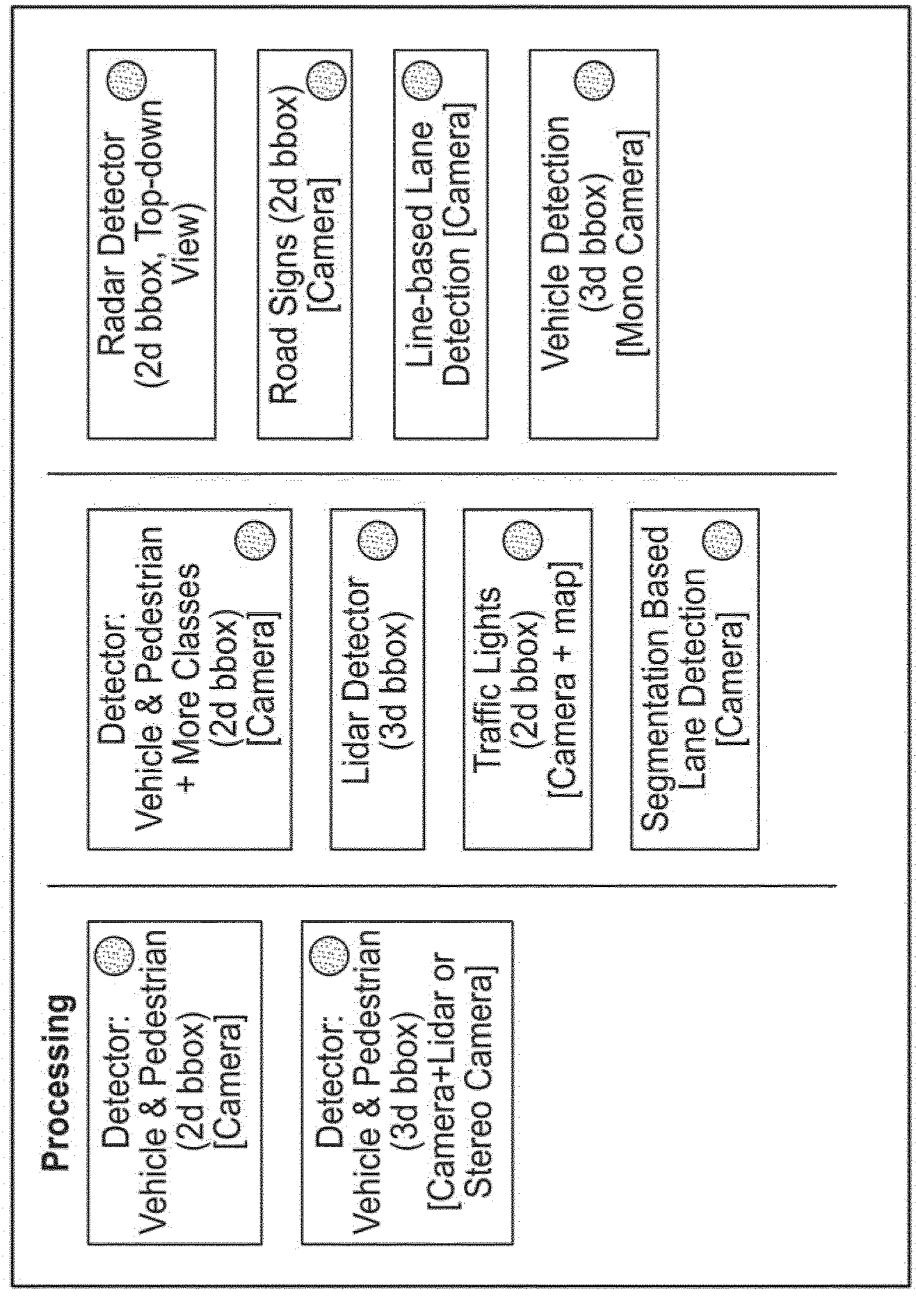
FIG. 5B shows a set of offline detection techniques to be used in a ground-truthing pipeline.

Various types of offline detectors or detection refinement methods can be used. FIG. 5A shows a table of possible detection refinement techniques and FIG. 5B shows a table of possible offline detectors that can be applied to sensor data to obtain improved detections.

Various techniques are used to refine the detection. One example is semantic keypoint detection applied to camera images. After refinement, the result is a stable detection with a cuboid of the right size that tracks the car smoothly, as shown for example in FIG. 4B.

Reference is made to International Patent Publication No. WO2021/013792, which is incorporated herein by reference. The aforementioned reference discloses a class of offline annotation methods that may be implemented within the ground truthing pipeline 400 to extract a pseudo-ground truth trace for each agent of interest. Traces are extracted by applying the automated annotation techniques, in order to annotate the data of the real-world run 140 with a sequence of refined 3D bounding boxes (the agent trace comprises the refined 3D boxes in this case).

The method broadly works as follows. The real-world run data 140 comprises a sequence of frames where each frame comprises a set of 3D structure points (e.g. point cloud). Each agent of interest (ego and/or other agent) is tracked as an object across the multiple frames (the agent is a 'common structure component' in the terminology of the above reference).

A "frame" in the present context refers to any captured 3D structure representation, i.e. comprising captured points which define structure in 3D space (3D structure points), and which provide an essentially static "snapshot" of 3D structure captured in that frame (i.e. a static 3D scene). The frame may be said to correspond to a single time instant, but this does not necessarily imply that the frame or the underlying sensor data from which it is derived need to have been captured instantaneously—for example, lidar measurements may be captured by a mobile object over a short interval (e.g. around 100 ms), in a lidar sweep, and "untwisted", to account for any motion of the mobile object, to form a single point cloud. In that event, the single point cloud may still be said to correspond to a single time instant.

The real-world run data may comprise multiple sequences of frames, for example separate sequences of two or more of lidar, radar and depth frames (a depth frame in the present context refers to a 3D point cloud derived via depth imaging, such as stereo or monocular depth imaging). A frame could also comprise a fused point cloud that is computed by fusing multiple point clouds from different sensors and/or different sensor modalities.

The method starts from an initial set of 3D bounding box estimates (coarse size/pose estimates) for each agent of interest, which are used to build a 3D model of the agent from the frames themselves. Here, pose refers to 6D pose (3D location and orientation in 3D space). The following examples consider the extraction of 3D models from lidar specifically, but the description applies equally to other sensor modalities. With multiple modalities of sensor data, the coarse 3D boxes could, for example, be provided by a second sensor modality or modalities (such as radar or depth imaging). For example, the initial coarse estimate could be computed by applying a 3D bounding box detector to a point cloud of the second modality (or modalities). The course estimate could also be determined from the same sensor modality (lidar in this case), with the subsequent processing techniques used to refine the estimate. As another example, real-time 3D boxes from the perception system 102 under testing could be used as the initial coarse estimate (e.g. as computed on-board the vehicle during the real-world run). With the latter approach, the method may be described as a form of detection refinement.

To create an aggregate 3D object model for each agent, the points belonging to that object are aggregated across multiple frames, by taking the subset of points contained within the coarse 3D bounding box in each frame (or the coarse 3D bounding box may be expanded slightly to provide some additional "headroom" for the object point extraction). In broad terms, the aggregation works by initially transforming the subset of points from each frame into a frame of reference of the agent. The transformation into the agent frame of reference is not known exactly at this point, because the pose of the agent in each frame is only known approximately. The transformation is estimated initially from the coarse 3D bounding box. For example, the transformation can be implemented efficiently by transforming the subset of points to align with an axis of the coarse 3D bounding box in each frame. The subsets of points from different frames mostly belong to the same object, but may be misaligned in the agent frame reference due to errors in the initial pose estimates. To correct the misalignment, a registration method is used to align the two subsets of points. Such methods broadly work by transforming (rotating/translating) one of the subsets of object points to align it with the other, using some form of matching algorithm (e.g. Iterative Closest Point). The matching uses the knowledge that the two subsets of points mostly come from the same object. This process can then be repeated across subsequent frames to build a dense 3D model of the object. Having built a dense 3D model in this way, noise points (not belonging to the object) can be isolated from the actual object points and thus filtered out much more readily. Then, by applying a 3D object detector to the dense, filtered 3D object model, a more accurately-sized, tight-fitting 3D bounding box can be determined for the agent in question (this assumes a rigid agent, such that the size and shape of the 3D bounding does not change across frames, and the only variables in each frame are its position and orientation). Finally, the aggregate 3D model is matched to the corresponding object points in each of the frames, to accurately locate the more accurate 3D bounding box in each frame, thus providing a refined 3D bounding box estimate for each frame (forming part of the pseudo-ground truth). This process can be repeated iteratively, whereby an initial 3D model is extracted, the poses are refined, the 3D object model is updated based on the refined poses, and so on.

The refined 3D bound boxes serve as pseudo-ground truth position states, in determining the extent of perception errors for location-based perception outputs (e.g. run-time boxes, pose estimates, etc.).

To incorporate motion information, the 3D bounding boxes may be jointly optimized with a 3D motion model. The motion model can, in turn, provide motion states for the agent in question (e.g. speed/velocity, acceleration etc), which in turn may be used as pseudo-ground truth for run-time motion detections (e.g. speed/velocity, acceleration estimates etc. computed by the perception system 102 under testing). The motion model might encourage realistic (kinematically feasible) 3D boxes across the frames. For example, a joint-optimization could be formulated based on a cost function that penalizes mis-match between the aggregate 3D model and the points of each frame, but at the same time penalizing kinematically infeasible changes in the agent pose between frames.

The motion model also allows 3D boxes to be accurately located in frames with missed object detections (i.e. for which no coarse estimate is available, which could occur if the coarse estimates are on-vehicle detections, and the perception system 102 under testing failed on a given frame), by interpolating the 3D agent pose between adjacent frames based on the motion model. Within the perception triage tool 152, this allows missed object detections to be identified.

The 3D model could be in the form of an aggregate point cloud or a surface model (e.g. a distance field) may be fitted to the points. International Patent Publication No. WO2021/013791, which is incorporated herein by reference, discloses further details of 3D object modelling techniques in which a 3D surface of the 3D object model is encoded as a (signed) distance field fitted to the extracted points.

An application of these refinement techniques is that these can be used to get a pseudo ground truth for the agents 144 of the scene, including the ego vehicle and external agents, where the refined detections can be treated as the real traces taken by the agents in the scene. This may be used to assess how accurate the vehicle's on-board perception was by comparing the car's detections with the pseudo ground truth. The pseudo ground truth can also be used to see how the system under test (i.e. the ego vehicle stack) has driven against the highway rules.

The pseudo ground truth detections 144 can also be used to do semantic tagging and querying of the collected data. For example, a user could input a query such as 'find all events with a cut-in', where a cut-in is any time an agent has entered the ego vehicle's lane in front of the ego vehicle. Since the pseudo ground truth has traces for every agent in the scene, with their location and orientation at any time, it is possible to identify a cut-in by searching the agent traces for instances where they enter a lane in front of another vehicle. More complicated queries may be built. For example, a user may input a query 'find me all cut-ins where the agent had at least x velocity'. Since agent motion is defined by the pseudo ground truth traces extracted from the data, it is straightforward to search the refined detections for instances of cut-ins where the agent was going above a given speed. Once these queries are selected and run, less time is needed to analyse the data manually. This means that there is no need to rely on a driver to identify areas of interest in real time, instead areas of interest can be automatically detected within the collected data, and interesting scenarios can be extracted from them for further analysis. This allows more of the data to be used and potentially enables scenarios to be identified which could be overlooked by a human driver.

Testing Pipeline:

Further details of the testing pipeline and the test oracle 252 will now be described. The examples that follow focus on simulation-based testing. However, as noted, the test oracle 252 can equally be applied to evaluate stack performance on real scenarios, and the relevant description below applies equally to real scenarios. In particular, the testing pipeline described below may be used with the extracted ground truth 144 obtained from real world data, as described in FIGS. 1-5. The application of the described testing pipeline along with a perception evaluation pipeline in a real world data analysis tool is described in more detail later. The following description refers to the stack 100 of FIG. 2A by way of example. However, as noted, the testing pipeline 200 is highly flexible and can be applied to any stack or sub-stack operating at any level of autonomy.

Figure 6A:
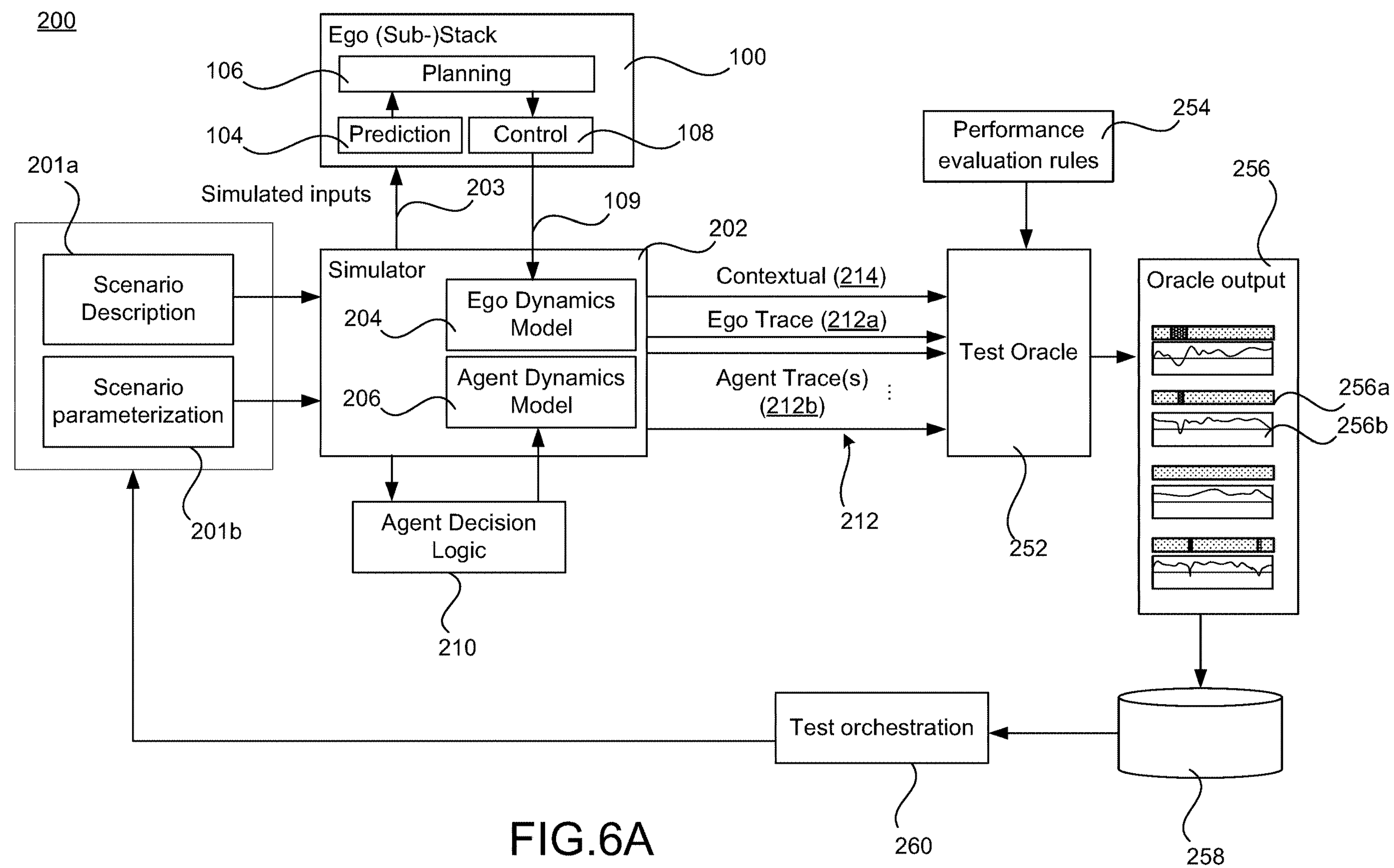
FIG. 6A shows a schematic block diagram of a testing pipeline.

FIG. 6A shows a schematic block diagram of the testing pipeline, denoted by reference numeral 200. The testing pipeline 200 is shown to comprise the simulator 202 and the test oracle 252. The simulator 202 runs simulated scenarios for the purpose of testing all or part of an AV run time stack 100, and the test oracle 252 evaluates the performance of the stack (or sub-stack) on the simulated scenarios. As discussed, it may be that only a sub-stack of the run-time stack is tested, but for simplicity, the following description refers to the (full) AV stack 100 throughout. However, the description applies equally to a sub-stack in place of the full stack 100. The term "slicing" is used herein to the selection of a set or subset of stack components for testing.

As described previously, the idea of simulation-based testing is to run a simulated driving scenario that an ego agent must navigate under the control of the stack 100 being tested. Typically, the scenario includes a static drivable area (e.g. a particular static road layout) that the ego agent is required to navigate, typically in the presence of one or more other dynamic agents (such as other vehicles, bicycles, pedestrians etc.). To this end, simulated inputs 203 are provided from the simulator 202 to the stack 100 under testing.

The slicing of the stack dictates the form of the simulated inputs 203. By way of example, FIG. 6A shows the prediction, planning and control systems 104, 106 and 108 within the AV stack 100 being tested. To test the full AV stack of FIG. 2A, the perception system 102 could also be applied during testing. In this case, the simulated inputs 203 would comprise synthetic sensor data that is generated using appropriate sensor model(s) and processed within the perception system 102 in the same way as real sensor data. This requires the generation of sufficiently realistic synthetic sensor inputs (such as photorealistic image data and/or equally realistic simulated lidar/radar data etc.). The resulting outputs of the perception system 102 would, in turn, feed into the higher-level prediction and planning systems 104, 106.

By contrast, so-called "planning-level" simulation would essentially bypass the perception system 102. The simulator 202 would instead provide simpler, higher-level inputs 203 directly to the prediction system 104. In some contexts, it may even be appropriate to bypass the prediction system 104 as well, in order to test the planner 106 on predictions obtained directly from the simulated scenario (i.e. "perfect" predictions).

Between these extremes, there is scope for many different levels of input slicing, e.g. testing only a subset of the perception system 102, such as "later" (higher-level) perception components, e.g. components such as filters or fusion components which operate on the outputs from lower-level perception components (such as object detectors, bounding box detectors, motion detectors etc.).

Whatever form they take, the simulated inputs 203 are used (directly or indirectly) as a basis for decision-making by the planner 108. The controller 108, in turn, implements the planner's decisions by outputting control signals 109. In a real-world context, these control signals would drive the physical actor system 112 of AV. In simulation, an ego vehicle dynamics model 204 is used to translate the resulting control signals 109 into realistic motion of the ego agent within the simulation, thereby simulating the physical response of an autonomous vehicle to the control signals 109.

Alternatively, a simpler form of simulation assumes that the ego agent follows each planned trajectory exactly between planning steps. This approach bypasses the control system 108 (to the extent it is separable from planning) and removes the need for the ego vehicle dynamic model 204. This may be sufficient for testing certain facets of planning.

To the extent that external agents exhibit autonomous behaviour/decision making within the simulator 202, some form of agent decision logic 210 is implemented to carry out those decisions and determine agent behaviour within the scenario. The agent decision logic 210 may be comparable in complexity to the ego stack 100 itself or it may have a more limited decision-making capability. The aim is to provide sufficiently realistic external agent behaviour within the simulator 202 to be able to usefully test the decision-making capabilities of the ego stack 100. In some contexts, this does not require any agent decision making logic 210 at all (open-loop simulation), and in other contexts useful testing can be provided using relatively limited agent logic 210 such as basic adaptive cruise control (ACC). One or more agent dynamics models 206 may be used to provide more realistic agent behaviour if appropriate.

A scenario is run in accordance with a scenario description 201*a* and (if applicable) a chosen parameterization 201*b* of the scenario. A scenario typically has both static and dynamic elements which may be "hard coded" in the scenario description 201*a* or configurable and thus determined by the scenario description 201*a* in combination with a chosen parameterization 201*b*. In a driving scenario, the static element(s) typically include a static road layout.

The dynamic element(s) typically include one or more external agents within the scenario, such as other vehicles, pedestrians, bicycles etc.

The extent of the dynamic information provided to the simulator 202 for each external agent can vary. For example, a scenario may be described by separable static and dynamic layers. A given static layer (e.g. defining a road layout) can be used in combination with different dynamic layers to provide different scenario instances. The dynamic layer may comprise, for each external agent, a spatial path to be followed by the agent together with one or both of motion data and behaviour data associated with the path. In simple open-loop simulation, an external actor simply follows the spatial path and motion data defined in the dynamic layer that is non-reactive i.e. does not react to the ego agent within the simulation. Such open-loop simulation can be implemented without any agent decision logic 210. However, in closed-loop simulation, the dynamic layer instead defines at least one behaviour to be followed along a static path (such as an ACC behaviour). In this case, the agent decision logic 210 implements that behaviour within the simulation in a reactive manner, i.e. reactive to the ego agent and/or other external agent(s). Motion data may still be associated with the static path but in this case is less prescriptive and may for example serve as a target along the path. For example, with an ACC behaviour, target speeds may be set along the path which the agent will seek to match, but the agent decision logic 210 might be permitted to reduce the speed of the external agent below the target at any point along the path in order to maintain a target headway from a forward vehicle.

As will be appreciated, scenarios can be described for the purpose of simulation in many ways, with any degree of configurability. For example, the number and type of agents, and their motion information may be configurable as part of the scenario parameterization 201*b*.

The output of the simulator 202 for a given simulation includes an ego trace 212*a* of the ego agent and one or more agent traces 212*b* of the one or more external agents (traces 212). Each trace 212*a*, 212*b* is a complete history of an agent's behaviour within a simulation having both spatial and motion components. For example, each trace 212*a*, 212*b* may take the form of a spatial path having motion data associated with points along the path such as speed, acceleration, jerk (rate of change of acceleration), snap (rate of change of jerk) etc.

Additional information is also provided to supplement and provide context to the traces 212. Such additional information is referred to as "contextual" data 214. The contextual data 214 pertains to the physical context of the scenario, and can have both static components (such as road layout) and dynamic components (such as weather conditions to the extent they vary over the course of the simulation). To an extent, the contextual data 214 may be "pass-through" in that it is directly defined by the scenario description 201*a* or the choice of parameterization 201*b*, and is thus unaffected by the outcome of the simulation. For example, the contextual data 214 may include a static road layout that comes from the scenario description 201*a* or the parameterization 201*b* directly. However, typically the contextual data 214 would include at least some elements derived within the simulator 202. This could, for example, include simulated environmental data, such as weather data, where the simulator 202 is free to change weather conditions as the simulation progresses. In that case, the weather data may be time-dependent, and that time dependency will be reflected in the contextual data 214.

The test oracle 252 receives the traces 212 and the contextual data 214, and scores those outputs in respect of a set of performance evaluation rules 254. The performance evaluation rules 254 are shown to be provided as an input to the test oracle 252.

The rules 254 are categorical in nature (e.g. pass/fail-type rules). Certain performance evaluation rules are also associated with numerical performance metrics used to "score" trajectories (e.g. indicating a degree of success or failure or some other quantity that helps explain or is otherwise relevant to the categorical results). The evaluation of the rules 254 is time-based-a given rule may have a different outcome at different points in the scenario. The scoring is also time-based: for each performance evaluation metric, the test oracle 252 tracks how the value of that metric (the score) changes over time as the simulation progresses. The test oracle 252 provides an output 256 comprising a time sequence 256*a* of categorical (e.g. pass/fail) results for each rule, and a score-time plot 256*b* for each performance metric, as described in further detail later. The results and scores 256*a*, 256*b* are informative to the expert 122 and can be used to identify and mitigate performance issues within the tested stack 100. The test oracle 252 also provides an overall (aggregate) result for the scenario (e.g. overall pass/fail). The output 256 of the test oracle 252 is stored in a test database 258, in association with information about the scenario to which the output 256 pertains. For example, the output 256 may be stored in association with the scenario description 201*a* (or an identifier thereof), and the chosen parameterization 201*b*. As well as the time-dependent results and scores, an overall score may also be assigned to the scenario and stored as part of the output 256. For example, an aggregate score for each rule (e.g. overall pass/fail) and/or an aggregate result (e.g. pass/fail) across all of the rules 254.

Figure 6B:
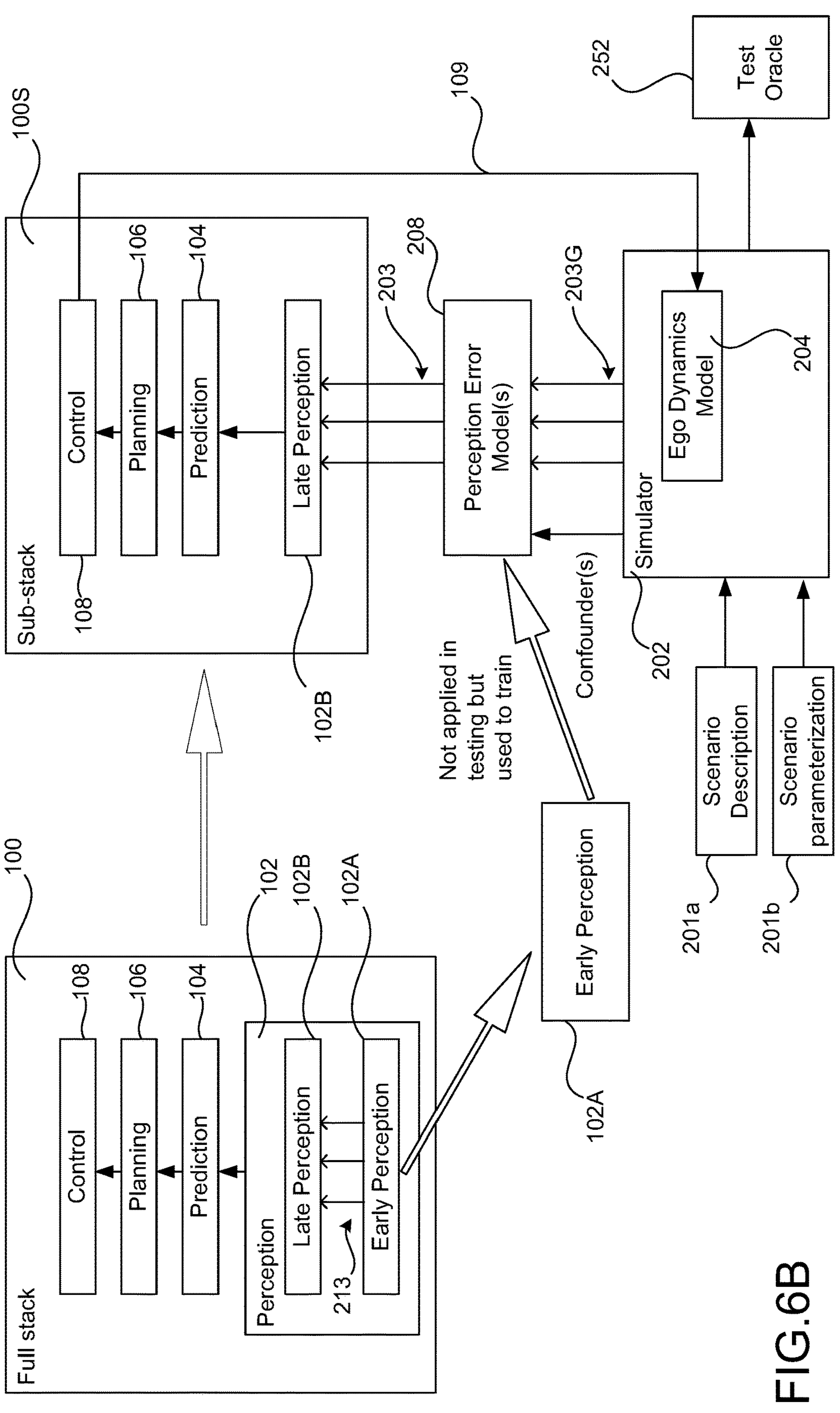
FIG. 6B shows further details of a possible implementation of the testing pipeline.

FIG. 6B illustrates another choice of slicing and uses reference numerals 100 and 100S to denote a full stack and sub-stack respectively. It is the sub-stack 100S that would be subject to testing within the testing pipeline 200 of FIG. 6A.

A number of "later" perception components 102B form part of the sub-stack 100S to be tested and are applied, during testing, to simulated perception inputs 203. The later perception components 102B could, for example, include filtering or other fusion components that fuse perception inputs from multiple earlier perception components.

In the full stack 100, the later perception components 102B would receive actual perception inputs 213 from earlier perception components 102A. For example, the earlier perception components 102A might comprise one or more 2D or 3D bounding box detectors, in which case the simulated perception inputs provided to the late perception components could include simulated 2D or 3D bounding box detections, derived in the simulation via ray tracing. The earlier perception components 102A would generally include component(s) that operate directly on sensor data. With the slicing of FIG. 6B, the simulated perception inputs 203 would correspond in form to the actual perception inputs 213 that would normally be provided by the earlier perception components 102A. However, the earlier perception components 102A are not applied as part of the testing, but are instead used to train one or more perception error models 208 that can be used to introduce realistic error, in a statistically rigorous manner, into the simulated perception inputs 203 that are fed to the later perception components 102B of the sub-stack 100 under testing.

Such perception error models may be referred to as Perception Statistical Performance Models (PSPMs) or, synonymously, "PRISMs". Further details of the principles of PSPMs, and suitable techniques for building and training them, may be bound in International Patent Publication Nos. WO2021037763 WO2021037760, WO2021037765, WO2021037761, and WO2021037766, each of which is incorporated herein by reference in its entirety. The idea behind PSPMs is to efficiently introduce realistic errors into the simulated perception inputs provided to the sub-stack 100S (i.e. that reflect the kind of errors that would be expected were the earlier perception components 102A to be applied in the real-world). In a simulation context, "perfect" ground truth perception inputs 203G are provided by the simulator, but these are used to derive more realistic perception inputs 203 with realistic error introduced by the perception error models(s) 208.

As described in the aforementioned reference, a PSPM can be dependent on one or more variables representing physical condition(s) ("confounders"), allowing different levels of error to be introduced that reflect different possible real-world conditions. Hence, the simulator 202 can simulate different physical conditions (e.g. different weather conditions) by simply changing the value of a weather confounder(s), which will, in turn, change how perception error is introduced.

The later perception components 102*b* within the sub-stack 100S process the simulated perception inputs 203 in exactly the same way as they would process the real-world perception inputs 213 within the full stack 100, and their outputs, in turn, drive prediction, planning and control.

Alternatively, PRISMs can be used to model the entire perception system 102, including the late perception components 208, in which case a PSPM(s) is used to generate realistic perception output that are passed as inputs to the prediction system 104 directly.

Depending on the implementation, there may or may not be a deterministic relationship between a given scenario parameterization 201*b* and the outcome of the simulation for a given configuration of the stack 100 (i.e. the same parameterization may or may not always lead to the same outcome for the same stack 100). Non-determinism can arise in various ways. For example, when simulation is based on PRISMs, a PRISM might model a distribution over possible perception outputs at each given time step of the scenario, from which a realistic perception output is sampled probabilistically. This leads to non-deterministic behaviour within the simulator 202, whereby different outcomes may be obtained for the same stack 100 and scenario parameterization because different perception outputs are sampled. Alternatively, or additionally, the simulator 202 may be inherently non-deterministic, e.g. weather, lighting or other environmental conditions may be randomized/probabilistic within the simulator 202 to a degree. As will be appreciated, this is a design choice: in other implementations, varying environmental conditions could instead be fully specified in the parameterization 201*b* of the scenario. With non-deterministic simulation, multiple scenario instances could be run for each parameterization. An aggregate pass/fail result could be assigned to a particular choice of parameterization 201*b*, e.g. as a count or percentage of pass or failure outcomes.

A test orchestration component 260 is responsible for selecting scenarios for the purpose of simulation. For example, the test orchestration component 260 may select scenario descriptions 201*a* and suitable parameterizations 201*b* automatically, based on the test oracle outputs 256 from previous scenarios.

Test Oracle Rules:

The performance evaluation rules 254 are constructed as computational graphs (rule trees) to be applied within the test oracle. Unless otherwise indicated, the term "rule tree" herein refers to the computational graph that is configured to implement a given rule. Each rule is constructed as a rule tree, and a set of multiple rules may be referred to as a "forest" of multiple rule trees.

Figures 7A, 7B:
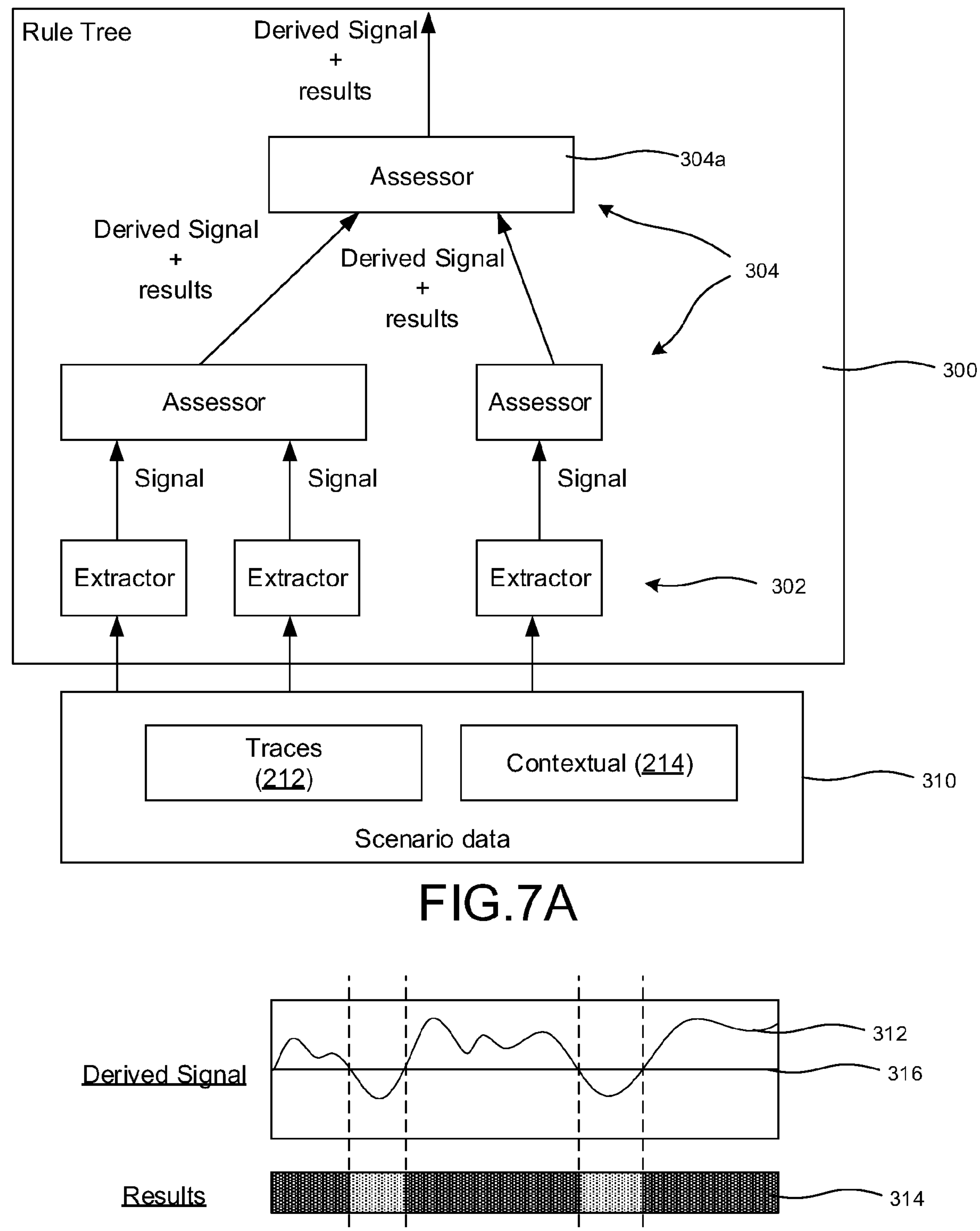
FIG. 7A shows an example of a rule tree evaluated within a test oracle.
FIG. 7B shows an example output of a node of a rule tree.

FIG. 7A shows an example of a rule tree 300 constructed from a combination of extractor nodes (leaf objects) 302 and assessor nodes (non-leaf objects) 304. Each extractor node 302 extracts a time-varying numerical (e.g. floating point) signal (score) from a set of scenario data 310. The scenario data 310 is a form of scenario ground truth, in the sense laid out above, and may be referred to as such. The scenario data 310 has been obtained by deploying a trajectory planner (such as the planner 106 of FIG. 2A) in a real or simulated scenario, and is shown to comprise ego and agent traces 212 as well as contextual data 214. In the simulation context of FIG. 6 or FIG. 6A, the scenario ground truth 310 is provided as an output of the simulator 202.

Each assessor node 304 is shown to have at least one child object (node), where each child object is one of the extractor nodes 302 or another one of the assessor nodes 304. Each assessor node receives output(s) from its child node(s) and applies an assessor function to those output(s). The output of the assessor function is a time-series of categorical results. The following examples consider simple binary pass/fail results, but the techniques can be readily extended to non-binary results. Each assessor function assesses the output(s) of its child node(s) against a predetermined atomic rule. Such rules can be flexibly combined in accordance with a desired safety model.

In addition, each assessor node 304 derives a time-varying numerical signal from the output(s) of its child node(s), which is related to the categorical results by a threshold condition (see below).

A top-level root node 304*a* is an assessor node that is not a child node of any other node. The top-level node 304*a* outputs a final sequence of results, and its descendants (i.e. nodes that are direct or indirect children of the top-level node 304*a*) provide the underlying signals and intermediate results.

FIG. 7B visually depicts an example of a derived signal 312 and a corresponding time-series of results 314 computed by an assessor node 304. The results 314 are correlated with the derived signal 312, in that a pass result is returned when (and only when) the derived signal exceeds a failure threshold 316. As will be appreciated, this is merely one example of a threshold condition that relates a time-sequence of results to a corresponding signal.

Signals extracted directly from the scenario ground truth 310 by the extractor nodes 302 may be referred to as "raw" signals, to distinguish from "derived" signals computed by assessor nodes 304. Results and raw/derived signals may be discretized in time.

Figure 8A:
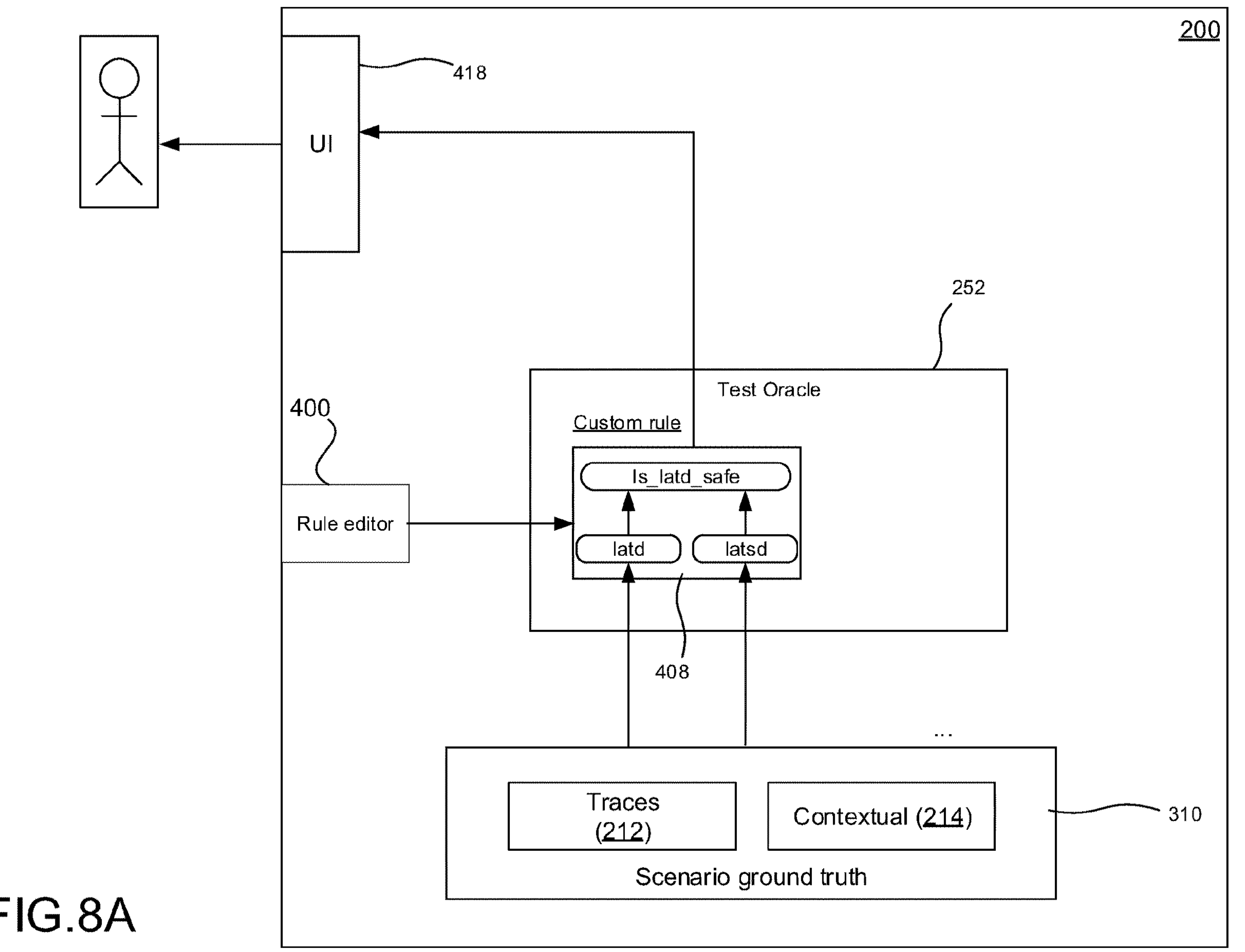
FIG. 8A shows an example of a rule tree to be evaluated within a test oracle.

FIG. 8A shows an example of a rule tree implemented within the testing platform 200.

A rule editor 400 is provided for constructing rules to be implemented with the test oracle 252. The rule editor 400 receives rule creation inputs from a user (who may or may not be the end-user of the system). In the present example, the rule creation inputs are coded in a domain specific language (DSL) and define at least one rule graph 408 to be implemented within the test oracle 252. The rules are logical rules in the following examples, with TRUE and FALSE representing pass and failure respectively (as will be appreciated, this is purely a design choice).

The following examples consider rules that are formulated using combinations of atomic logic predicates. Examples of basic atomic predicates include elementary logic gates (OR, AND etc.), and logical functions such as "greater than", (Gt(a,b)) (which returns TRUE when a is greater than b, and false otherwise).

A Gt function is to implement a safe lateral distance rule between an ego agent and another agent in the scenario (having agent identifier "other_agent_id"). Two extractor nodes (latd, latsd) apply LateralDistance and LateralSafeDistance extractor functions respectively. Those functions operate directly on the scenario ground truth 310 to extract, respectively, a time-varying lateral distance signal (measuring a lateral distance between the ego agent and the identified other agent), and a time-varying safe lateral distance signal for the ego agent and the identified other agent. The safe lateral distance signal could depend on various factors, such as the speed of the ego agent and the speed of the other agent (captured in the traces 212), and environmental conditions (e.g. weather, lighting, road type etc.) captured in the contextual data 214.

An assessor node (is_latd_safe) is a parent to the latd and latsd extractor nodes, and is mapped to the Gt atomic predicate. Accordingly, when the rule tree 408 is implemented, the is_latd_safe assessor node applies the Gt function to the outputs of the latd and latsd extractor nodes, in order to compute a true/false result for each timestep of the scenario, returning TRUE for each time step at which the latd signal exceeds the latsd signal and FALSE otherwise. In this manner, a "safe lateral distance" rule has been constructed from atomic extractor functions and predicates; the ego agent fails the safe lateral distance rule when the lateral distance reaches or falls below the safe lateral distance threshold. As will be appreciated, this is a very simple example of a rule tree. Rules of arbitrary complexity can be constructed according to the same principles.

The test oracle 252 applies the rule tree 408 to the scenario ground truth 310, and provides the results via a user interface (UI) 418.

Figure 8B:
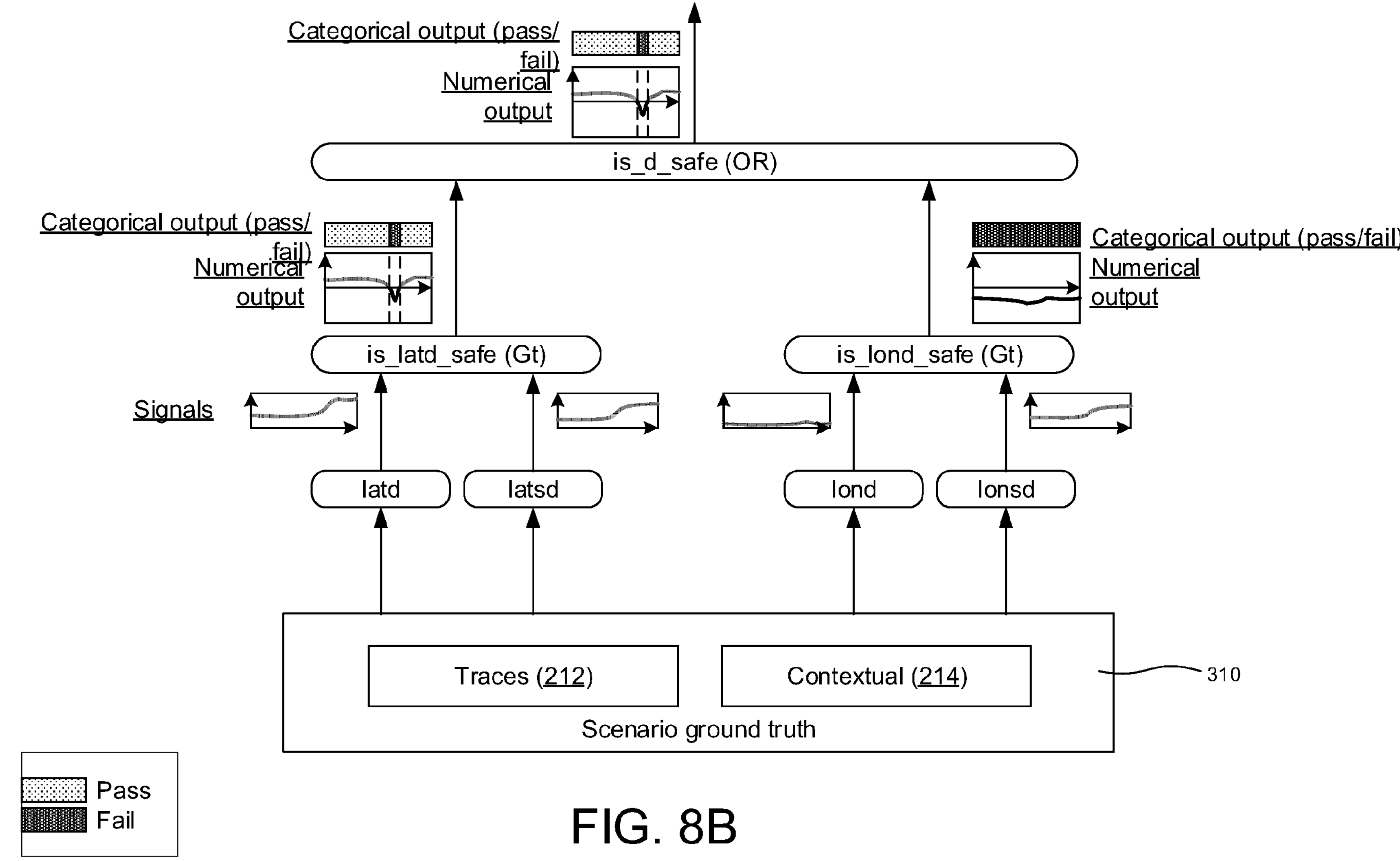
FIG. 8B shows a second example of a rule tree evaluated on a set of scenario ground truth data.

FIG. 8B shows an example of a rule tree that includes a lateral distance branch corresponding to that of FIG. 8A. Additionally, the rule tree includes a longitudinal distance branch, and a top-level OR predicate (safe distance node, is_d_safe) to implement a safe distance metric. Similar to the lateral distance branch, the longitudinal distance brand extracts longitudinal distance and longitudinal distance threshold signals from the scenario data (extractor nodes lond and lonsd respectively), and a longitudinal safety assessor node (is_lond_safe) returns TRUE when the longitudinal distance is above the safe longitudinal distance threshold. The top-level OR node returns TRUE when one or both of the lateral and longitudinal distances is safe (below the applicable threshold), and FALSE if neither is safe. In this context, it is sufficient for only one of the distances to exceed the safety threshold (e.g. if two vehicles are driving in adjacent lanes, their longitudinal separation is zero or close to zero when they are side-by-side; but that situation is not unsafe if those vehicles have sufficient lateral separation).

The numerical output of the top-level node could, for example, be a time-varying robustness score.

Different rule trees can be constructed, e.g. to implement different rules of a given safety model, to implement different safety models, or to apply rules selectively to different scenarios (in a given safety model, not every rule will necessarily be applicable to every scenario; with this approach, different rules or combinations of rules can be applied to different scenarios). Within this framework, rules can also be constructed for evaluating comfort (e.g. based on instantaneous acceleration and/or jerk along the trajectory), progress (e.g. based on time taken to reach a defined goal) etc.

The above examples consider simple logical predicates evaluated on results or signals at a single time instance, such as OR, AND, Gt etc. However, in practice, it may be desirable to formulate certain rules in terms of temporal logic.

Hekmatnejad et al., "Encoding and Monitoring Responsibility Sensitive Safety Rules for Automated Vehicles in Signal Temporal Logic" (2019), MEMOCODE '19: Proceedings of the 17th ACM-IEEE International Conference on Formal Methods and Models for System Design (incorporated herein by reference in its entirety) discloses a signal temporal logic (STL) encoding of the RSS safety rules. Temporal logic provides a formal framework for constructing predicates that are qualified in terms of time. This means that the result computed by an assessor at a given time instant can depend on results and/or signal values at another time instant(s).

For example, a requirement of the safety model may be that an ego agent responds to a certain event within a set time frame. Such rules can be encoded in a similar manner, using temporal logic predicates within the rule tree.

In the above examples, the performance of the stack 100 is evaluated at each time step of a scenario. An overall test result (e.g. pass/fail) can be derived from this—for example, certain rules (e.g. safety-critical rules) may result in an overall failure if the rule is failed at any time step within the scenario (that is, the rule must be passed at every time step to obtain an overall pass on the scenario). For other types of rule, the overall pass/fail criteria may be "softer" (e.g. failure may only be triggered for a certain rule if that rule is failed over some number of sequential time steps), and such criteria may be context dependent.

Figure 8C:
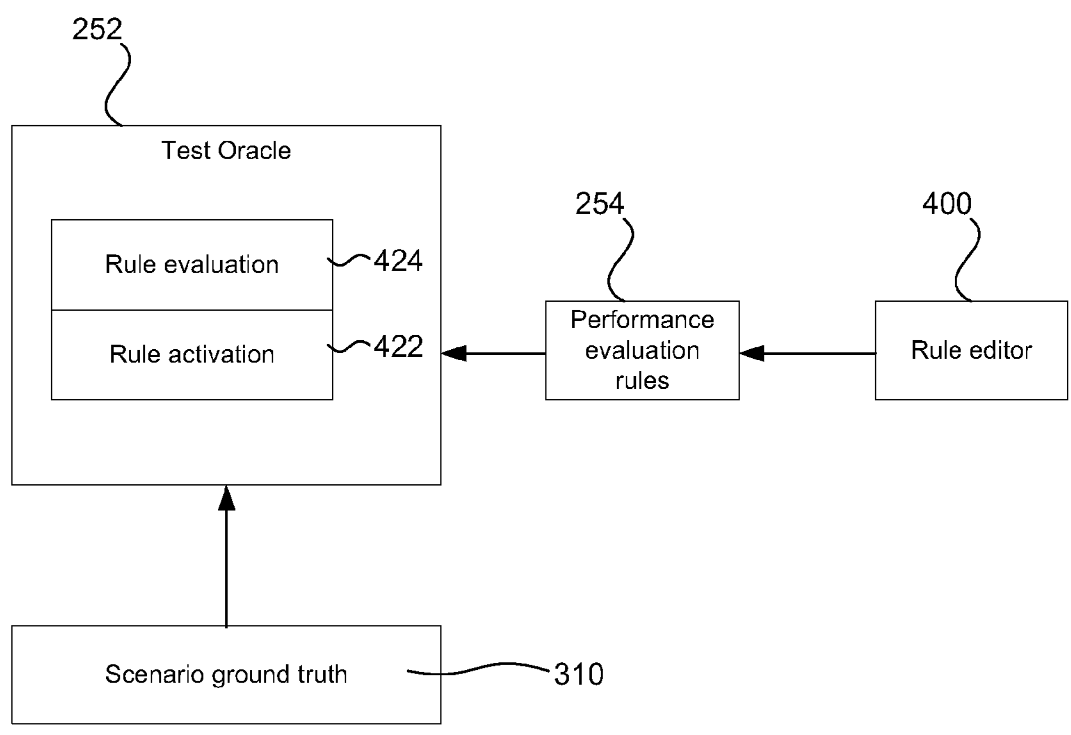
FIG. 8C shows how rules may be selectively applied within a test oracle.

FIG. 8C schematically depicts a hierarchy of rule evaluation implemented within the test oracle 252. A set of rules 254 is received for implementation in the test oracle 252.

Certain rules apply only to the ego agent (an example being a comfort rule that assesses whether or not some maximum acceleration or jerk threshold is exceeded by the ego trajectory at any given time instant).

Other rules pertain to the interaction of the ego agent with other agents (for example, a "no collision" rule or the safe distance rule considered above). Each such rule is evaluated in a pairwise fashion between the ego agent and each other agent. As another example, a "pedestrian emergency braking" rule may only be activated when a pedestrian walks out in front of the ego vehicle, and only in respect of that pedestrian agent.

Not every rule will necessarily be applicable to every scenario, and some rules may only be applicable for part of a scenario. Rule activation logic 422 within the test oracle 252 determines if and when each of the rules 254 is applicable to the scenario in question, and selectively activates rules as and when they apply. A rule may, therefore, remain active for the entirety of a scenario, may never be activated for a given scenario, or may be activated for only some of the scenario. Moreover, a rule may be evaluated for different numbers of agents at different points in the scenario. Selectively activating rules in this manner can significantly increase the efficiency of the test oracle 252.

The activation or deactivation of a given rule may be dependent on the activation/deactivation of one or more other rules. For example, an "optimal comfort" rule may be deemed inapplicable when the pedestrian emergency braking rule is activated (because the pedestrian's safety is the primary concern), and the former may be deactivated whenever the latter is active.

Rule evaluation logic 424 evaluates each active rule for any time period(s) it remains active. Each interactive rule is evaluated in a pairwise fashion between the ego agent and any other agent to which it applies.

There may also be a degree of interdependency in the application of the rules. For example, another way to address the relationship between a comfort rule and an emergency braking rule would be to increase a jerk/acceleration threshold of the comfort rule whenever the emergency braking rule is activated for at least one other agent.

Whilst pass/fail results have been considered, rules may be non-binary. For example, two categories for failure—"acceptable" and "unacceptable"—may be introduced. Again, considering the relationship between a comfort rule and an emergency braking rule, an acceptable failure on a comfort rule may occur when the rule is failed but at a time when an emergency braking rule was active. Interdependency between rules can, therefore, be handled in various ways.

The activation criteria for the rules 254 can be specified in the rule creation code provided to the rule editor 400, as can the nature of any rule interdependencies and the mechanism(s) for implementing those interdependencies.

Figure 9A:
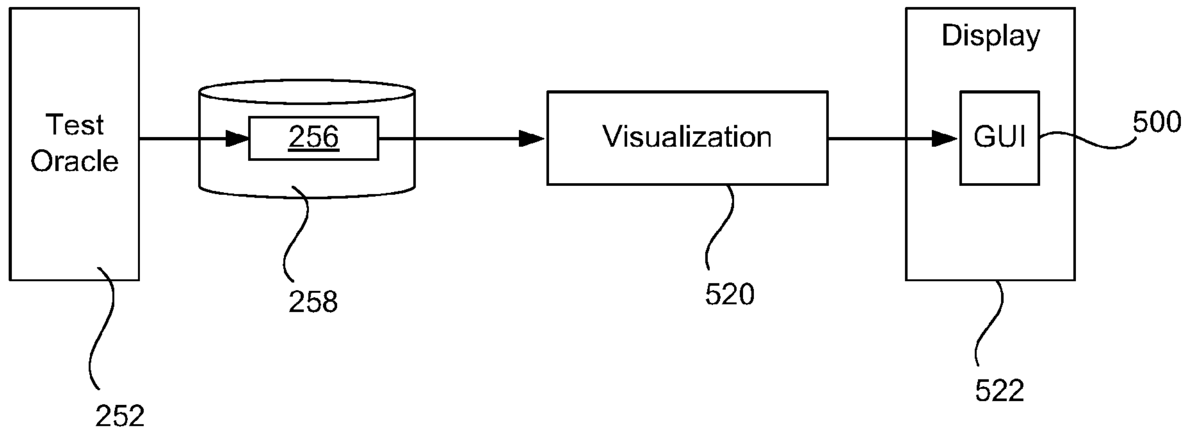
FIG. 9A shows a schematic block diagram of a visualization component for rendering a graphical user interface.

Graphical User Interface:

FIG. 9A shows a schematic block diagram of a visualization component 520. The visualization component is shown having an input connected to the test database 258 for rendering the outputs 256 of the test oracle 252 on a graphical user interface (GUI) 500. The GUI is rendered on a display system 522.

Figure 9B:
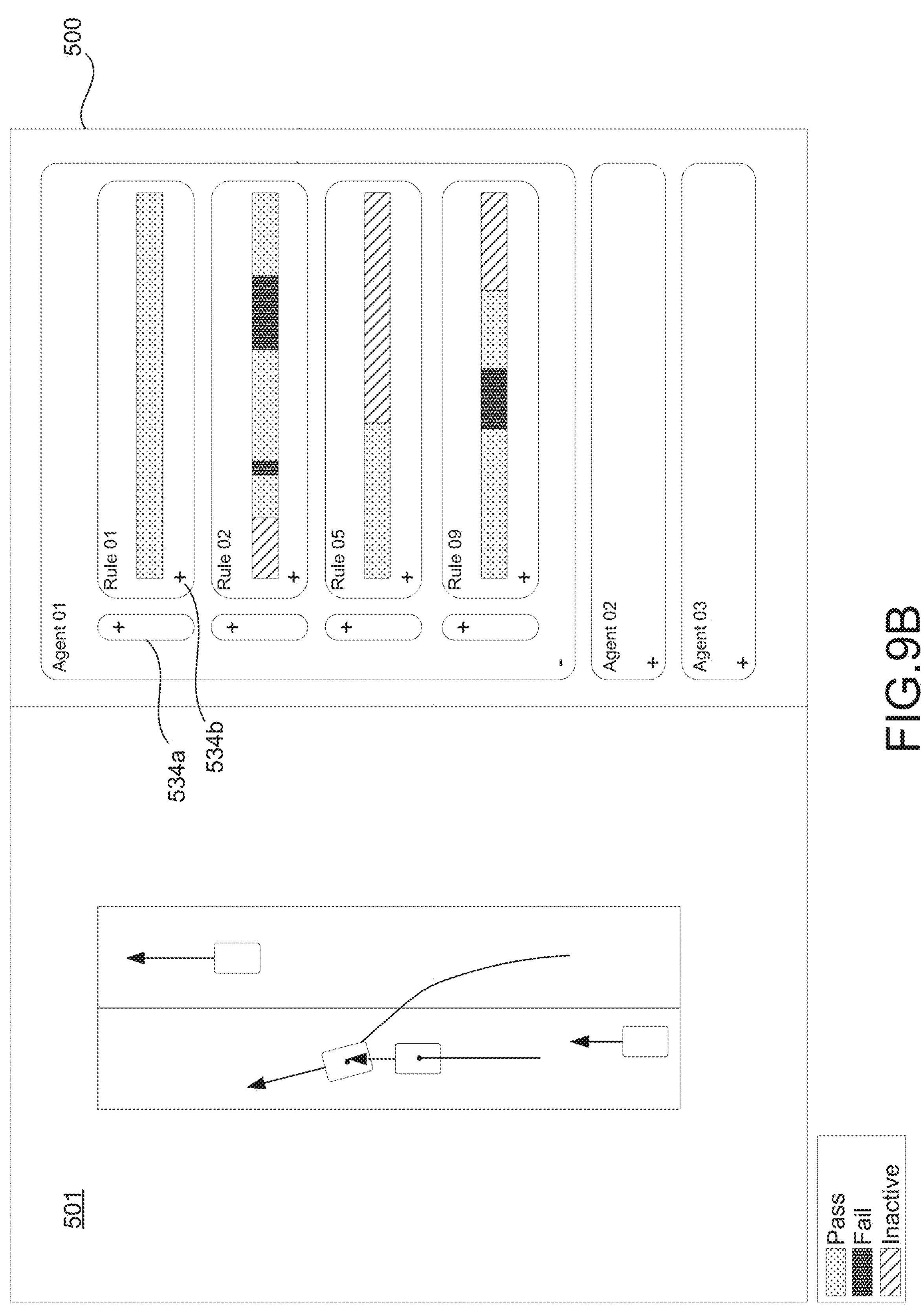

FIG. 9B shows an example view of the GUI 500. The view pertains to a particular scenario containing multiple agents. In this example, the test oracle output 256 pertains to multiple external agents, and the results are organized according to agent. For each agent, a time-series of results is available for each rule applicable to that agent at some point in the scenario. In the depicted example, a summary view has been selected for "Agent 01", causing the "top-level" results computed to be displayed for each applicable rule. There are the top-level results computed at the root node of each rule tree. Colour coding is used to differentiate between periods when the rule is inactive for that agent, active and passes, and active and failed.

A first selectable element 534*a* is provided for each time-series of results. This allows lower-level results of the rule tree to be accessed, i.e. as computed lower down in the rule tree.

FIG. 9C shows a first expanded view of the results for "Rule 02", in which the results of lower-level nodes are also visualized. For example, for the "safe distance" rule of FIG. 4B, the results of the "is_latd_safe node" and the "is_lond_safe" nodes may be visualized (labelled "C1" and "C2" in FIG. 9C). In the first expanded view of Rule 02, it can be seen that success/failure on Rule 02 is defined by a logical OR relationship between results C1 and C2; Rule 02 is failed only when failure is obtained on both C1 and C2 (as in the "safe distance" rule above).

A second selectable element 534*b* is provided for each time-series of results, that allows the associated numerical performance scores to be accessed.

FIG. 9D shows a second expanded view, in which the results for Rule 02 and the "C1" results have been expanded to reveal the associated scores for time period(s) in which those rules are active for Agent 01. The scores are displayed as a visual score-time plot that is similarly colour coded to denote pass/fail.

Figure 10A:
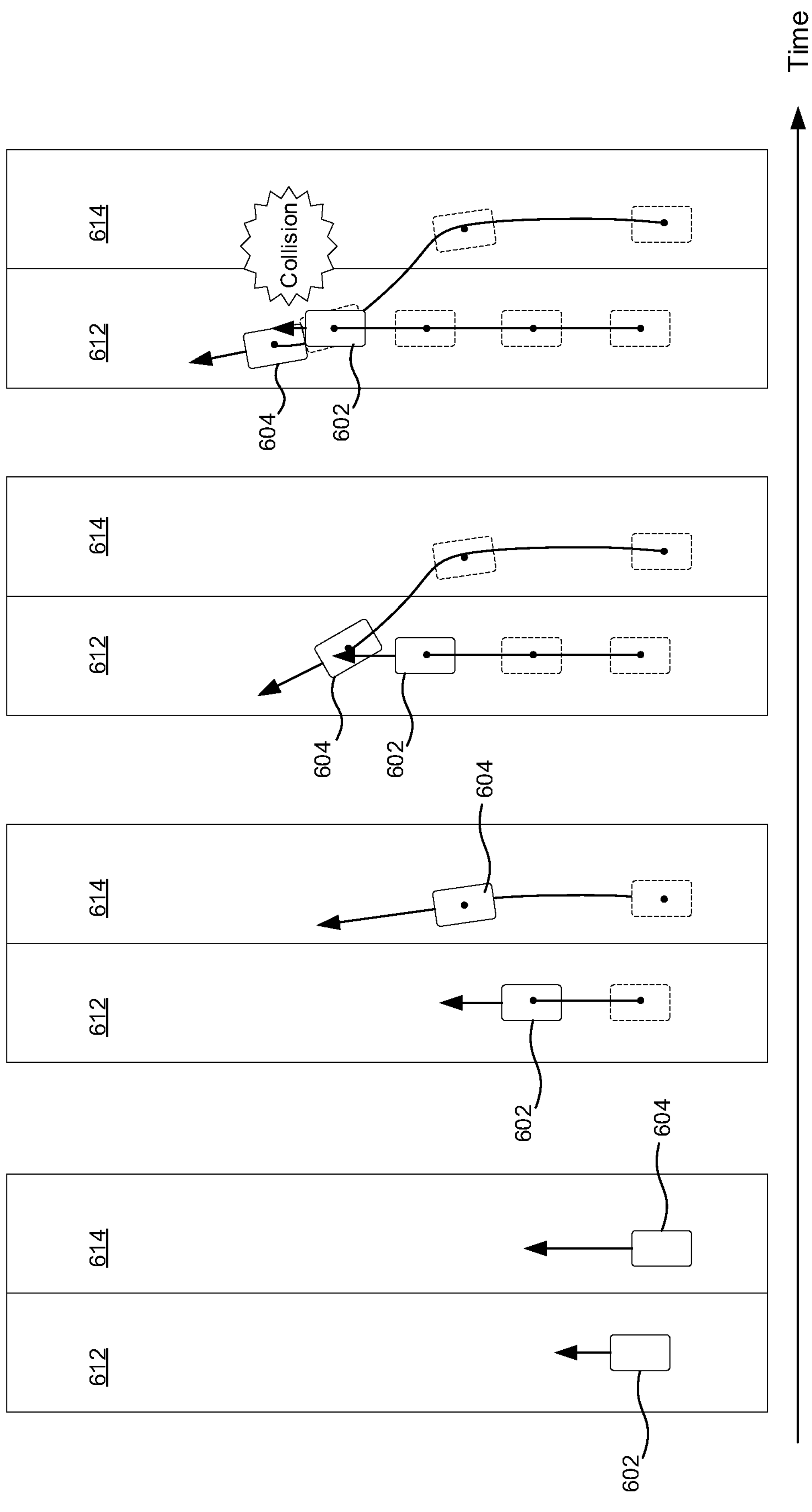
FIG. 10A shows a first instance of a cut-in scenario.

Example Scenarios:

FIG. 10A depicts a first instance of a cut-in scenario in the simulator 202 that terminates in a collision event between an ego vehicle 602 and another vehicle 604. The cut-in scenario is characterized as a multi-lane driving scenario, in which the ego vehicle 602 is moving along a first lane 612 (the ego lane) and the other vehicle 604 is initially moving along a second, adjacent lane 604. At some point in the scenario, the other vehicle 604 moves from the adjacent lane 614 into the ego lane 612 ahead of the ego vehicle 602 (the cut-in distance). In this scenario, the ego vehicle 602 is unable to avoid colliding with the other vehicle 604. The first scenario instance terminates in response to the collision event.

Figure 10B:
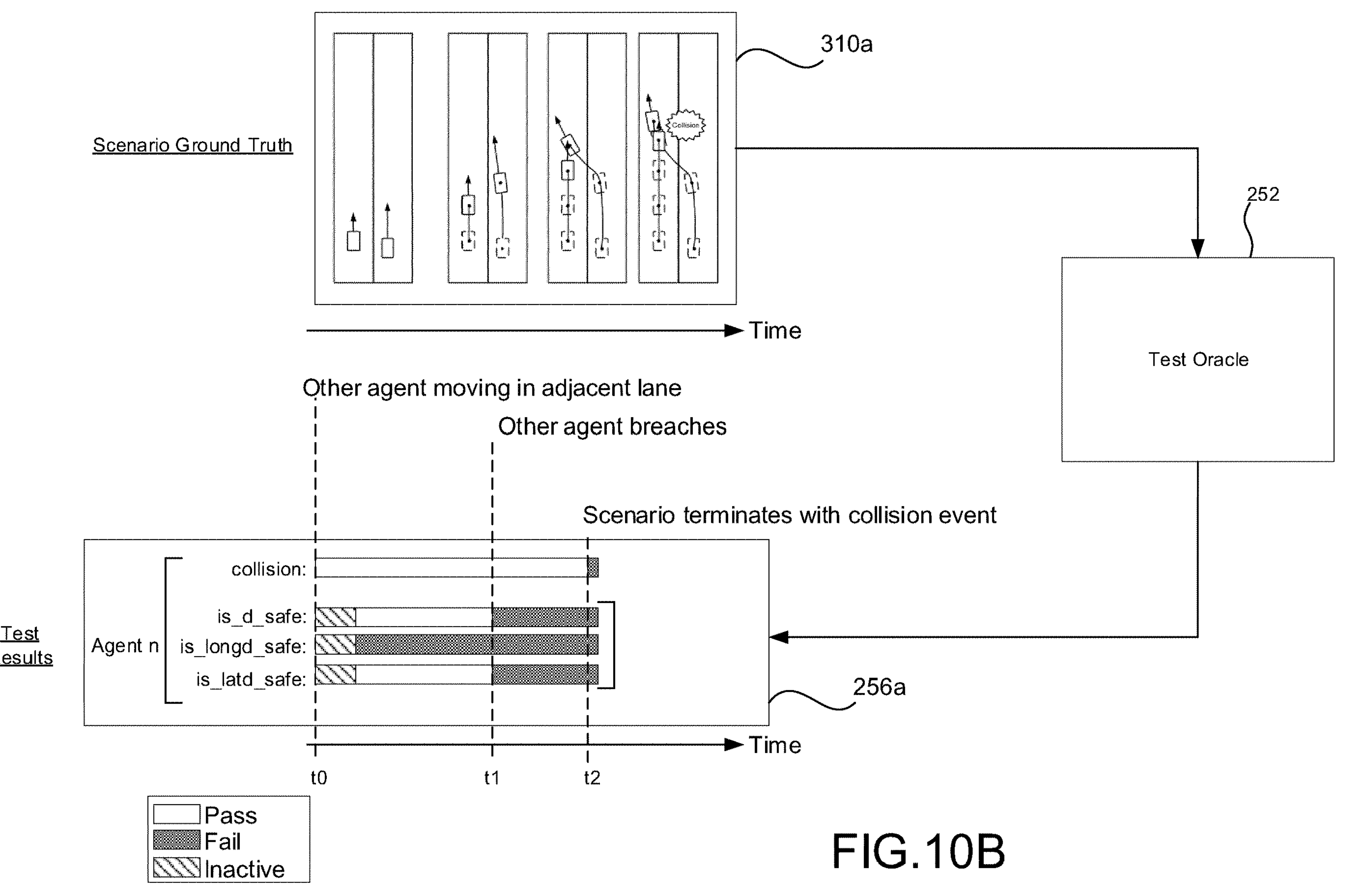
FIG. 10B shows an example oracle output for the first scenario instance.

FIG. 10B depicts an example of a first oracle output 256*a* obtained from ground truth 310*a* of the first scenario instance. A "no collision" rule is evaluated over the duration of the scenario between the ego vehicle 602 and the other vehicle 604. The collision event results in failure on this rule at the end of the scenario. In addition, the "safe distance" rule of FIG. 4B is evaluated.

As the other vehicle 604 moves laterally closer to the ego vehicle 602, there comes a point in time (t1) when both the safe lateral distance and safe longitudinal distance thresholds are breached, resulting in failure on the safe distance rule that persists up to the collision event at time t2.

Figure 10C:
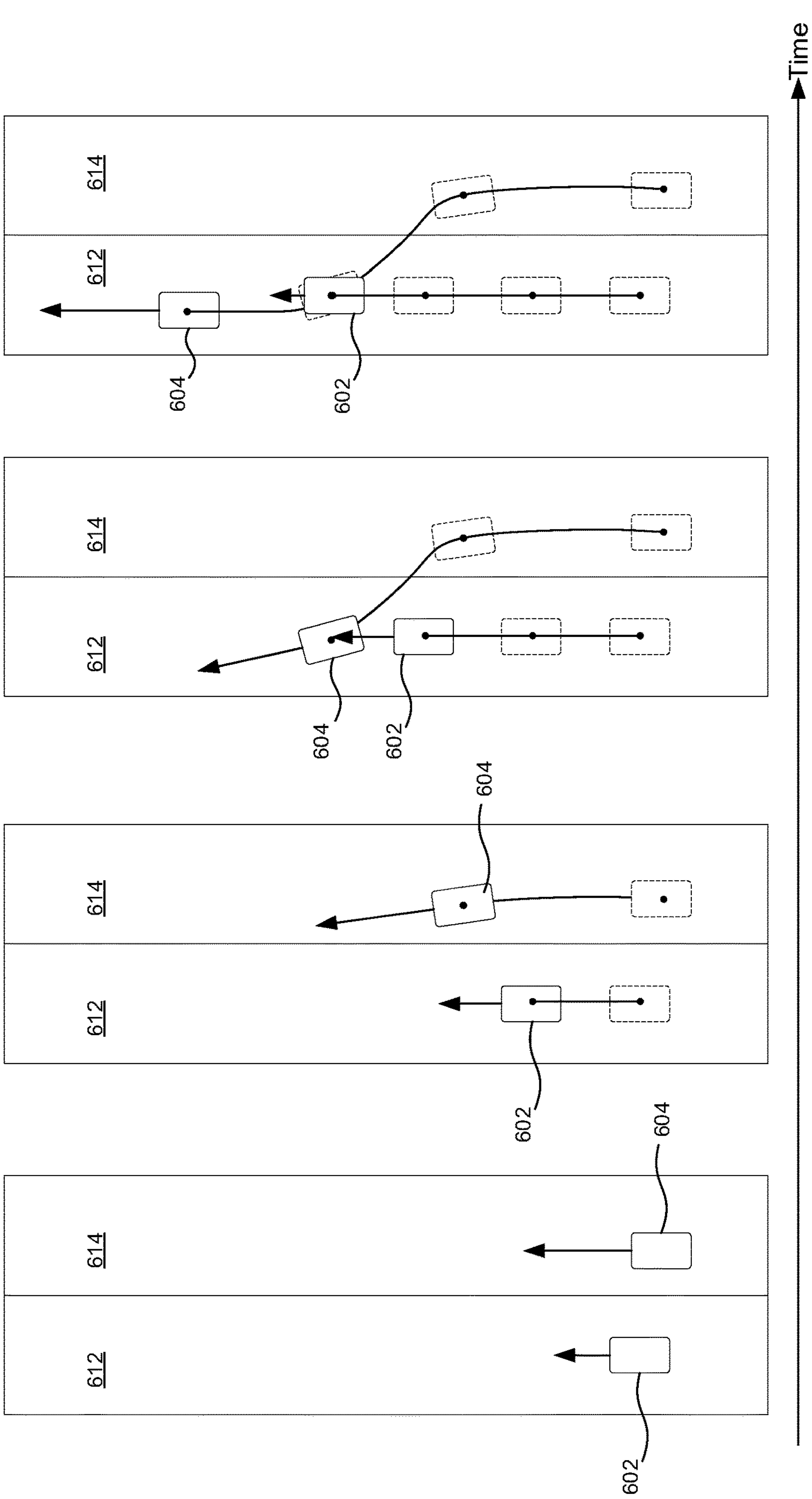
FIG. 10C shows a second instance of a cut-in scenario.

FIG. 10C depicts a second instance of the cut-in scenario. In the second instance, the cut-in event does not result in a collision, and the ego vehicle 602 is able to reach a safe distance behind the other vehicle 604 following the cut in event.

Figure 10D:
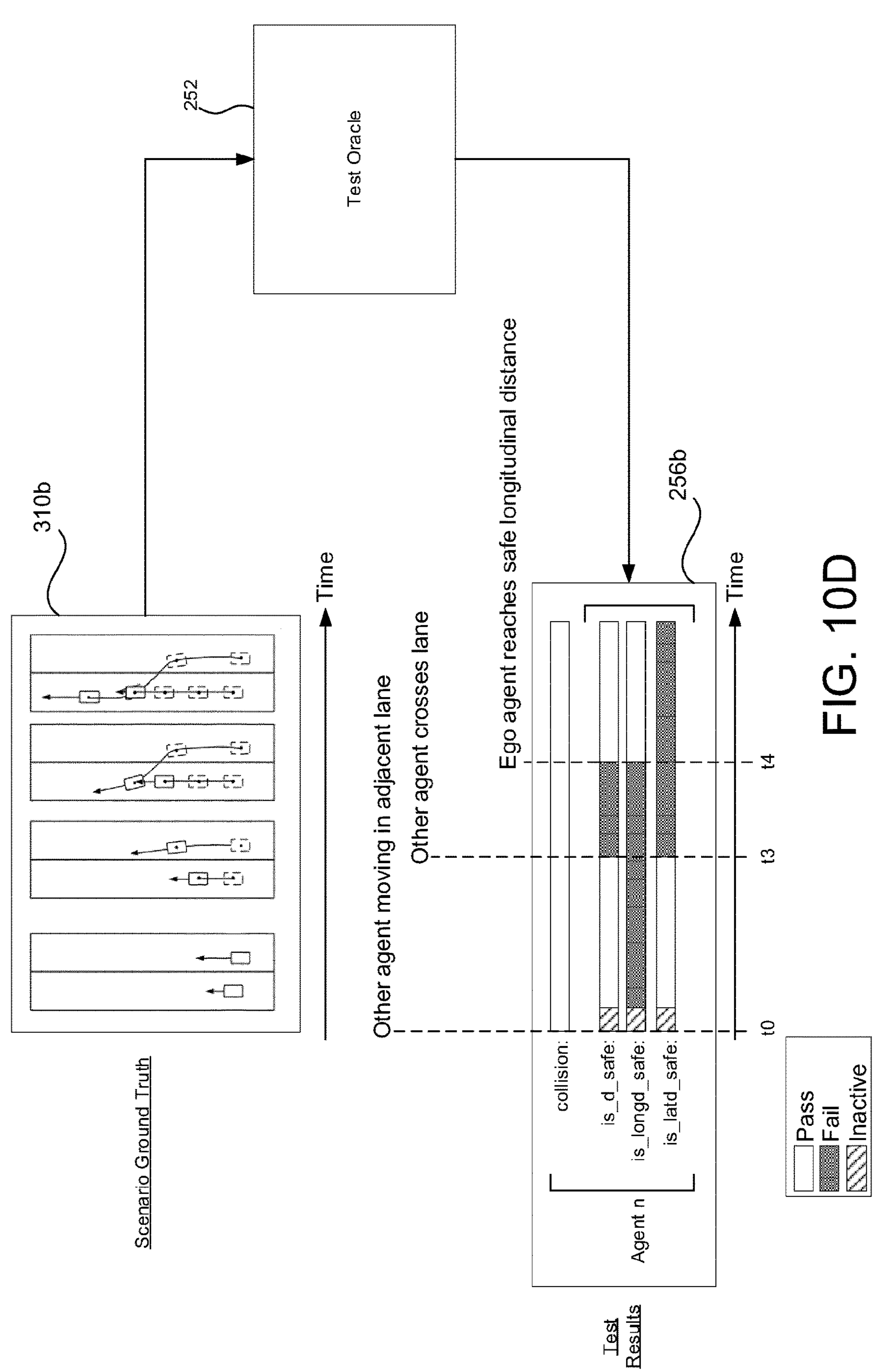
FIG. 10D shows an example oracle output for the second scenario instance.

FIG. 10D depicts an example of a second oracle output 256*b* obtained from ground truth 310*b* of the second scenario instance. In this case, the "no collision" rule is passed throughout. The safe distance rule is breached at time t3 when the lateral distance between the ego vehicle 602 and the other vehicle 604 becomes unsafe. However, at time t4, the ego vehicle 602 manages to reach a safe distance behind the other vehicle 604. Therefore, the safe distance rule is only failed between time t3 and time t4.

Perception Error Framework

As described above, both perception errors and driving rules can be assessed based on an extracted pseudo ground truth 144 determined by a ground-truthing pipeline 144, and presented in a GUI 500.

FIG. 11 shows an architecture for evaluating perception errors. A triage tool 152 comprising a perception oracle 1108 is used to extract and evaluate perception errors for both real and simulated driving scenarios, and outputs the results to be rendered in a GUI 500 alongside results from a test oracle 252. Note that while the triage tool 152 is referred to herein as a perception triage tool, it may be used more generally to extract and present driving data to a user, including perception data and driving performance data, that is useful for testing and improving an autonomous vehicle stack.

For real sensor data 140 from a driving run, the output of the online perception stack 102 is passed to the triage tool 152 to determine a numerical 'real-world' perception error 1102 based on the extracted ground truth 144 obtained by running both the real sensor data 140 and the online perception outputs through a ground truthing pipeline 400.

Similarly, for simulated driving runs, where the sensor data is simulated from scratch, and the perception stack is applied to the simulated sensor data, a simulated perception error 1104 is computed by the triage tool 152 based on a comparison of the detections from the perception stack with the simulation ground truth. However, in the case of simulation, the ground truth can be obtained directly from the simulator 202.

Where a simulator 202 models perception error directly to simulate the output of the perception stack, the difference between the simulated detections and the simulation ground truth, i.e. the simulated perception error 1110 is known, and this is passed directly to the perception oracle 1108.

The perception oracle 1108 receives a set of perception rule definitions 1106 which may be defined via a user interface or written in a domain specific language, described in more detail later. The perception rule definitions 1106 may apply thresholds or rules defining perception errors and their limits. The perception oracle applies the defined rules to the real or simulated perception errors obtained for the driving scenario and determines where perception errors have broken the defined rules. These results are passed to a rendering component 1120 which renders visual indicators of the evaluated perception rules for display in a graphical user interface 500. Note that the inputs to the test oracle are not shown in FIG. 11 for reasons of clarity, but that the test oracle 252 also depends on the ground truth scenario obtained from either the ground truthing pipeline 400 or the simulator 202.

Further details of a framework for evaluating perception errors of a real world driving stack against an extracted ground truth will now be described. As noted above, both perception errors and driving rule analysis by the test oracle 252 can be incorporated into a real-world driving analysis tool, which is described in more detail below.

Not all errors have the same importance. For example, a translation error of 10 cm in an agent ten metres from the ego is much more important than the same translation error for an agent one hundred metres away. A straightforward solution to this issue would be to scale the error based on the distance from the ego vehicle. However, the relative importance of different perception errors, or the sensitivity of the ego's driving performance to different errors, depends on the use case of the given stack. For instance, if designing a cruise control system to drive on straight roads, this should be sensitive to translation error but does not need to be particularly sensitive to orientation error. However, an AV handling roundabout entry should be highly sensitive to orientation errors as it uses a detected agent's orientation as an indicator for whether an agent is leaving the roundabout or not, and therefore whether it is safe to enter the roundabout. Therefore it is desirable to enable the sensitivity of the system to different perception errors to be configurable to each use case.

A domain specific language is used to define perception errors. This can be used to create a perception rule 1402 (see FIG. 14), for example by defining allowable limits for translation error. This rule implements a configurable set of safe levels of error for different distances from the ego. This is defined in a table 1400. For example, when the vehicle is less than ten meters away, the error in its position (i.e. the distance between the car's detection and the refined pseudo ground truth detection) can be defined to be no more than 10 cm. If the agent is one hundred meters away, the acceptable error may be defined to be up to 50 cm. Using lookup tables, rules can be defined to suit any given use case. More complex rules can be built based on these principles. For example, rules may be defined such that errors of other agents are completely ignored based on their position relative to the ego vehicle, such as agents in an oncoming lane in cases where the ego carriageway is separated from the oncoming traffic by a divider. Traffic behind the ego, beyond a defined cut-off distance, may also be ignored based on a rule definition.

A set of rules can then be applied together to a given driving scenario by defining a perception error specification 1600 which includes all the rules to be applied. Typical perception rules that may be included in a specification 1600 define thresholds on longitudinal and lateral translation errors (measuring mean error of the detection with respect to ground truth in the longitudinal and lateral directions, respectively), orientation error (defining a minimum angle that one needs to rotate the detection to line it up with the corresponding ground truth), size error (error on each dimension of the detected bounding box, or an intersection over union on the aligned ground truth and detected boxes to get a volume delta). Further rules may be based on vehicle dynamics, including errors in the velocity and acceleration of the agents, and errors in classifications, for example defining penalty values for misclassifying a car as a pedestrian or lorry. Rules may also include false positives or missed detections, as well as detection latency.

Based on the defined perception rules, it is possible to build a robustness score. Effectively, this can be used to say that if the detections are within the specified thresholds of the rules then the system should be able to drive safely, if they are not (e.g. they're too noisy) then something bad may happen that the ego vehicle may not be able to deal with, and this should be captured formally. Complex rule combinations can be included, for example to evaluate detections over time, and to incorporate complex weather dependencies.

These rules can be used to associate the errors with the playback of the scenario in the UI. As shown in FIG. 14, different perception rules appear with different colours in the timeline for that rule corresponding to different results from applying the given rule definition in the DSL. This is a main use case for the DSL (i.e. visualisation for the triage tool). The user writes the rule in the DSL and the rule appears in the timeline in the UI.

Figure 15:
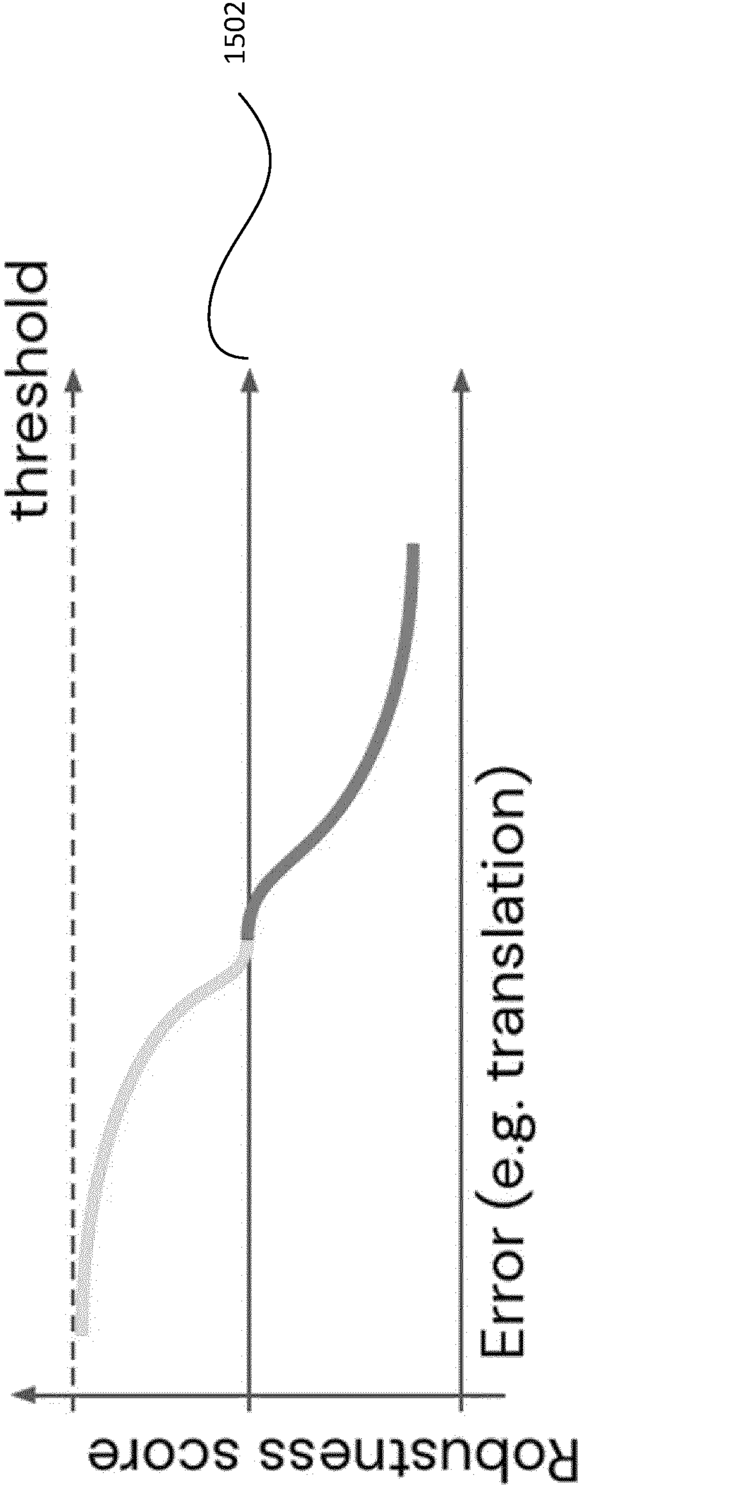
FIG. 15 shows an example graph of a numerical score for perception error with a defined error threshold.

The DSL can also be used to define a contract between the perception and planning stacks of the system based on a robustness score computed for the defined rules. FIG. 15 shows an example graph of a robustness score for a given error definition, for example a translation error. If the robustness score is above a defined threshold 1502, this indicates that the perception errors are within an expected performance, and the system as a whole should commit to drive safely. If the robustness score dips below the threshold as shown in FIG. 15, then the error is 'out-of-contract', as the planner 106 cannot be expected to drive safely for that level of perception error. This contract essentially becomes a requirement specification for the perception system. This can be used to assign blame to one of perception or planning. If an error is identified as in-contract when the car is misbehaving, then this points to issues with the planner rather than perception problems, and vice-versa for bad behaviour where perception is out-of-contract, the perception errors are responsible.

The contract information can be displayed in the UI 500, by annotating whether perception errors are deemed in-contract or out-of-contract. This uses a mechanism to take the contract spec from DSL and automatically flag out-of-contract errors in the front-end.

Figure 16:
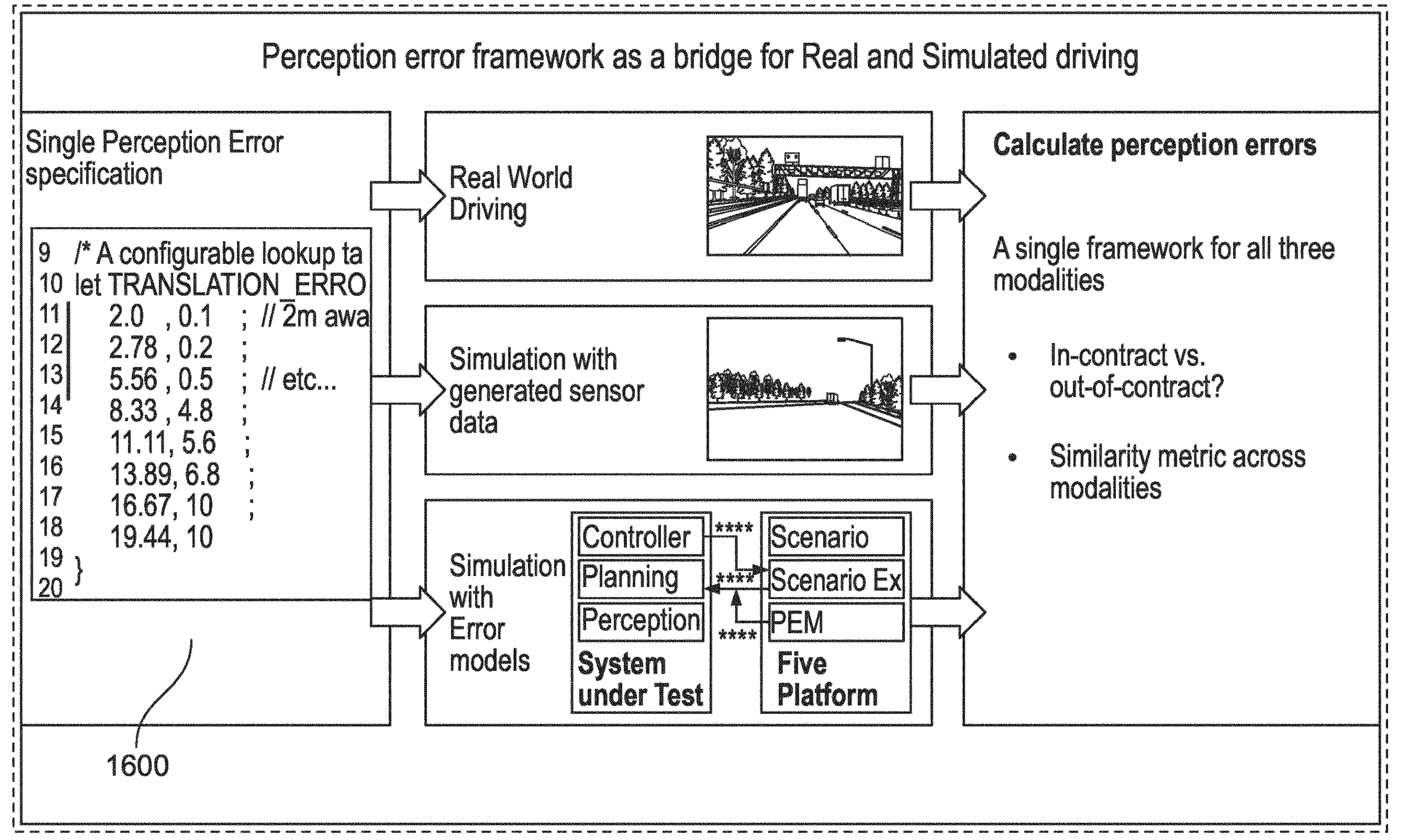
FIG. 16 shows how a single perception error specification may be applied to real and simulated driving scenarios.

FIG. 16 shows a third use case of unifying perception errors across different modalities (i.e. real world and simulation). The description above relates to real-world driving, where a real car drives around and collects data, and offline the refinement techniques and triage tool 152 calculate the perception errors, and whether these errors are in-contract or out-of-contract. However, the same perception error specification 1600 specifying perception error rules to evaluate errors can be applied to simulated driving runs. Simulation could be either of generating simulated sensor data to be processed by a perception stack, or by simulating detections directly from ground truth using perception error models, as described earlier with reference to FIG. 11.

In the first case, detections based on simulated sensor data 1112 will have errors 1104, and the DSL can be used to define whether these errors are in-contract or out-of-contract. This can also be done with simulation based on perception error models 208 (i.e. adding noise to an object list), where it's possible to calculate and verify the injected errors 1110 to check that the simulator 202 is modelling what is expected to be modelled. This can also be used to intentionally inject error that is in-contract rather than injecting out-of-contract errors, to avoid causing the stack to fail purely due to perception error. In one use-case, errors may be injected in simulation that are in-contract but towards the edge of the contract such that the planning systems can be verified to perform correctly given the expected perception performance. This decouples the development of the perception and planning because they can separately be tested against this contract and once the perception meets the contract and the planner works within the bound of the contract the systems should work together to a satisfactory standard.

Depending on where the perception model is sliced, if doing fusion for example, there may be little known about what comes out of the simulator so evaluating it for in-contract and out-of-contract errors is useful for analysing the simulated scenarios.

Another application of the DSL is assessing the accuracy of the pseudo ground truth 144 itself. It's not possible to get a perfect ground truth by refining imperfect detections, but there is probably an acceptable accuracy that the refinement pipeline needs to reach to be used reliably. The DSL rules can be used to assess the pseudo ground truth as it is at the current time, and determine how close to 'true' GT it is now and how much closer it needs to be in future. This may take the same contract that is used to check the online perception errors computed against the pseudo ground truth, but applying tighter bounds on the accuracy, such that there is sufficient confidence that the pseudo ground truth is 'correct' enough for the online detections to be assessed against. Acceptable accuracy for the pseudo ground truth can be defined as errors that are in-contract, when measured against a 'true' ground truth. It's acceptable to make some errors even after refinement, as long as within a certain threshold. Where different systems will have a different use case, each system will apply a different DSL rule set.

The 'true' ground truth against which the refined detections are assessed are obtained by selecting a real world dataset, manually annotating it, evaluating the pseudo GT against this manual GT according to the defined DSL rules and determining if acceptable accuracy has been achieved. Every time the refinement pipeline is updated, the accuracy assessment for the refined detections can be re-run to check that the pipeline is not regressing.

Figure 17:
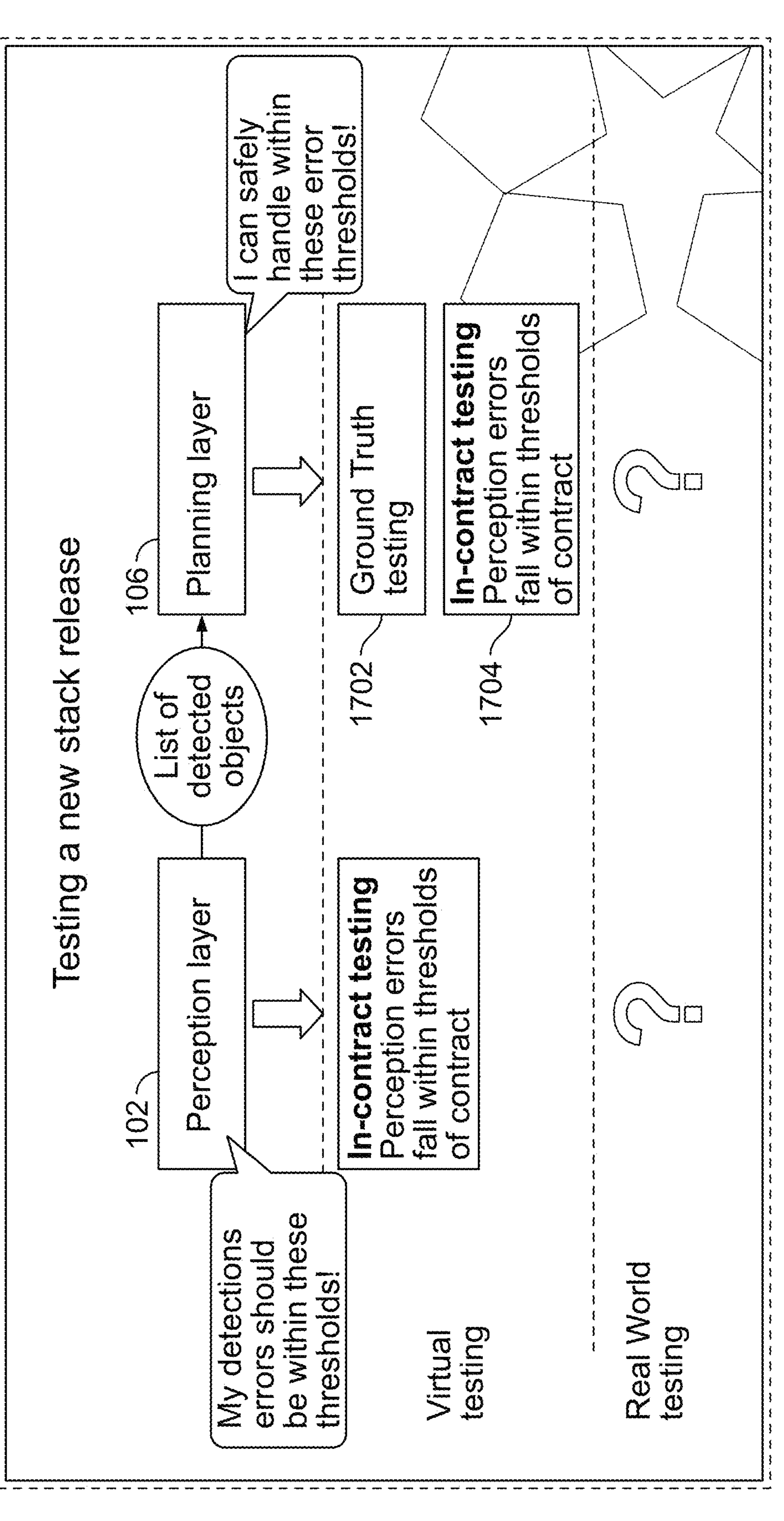
FIG. 17 shows how a defined perception error specification may be used in testing perception and planning stacks.

Another application of the DSL is that once a contract is defined between perception 102 and planning 106, it is possible to partition the type of testing that needs to be done at the perception layer. This is shown in FIG. 17. For example, the perception layer could be fed with a set of sensor readings which all contain errors that are supposed to be in-contract—the DSL rules can be applied to check if that's the case. Similarly for the planning layer, ground truth testing 1702 can be applied first, and if that passes, in-contract testing 1704 is applied, so the system is fed with an object list that has in-contract errors, and see if the planner behaves safely.

In one example testing scheme, a planner may be taken as 'given' and simulation may be used to generate perception errors and find the limits of the perception accuracy that would be acceptable for the planner to perform as intended. These limits can then be used to semi-automatically create a contract for the perception system. A set of perception systems may be tested against this contract to find the ones that meet it, or the contract may be used as a guide when developing a perception system.

Real-World Driving Analysis Tool

The testing frameworks described above, i.e. the test oracle 252 and perception triage tool 152, may be combined in a real-world driving analysis tool in which both perception and driving evaluation are applied to a perception ground truth extracted from a ground truth pipeline 400, as shown in FIG. 2C.

Figure 12A:
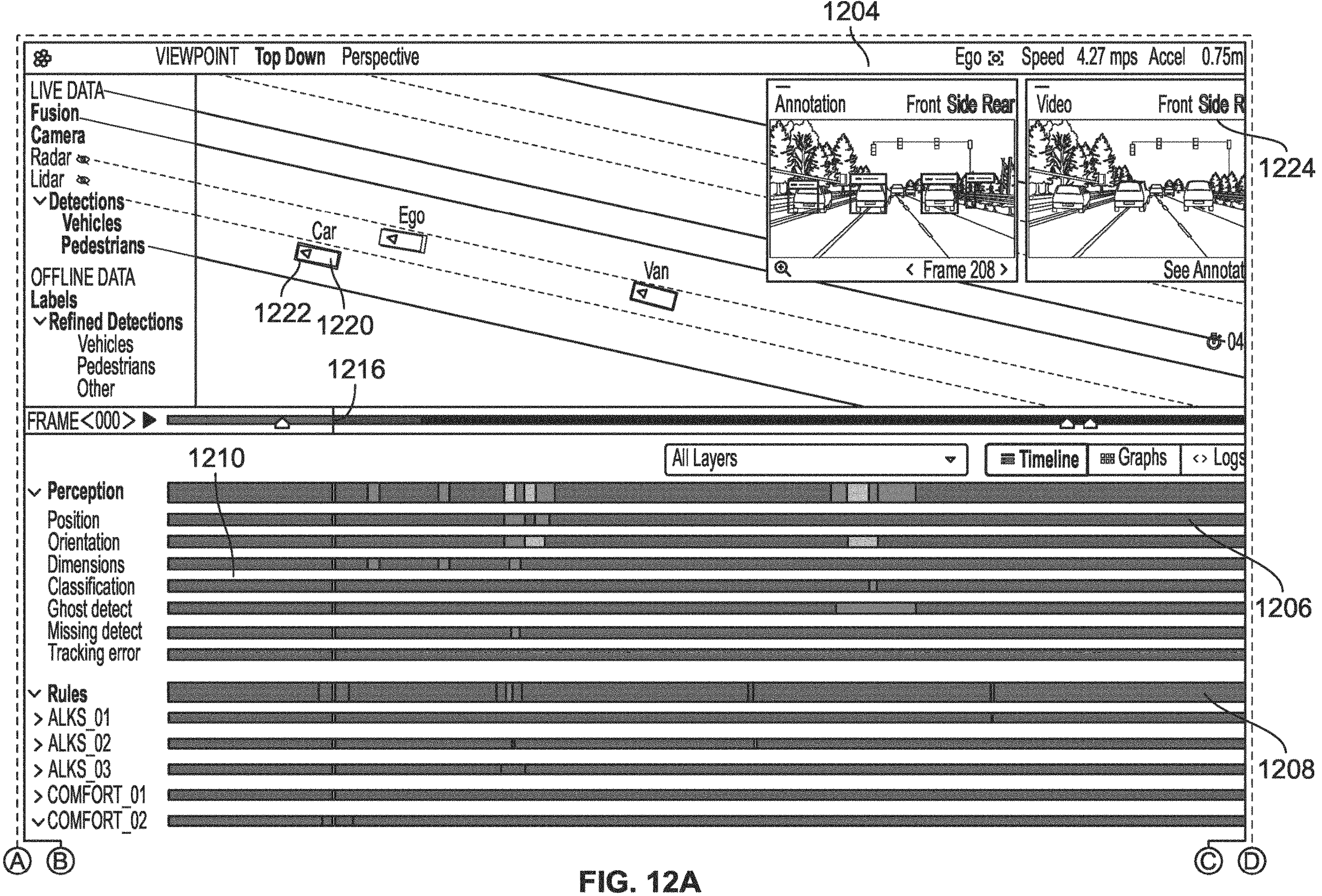
FIG. 12A shows an example graphical user interface for a triage tool.
Figure 12A:
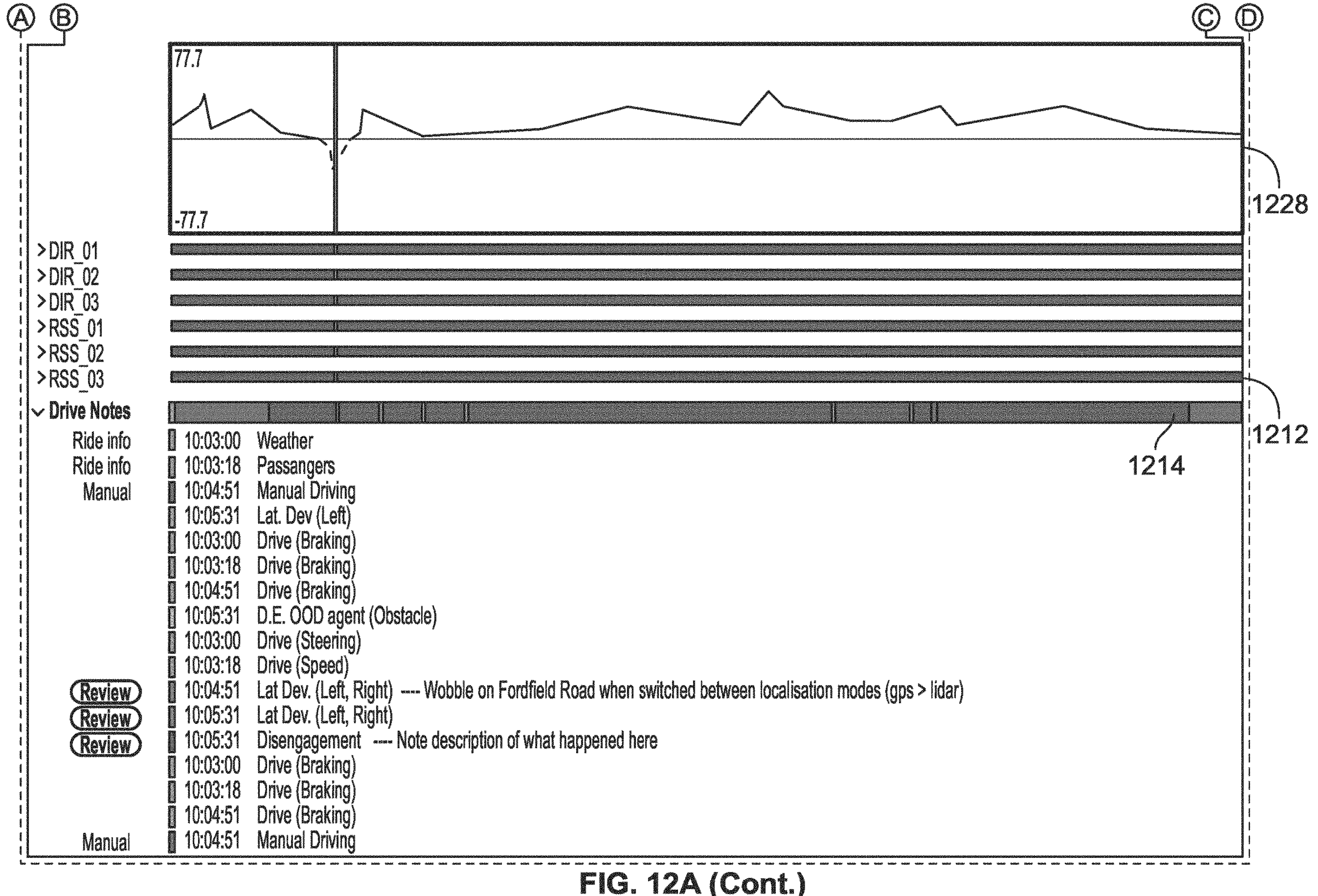
Figure 12B:
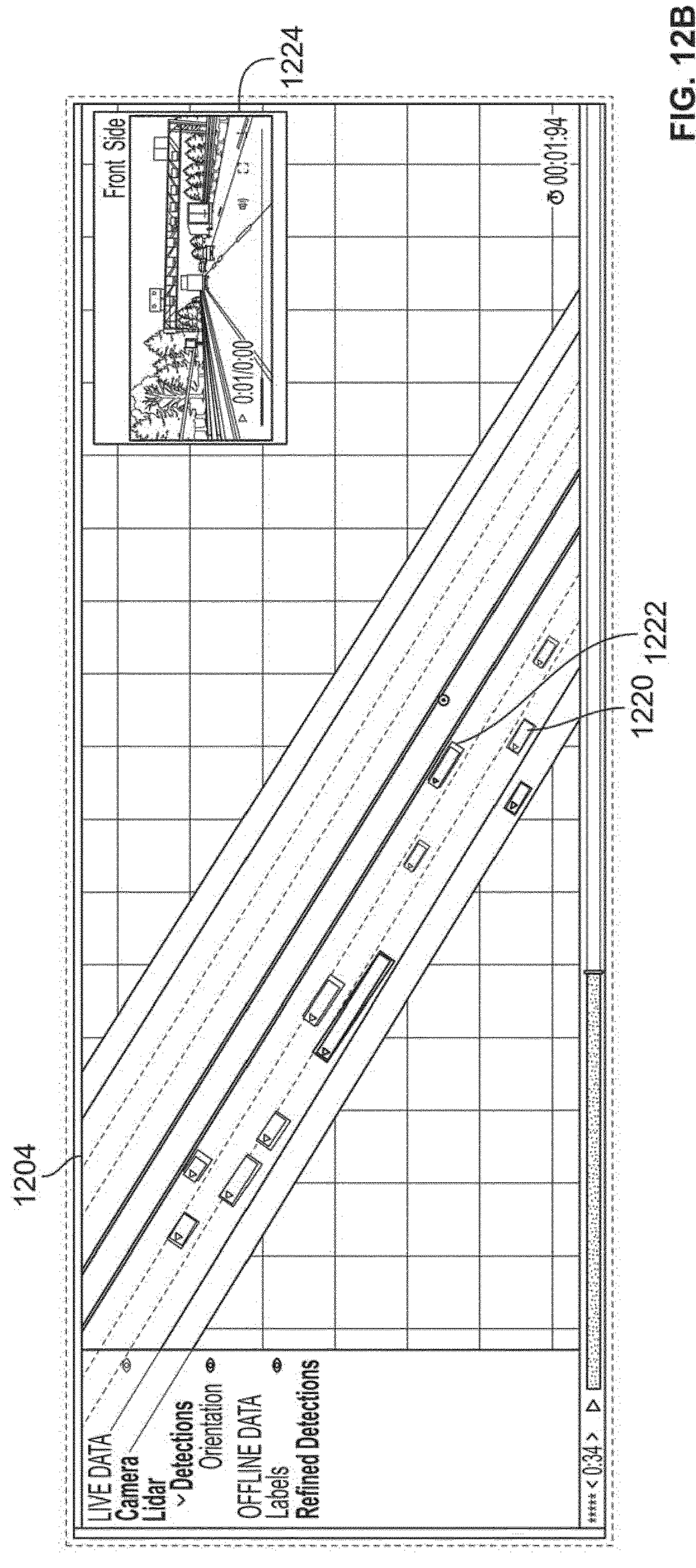
FIG. 12B shows a schematic representation of a driving scenario including sensor data displayed in a graphical user interface.

FIG. 12A shows an example user interface for analysing a driving scenario extracted from real-world data. In the example of FIG. 12A, an overhead schematic representation 1204 of the scene is shown based on point cloud data (e.g. lidar, radar, or derived from stereo or mono depth imaging) with the corresponding camera frames 1224 shown in an inset. Road layout information may be obtained from high-definition map data. Camera frames 1224 may also be annotated with detections. The UI may also show sensor data collected during driving, such as lidar, radar or camera data. This is shown in FIG. 12B. The scene visualisation 1204 is also overlaid with annotations based on the derived pseudo ground truth as well as the detections from the on-board perception components. In the example shown there are three vehicles, each annotated by a box. The solid boxes 1220 show the pseudo ground truth for the agents of the scene, while the outlines 1222 show the unrefined detections from the ego's perception stack 102. A visualisation menu 1218 is shown in which a user can select which sensor data, online and offline detections to display. These may be toggled on and off as needed. Showing the real sensor data alongside both the vehicle's detections and the ground truth detections may allow a user to identify or confirm certain errors in the vehicle's detection. The UI 500 allows playback of the selected footage and a timeline view is shown where a user can select any point 1216 in the footage to show a snapshot of the bird's eye view and camera frames corresponding to the selected point in time.

As described above, the perception stack 102 can be assessed by comparing the detections with the refined pseudo ground truth 144. The perception is assessed against defined perception rules 1106, which can depend on the use case of the particular AV stack. These rules specify different ranges of values for discrepancies between the location, orientation, or scale of the car's detections and those of the pseudo ground truth detections. The rules can be defined in a domain specific language (described above with reference to FIG. 14). As shown in FIG. 12A, different perception rule outcomes are shown along a 'top-level' perception timeline 1206 of the driving scenario, which aggregates the results of perception rules, with periods on the timeline flagged when any perception rules are broken. This can be expanded to show a set of individual perception rule timelines 1210 for each defined rule.

The perception error timelines may be 'zoomed out' to show a longer period of the driving run. In a zoomed out view, it may not be possible to display perception errors at the same granularity as when zoomed in. In this case the timelines may display an aggregation of perception errors over time windows to provide a summarised set of perception errors for the zoomed-out view.

A second driving assessment timeline 1208 shows how the pseudo ground truth data is assessed against driving rules. The aggregated driving rules are displayed in a top-level timeline 1208, which can be expanded out to a set of individual timelines 1212 displaying the performance against each defined driving rule. Each rule timeline can be further expanded as shown to display a plot 1228 of numerical performance scores over time for the given rule. This corresponds to the selectable element 534*b* described earlier with reference to FIG. 9C. In this case, the pseudo ground truth detections are taken as the actual driving behaviour of the agents in the scene. The ego behaviour can be evaluated against defined driving rules, for example based on the Digital Highway Code, to see if the car behaved safely for the given scenario.

In summary, both the perception rule evaluation and driving assessment are based on using the offline perception methods described above to refine the detections from real-world driving. For driving assessment, the refined pseudo ground truth 144 is used to assess ego behaviour against the driving rules. As shown in FIG. 2C, this can also be used to generate simulated scenarios for testing. For perception rule evaluation, the perception triage tool 152 compares the recorded vehicle detections vs. the offline refined detections to quickly identify and triage likely perception failures.

Drive notes may also be displayed in a driver notes timeline view 1214, in which notable events flagged during the drive may be displayed. For example, the drive notes will include points at which the vehicle brakes or turns, or when a human driver disengages the AV stack.

Additional timelines may be displayed in which user defined metrics are shown to help the user to debug and triage potential issues. User-defined metrics may be defined both to identify errors or stack deficiencies, as well as to triage errors when they occur. The user may define custom metrics depending on the goal for the given AV stack. Example user-defined metrics may flag when messages arrive out-of-order, or message latency of perception messages. This is useful for triage as it may be used to determine if a planning occurred due to a mistake of the planner or due to messages arriving late or out-of-order.

FIG. 12B shows an example of the UI visualisation 1204 in which sensor data is displayed, with a camera frame 1224 displayed in an inset view. Typically, sensor data is shown from a single snapshot in time. However, each frame may show sensor data aggregated over multiple time steps to get a static scene map in the case where high definition map data is not available. As shown on the left, there are a number of visualisation options 1218 to display or hide data such as camera, radar or lidar data collected during the real-life scenario, or the online detections from the ego vehicle's own perception. In this example, the online detections from the vehicle are shown as outlines 1222 overlaid on top of the solid boxes 1220 representing the ground truth refined detections. An orientation error can be seen between the ground truth and the vehicle's detections.

The refinement process carried out by the ground truthing pipeline 400 is used to generate a pseudo ground truth 144 as a basis for multiple tools. The UI shown displays results from the perception triage tool 152, which allows assessing the driving ability of ADAS for single driving example using the test oracle 252, detecting defects, extracting a scenario to replicate the issue (see FIG. 2C) and sending the identified issues to a developer to improve the stack.

Figure 12C:
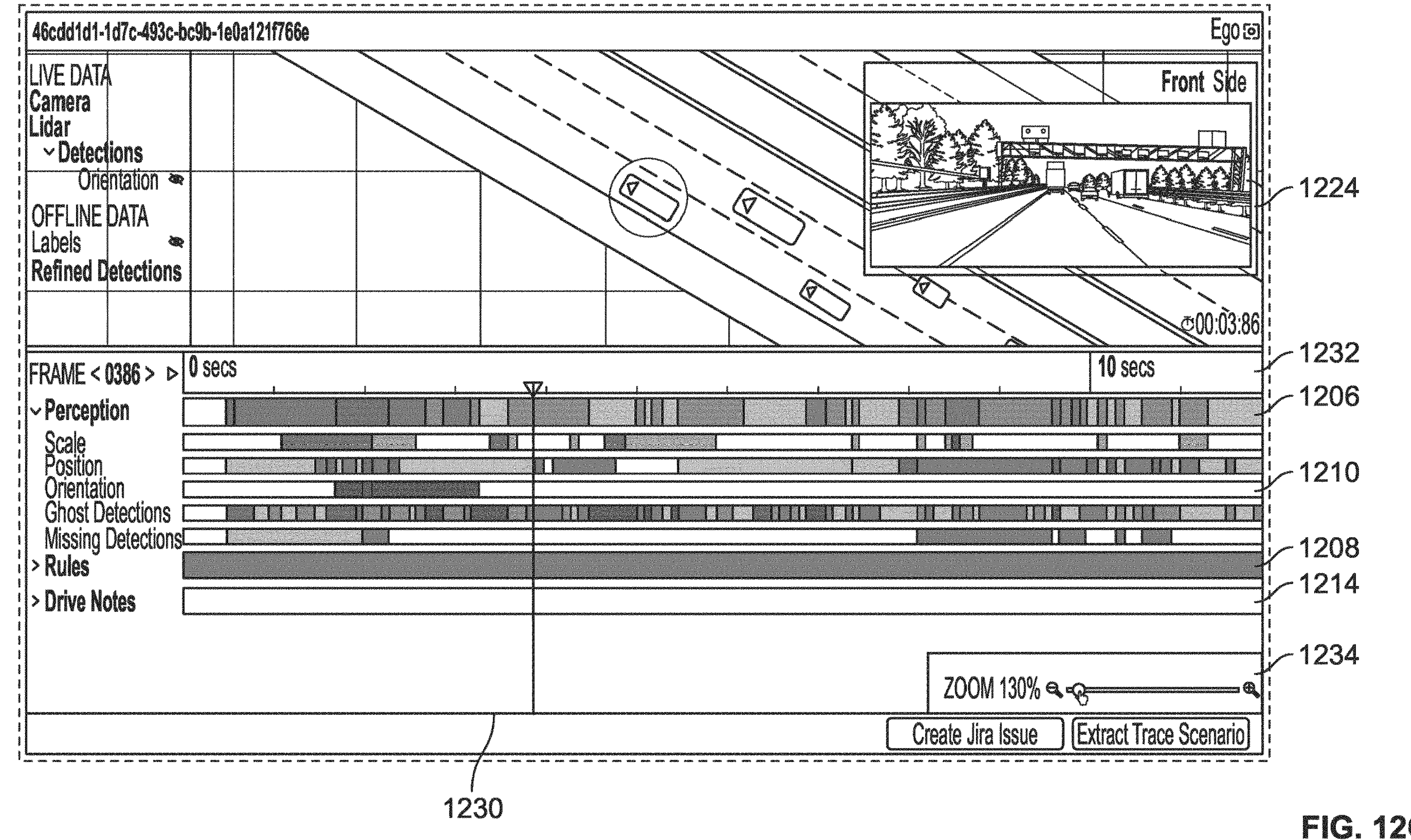
FIG. 12C shows an example user interface having zoom functionality and a timeline scrubber.

FIG. 12C shows an example user interface configured to enable the user to zoom in on a subsection of the scenario. FIG. 12C shows a snapshot of a scenario, with a schematic representation 1204 as well as camera frames 1224 shown in an inset view, as described above for FIG. 12A. A set of perception error timelines 1206, 1210 as well as an expandable driving assessment timeline 1208 and driver notes timeline 1214, as described above are also shown in FIG. 12C.

In the example shown in FIG. 12C, the current snapshot of the driving scenario is indicated by a scrubber bar 1230 which extends across all the timeline views simultaneously. This may be used instead of an indication 1216 of the current point in the scenario on a single playback bar. A user can click on the scrubber bar 1230 in order to select and move the bar to any point in time for the driving scenario. For example, a user may be interested in a particular error, such as a point within a section coloured red or otherwise indicated as a section containing an error on a position error timeline, wherein the indication is determined based on the positional error observed at that time between the 'ground truth' and the detections at the period of time corresponding to the indicated sector. The user can click on the scrubber bar and drag the bar to the point of interest within the position error timeline. Alternatively, the user can click on a point on any of the timelines across which the scrubber extends in order to place the scrubber at that point. This updates the schematic view 1204 and the inset view 1224 to show the respective top-down schematic view and camera frame corresponding to the selected point in time. The user can then inspect the schematic view and available camera data or other sensor data to see the positional error and identify possible reasons for the perception error.

A 'ruler' bar 1232 is shown above the perception timeline 1206 and below the schematic view. This contains a series of 'notches' indicating time intervals of the driving scenario. For example, where a time interval of ten seconds is displayed in the timeline view, notches indicating intervals of one second are shown. Some time points are also labelled with a numerical indicator e.g. '0 secs', '10 secs', etc.

A zoom slider 1234 is provided at the bottom of the user interface. The user can drag an indicator along the zoom slider to change the portion of the driving scenario which is shown on the timeline. Alternatively, the position of the indicator may be adjusted by clicking on the desired point on the slider bar to which the indicator should be moved. A percentage is shown to indicate the level of zoom currently selected. For example, if the full driving scenario is 1 minute long, the timelines 1206,1208,1214 show the respective perception errors, driving assessment and driver notes over the 1 minute of driving, and the zoom slider shows 100%, with the button being at the leftmost position. If the user slides the button until the zoom slider shows 200%, then the timelines will be adjusted to only show results corresponding to a thirty second snippet of the scenario.

The zoom may be configured to adjust the displayed portion of the timelines in dependence on the position of the scrubber bar. For example, where the zoom is set to 200% for a one minute scenario, the zoomed-in timelines will show a thirty second snippet in which the selected time point at which the scrubber is positioned is centred—i.e. fifteen seconds of the timeline is shown before and after the point indicated by the scrubber. Alternatively, the zoom may be applied relative to a reference point such as the start of the scenario. In this case, a zoomed-in snippet shown on the timelines after zooming always starts at the start of the scenario. The granularity of notches and numerical labels of the ruler bar 1232 may be adjusted depending on the degree to which the timelines are zoomed in or out. For example, where a scenario is zoomed in from 30 seconds to show a snippet of 3 seconds, numerical labels may be displayed before zooming at 10 second intervals with notches at one second intervals, and after zooming, the numerical labels may be displayed at one second intervals and notches displayed at 100 ms intervals. The visualisations of timesteps in timelines 1206,1208,1214 are 'stretched' to correspond to the zoomed-in snippet. A higher level of detail may be displayed on the timelines in a zoomed-in view as smaller snippets in time are representable by a larger area in the display of the timeline within the UI. Therefore, errors spanning a very short time within a longer scenario may only become visible in the timeline view once zoomed in.

Other zoom inputs may be used to adjust the timeline to display shorter or longer snippets of a scenario. For example, where the user interface is implemented on a touch screen device, the user may apply a zoom to the timelines by applying a pinch gesture. In another example, a user may scroll a scroll wheel of a mouse forwards or backwards to change the zoom level.

Where the timeline is zoomed in so as to only show a subset of the driving scenario, the timeline can be scrolled in time to shift the displayed portion in time, so that different parts of the scenario may be inspected by the user in the timeline view. The user can scroll by clicking and dragging a scroll bar (not shown) at the bottom of the timeline view, or for example using a touch pad on the relevant device on which the UI is running.

Figure 12D:
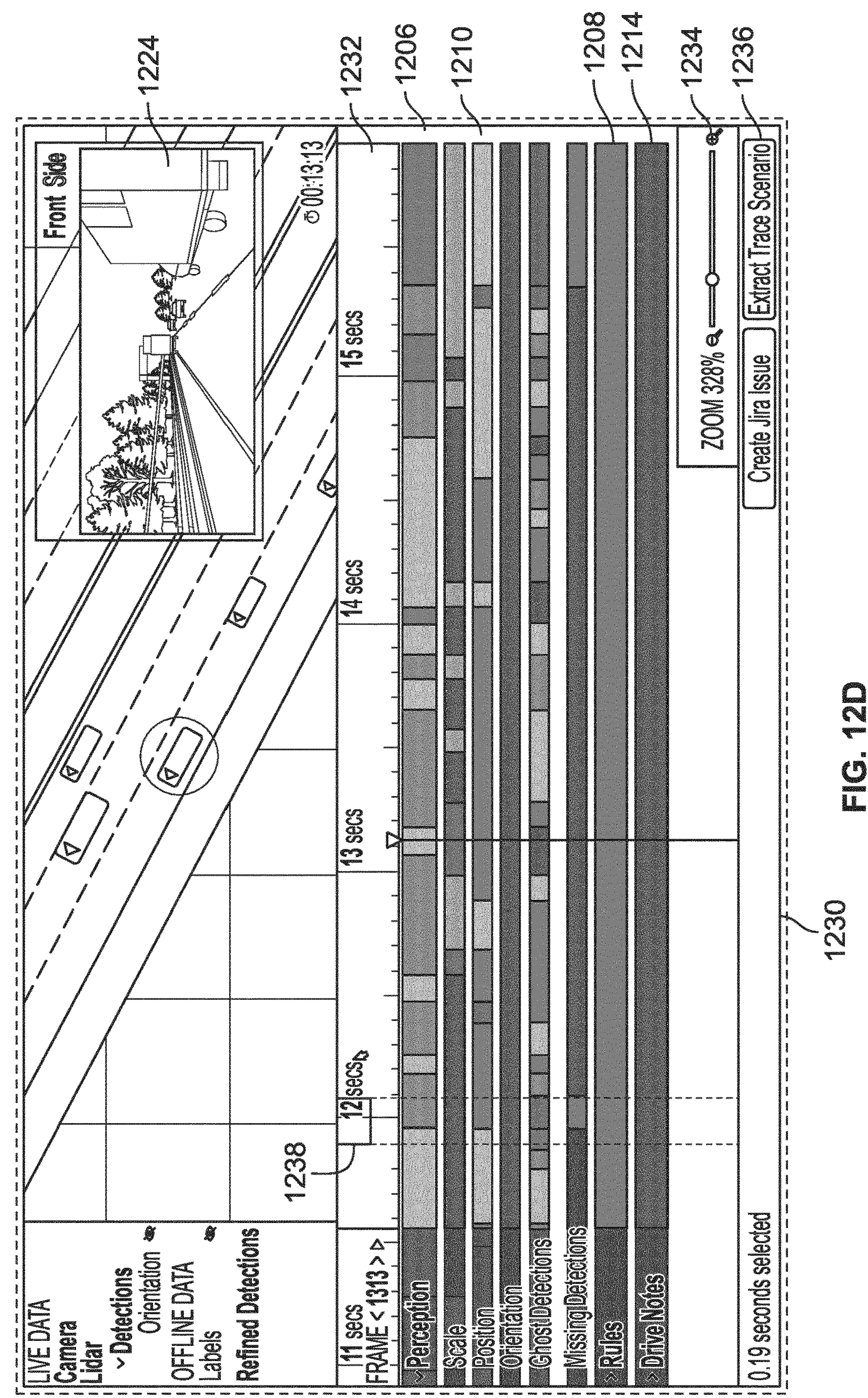
FIG. 12D shows the selection of a subsection of a scenario in the user interface.

A user can also select snippets of the scenario, for example to be exported for further analysis or as a basis for simulation. FIG. 12D shows how a section of a driving scenario can be selected by the user. The user can click with the cursor on a relevant point on the ruler bar 1232. This can be done at any level of zoom. This sets a first limit on a user selection. The user drags the cursor along the timeline in order to extend the selection to a chosen point in time. If zoomed in, by continuously dragging to the end of the displayed snippet of the scenario, this scrolls the timelines forward and allows the selection to be further extended. The user can stop dragging at any point, where the point at which the user stops is the end limit on the user selection. A bar 1230 at the bottom of the user interface displays the length in time of the selected snippet and this value is updated as the user drags the cursor to extend or reduce the selection. The selected snippet 1238 is shown as a shaded section on the ruler bar. A number of buttons 1236 are shown which provide user actions such as 'Extract Trace Scenario' to extract the data corresponding to the selection. This may be stored in a database of extracted scenarios. This may be used for further analysis or as a basis to simulate similar scenarios. After making a selection, the user can zoom in or out and the selection 1238 on the ruler bar 1232 also stretches or contracts along with the ruler and perception, driving assessment and drive note timelines.

The pseudo ground truth data can also be used with a data exploration tool to search for data within the database. This tool can be used when a new version of an AV stack is deployed. For a new version of the software, the car could be driven for a period (e.g. a week) to collect data. Within this data, the user might be interested in testing how the car behaves for particular conditions, and so may provide a query, e.g. 'show me all night time driving', or 'show me when it was raining', etc. The data exploration tool will pull out the relevant footage and can then use the triage tool to investigate. The data exploration tool acts as a kind of entry point for further analysis.

A further assessment tool may be used, for example once a new software version has been implemented and the AV has been driven for a while and has collected a certain amount of data, to aggregate the data to get an idea of the aggregate performance of the car. This car might have a set of features newly developed, e.g. use of indicators, and entering and exiting the roundabout, want an aggregate performance evaluation of how well the car behaves on these features.

Finally, a re-simulation tool can be used to run an open-loop simulation by running the sensor data on a new stack to check for regression issues.

Figure 13:
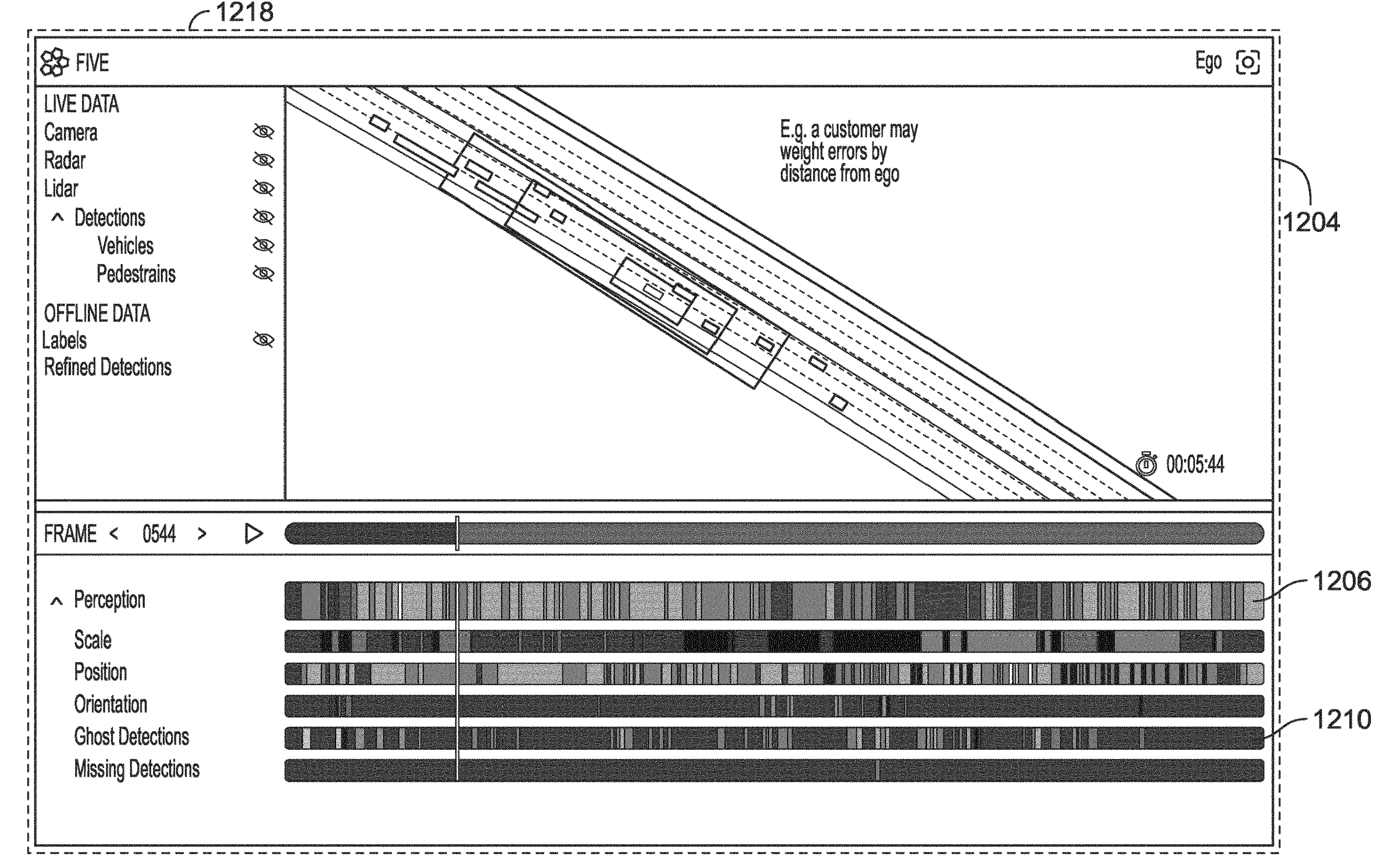
FIG. 13 shows a focused view of the graphical user interface showing perception rules.

FIG. 13 shows an example user interface for the perception triage tool 152, with a focused view on the scenario visualisation 1204 and the perception error timelines 1206, 1210. As shown on the left, there are a number of visualisation options 1218 to display or hide data such as camera, radar or lidar data collected during the real-life scenario, or the online detections from the ego vehicle's own perception. In this case, the visualisation is limited to only refined detections, i.e. only agents that were detected offline with the refinements shown as solid boxes. Each solid box has an associated online detection (not shown) which is how the agent was perceived before error correction/refinement at that snapshot in time. As described above, there is a certain amount of error between the ground truth 144 and the original detection. A variety of errors can be defined including errors in scale, position and orientation of agents in the scene, as well as false positive 'ghost' detections and missed detections.

As described above, not all errors have the same importance. The DSL for perception rules allows definition of rules according to the required use case. For instance, if designing a cruise control system to drive on straight roads, this should be sensitive to translation error but does not need to be particularly sensitive to orientation error. However, an AV handling roundabout entry should be highly sensitive to orientation errors as it uses a detected agent's orientation as an indicator for whether an agent is leaving the roundabout or not, and therefore whether it is safe to enter the roundabout. The perception error framework allows separate tables and rules to be defined indicating the relative importance of a given translation or orientation error for that use case. The boxes shown around the ego vehicle in FIG. 13 are for illustrative purposes to show the areas of interest that a perception rule may be defined to target. The rule evaluation results may be displayed in the user interface within the perception error timelines 1210. Visual indicators of rules may also be displayed in the schematic representation 1204, for example by flagging areas in which a particular rule is defined; this is not shown in FIG. 13.

As well as displaying results for single snapshots of a driving run, querying and filtering may be applied to filter the data according to the perception evaluation results, and to provide more context to a user performing analysis.

Figure 18A:
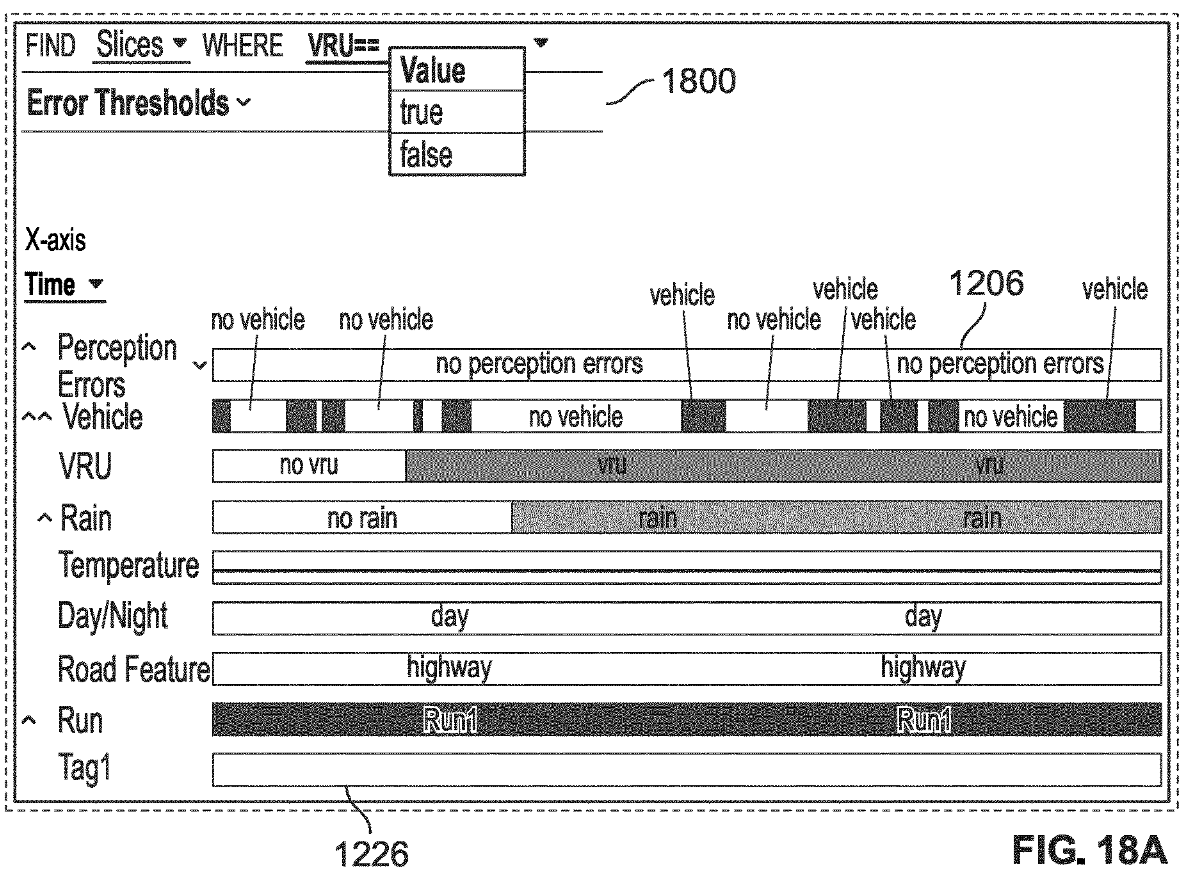
FIGS. 18A and 18B show a filtering tool applied to identify relevant errors of a scenario.
Figure 18B:
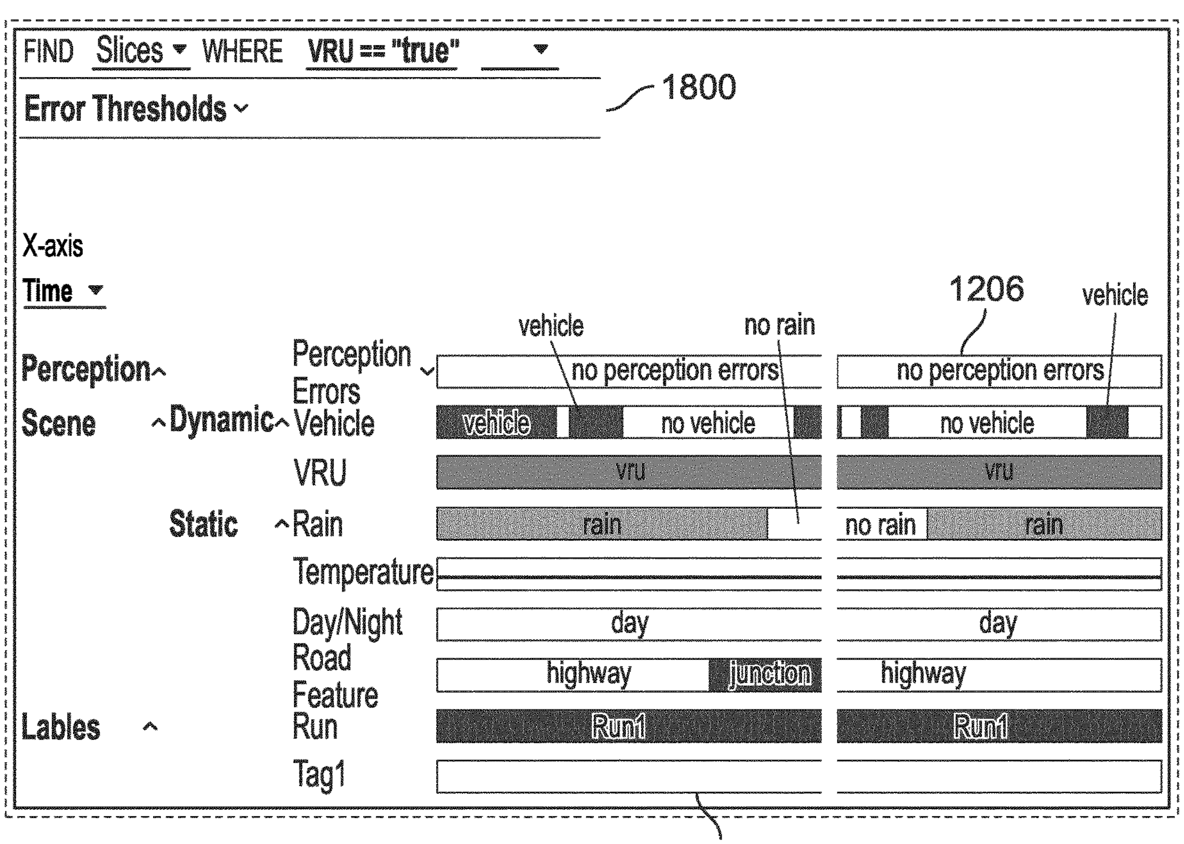

FIGS. 18A and 18B show an example of a graphical user interface 500 for filtering and displaying perception results for a real-life driving run. For the given run, a perception error timeline 1206 with aggregated rule evaluation for all perception errors is displayed as described previously. A second set of timelines 1226 may be shown indicating features of the driving scene, such as weather conditions, road features, other vehicles and vulnerable road users. These may be defined within the same framework used to define perception error rules. Note that perception rules may be defined such that different thresholds are applied in dependence on different driving conditions. FIG. 18A also shows a filtering feature 1800 in which a user can select queries to apply to the evaluation. In this example, the user query is to find 'slices' of the driving run in which a vulnerable road user (VRU) is present.

The query is processed and used to filter the frames of the driving scenario representation for those in which a vulnerable road user is tagged. FIG. 18B shows an updated view of the perception timeline after the filter is applied. As shown, a subset of the original timeline is shown, and in this subset a vulnerable user is always present as indicated in the 'VRU' timeline.

Figure 19A:
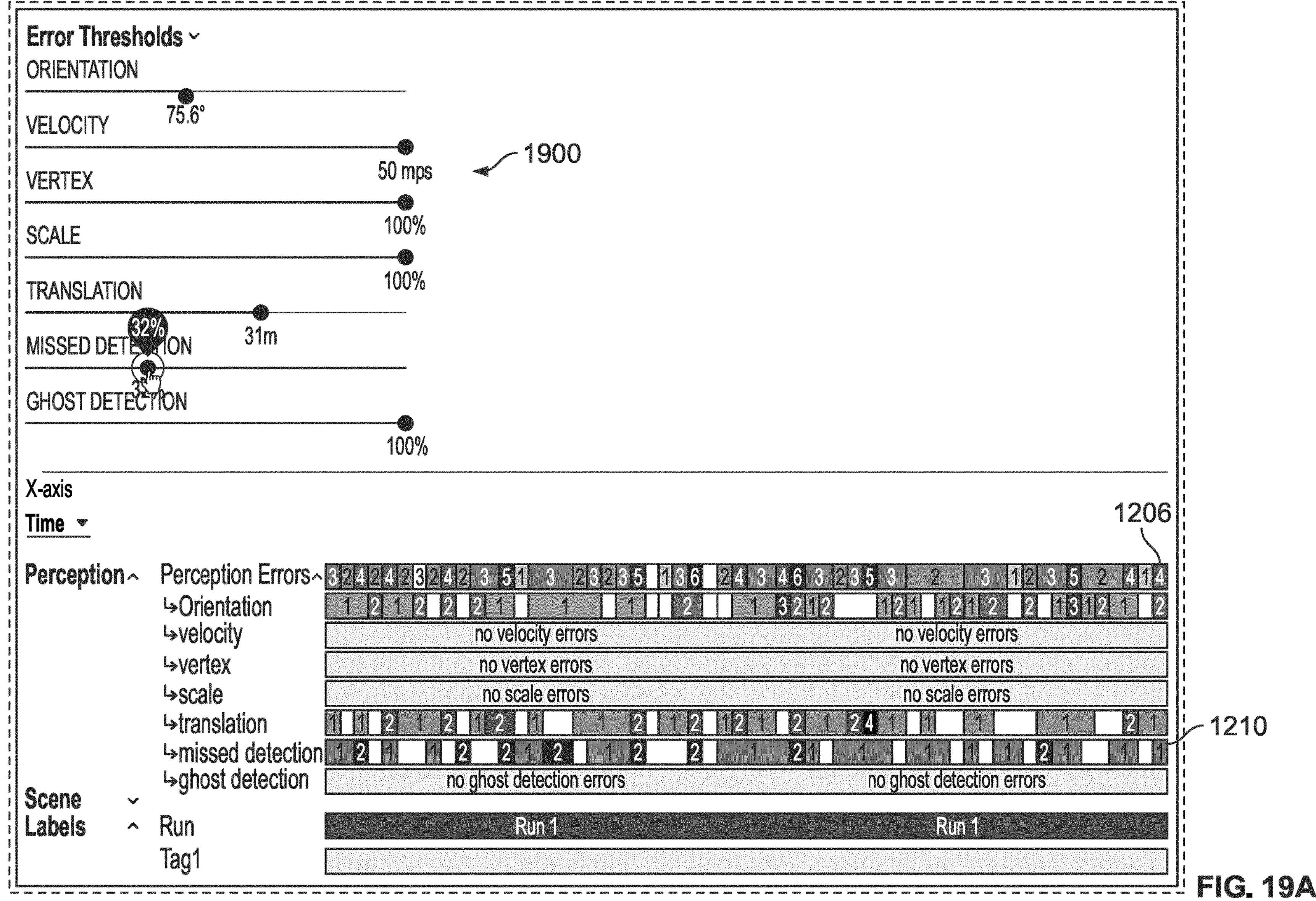
FIG. 19A shows how error thresholds may be adjusted via a graphical user interface.

FIG. 19A shows another feature which may be used to perform analysis within the graphical user interface 500. A set of error threshold sliders 1900 are shown, which the user can adjust. The range of errors may be informed by the perception error limits defined in the DSL for perception rules. The user may adjust a threshold for a given error by sliding the marker to the desired new threshold value for that error. For example, the user may set a threshold for failure on a translation error of 31 m. This threshold could then be fed back to the translation error defined within the perception rule specification written in the perception rule DSL described earlier, to adjust the rule definition to take the new threshold into account. The new rule evaluations are passed to the front end and the rule failures now occurring for the new thresholds are indicated in the expanded timeline view 1210 for the given error. As shown in FIG. 19A, decreasing the threshold for unacceptable error values causes more errors to be flagged in the timeline.

Figure 19B:
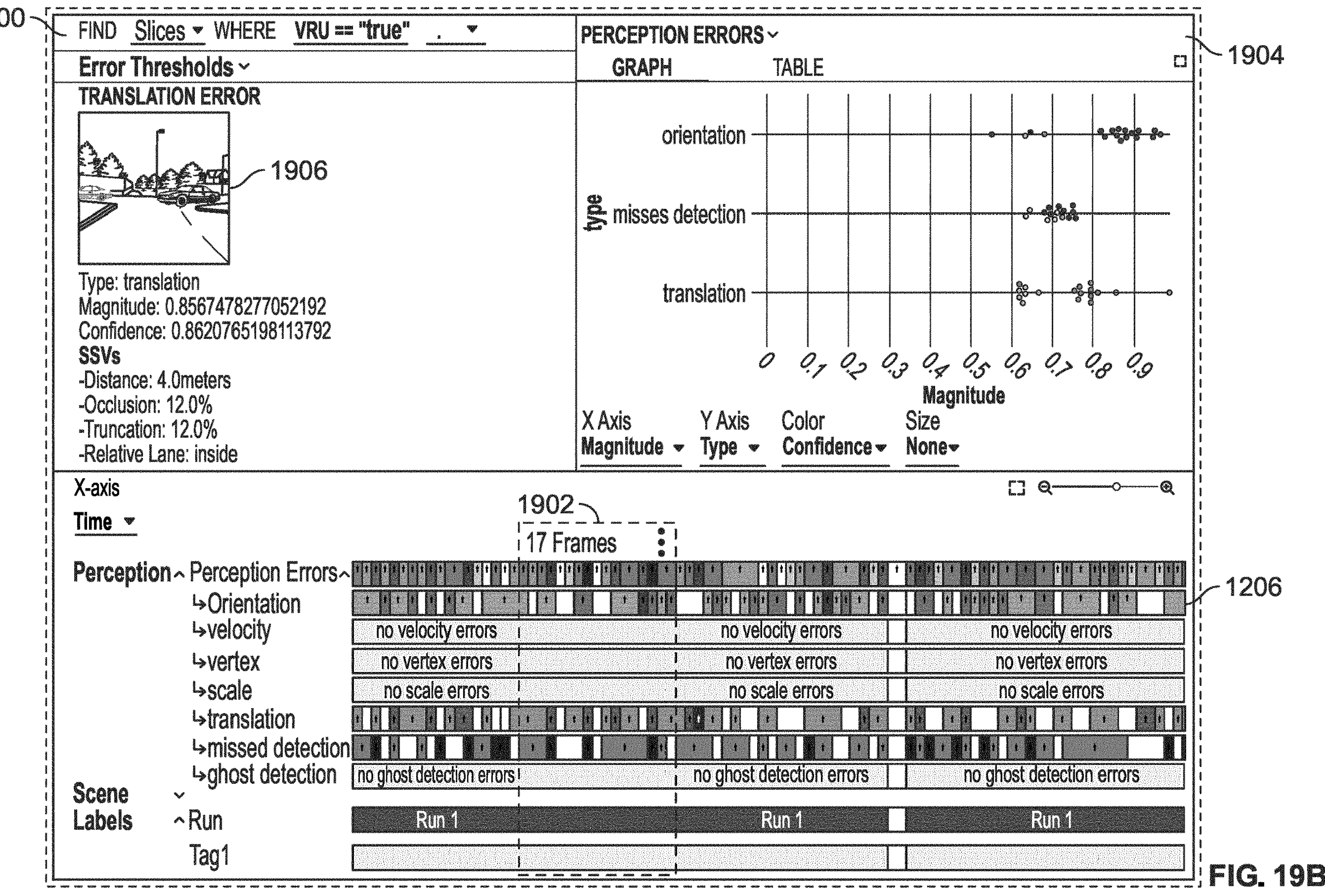
FIG. 19B shows the selection and analysis of a 'slice' of a driving scenario.

FIG. 19B shows how aggregate analysis may be applied to selected slices of a driving scenario to allow a user to select and inspect the most relevant frames based on the computed perception errors. As described earlier, the user can filter the scenario to only show those frames in which a vulnerable road user is present, using the filtering feature 1800. Within the matching frames, a user can further 'slice' the scenario to a particular snippet, using a selection tool 1902 which can be dragged along the timeline 1206 and expanded to cover the period of interest. For the selected snippet, some aggregate data may be displayed to the user in a display 1904. Various attributes of the perception errors captured within the selected snippet may be selected and graphed against each other. In the example shown, the type of error and magnitude of error are graphed, allowing the user to visualise the most significant errors of each type for the selected part of the scenario. The user may select any point on the graph to display a camera image 1906 for the corresponding frame in which that error occurred, along with other variables of the scene such as occlusion, and the user can inspect the frame for any factors which may have caused the error.

The ground truthing pipeline 400 may be used alongside the perception triage tool 152 and test oracle 252 as well as further tools to query, aggregate and analyse the vehicle's performance, including the data exploration and aggregate assessment tools mentioned above. The graphical user interface 500 may display results from these tools in addition to the snapshot view described above.

Whilst the above examples consider AV stack testing, the techniques can be applied to test components of other forms of mobile robot. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

References herein to components, functions, modules and the like, denote functional components of a computer system which may be implemented at the hardware level in various ways. A computer system comprises execution hardware which may be configured to execute the method/algorithmic steps disclosed herein and/or to implement a model trained using the present techniques. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer readable instructions held in memory coupled to or internal to the processor and carry out the relevant steps in accordance with those instructions. Other forms of programmable processors include field programmable gate arrays (FPGAs) having a circuit configuration programmable through circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like). The subsystems 102-108 of the runtime stack FIG. 2A may be implemented in programmable or dedicated processor(s), or a combination of both, on-board a vehicle or in an off-board computer system in the context of testing and the like. The various components of the figures, including FIG. 11 and FIG. 6, such as the simulator 202 and the test oracle 252 may be similarly implemented in programmable and/or dedicated hardware.

The invention claimed is:

1. A computer-implemented method for assessing autonomous vehicle performance, the method comprising:

receiving performance data of at least one autonomous driving run, the performance data comprising at least one time series of perception errors and at least one time series of driving performance results, wherein the at least one time series of perception errors are generated by a real-time perception system during the at least one autonomous driving run; and generating rendering data for rendering a graphical user interface, the graphical user interface for visualizing the performance data and comprising:

(i) a perception error timeline, and (ii) a driving assessment timeline, wherein the timelines are aligned in time, and divided into multiple time steps of the at least one autonomous driving run, wherein, for each time step: the perception error timeline comprises a visual indication of whether a perception error occurred at that time step, and the driving assessment timeline comprises a visual indication of driving performance at that time step.

2. The method of claim 1, wherein the perception error timeline and the driving assessment timeline are mutually parallel.

3. The method of claim 1, wherein the driving performance is assessed with respect to one or more predefined driving rule(s).

4. The method of claim 3, wherein the driving assessment timeline aggregates driving performance across multiple individual driving rules, and wherein the driving assessment timeline is expandable to view respective driving assessment timelines for individual driving rules.

5. The method of claim 3, wherein the driving assessment timeline is expandible to view a computational graph representation of a driving rule.

6. The method of claim 3, wherein one or more of the at least one autonomous driving run is a real-world run, with driving rules applied to real-world trace(s).

7. The method of claim 1, wherein a ground truthing pipeline is used to extract ground truth perception outputs, and wherein the ground truth perception outputs are used to determine perception errors and to assess driving performance.

8. The method of claim 7, wherein the ground truthing pipeline is automated.

9. The method of claim 1, wherein at least some perception errors are identified without use of ground truth perception outputs.

10. The method of claim 9, wherein the perception errors comprise at least one of:

flickering detections; or jumping detections.

11. The method of claim 1, wherein the performance data comprises at least one time series of numerical perception scores indicating perception areas of interest, and wherein the graphical user interface comprises at least a corresponding timeline of numerical perception scores, wherein for each time step the numerical perception score timeline comprises a visual indication of the numerical perception score associated with that time step.

12. The method of claim 11, wherein the time series of numerical perception scores is a time series of hardness scores indicating a measure of difficulty for the perception system at each time step.

13. The method of claim 1, wherein the performance data comprises at least one time series of user-defined scores, and wherein the graphical user interface comprises at least one corresponding custom timeline, wherein, for each time step, the at least one corresponding custom timeline comprises a visual indication of the user-defined score evaluated at that time step.

14. The method of claim 1, wherein one or more of the at least one autonomous driving run is a simulated driving run, and wherein the perception errors comprise simulated perception errors.

15. The method of claim 14, wherein one or more perception error models are used to provide the simulated perception errors to convert a ground-truth simulator state to realistic perception outputs to be provided to a higher-level component of a stack.

16. The method of claim 14, wherein the simulated perception errors are derived based on synthetic sensor data and simulation ground truth, the synthetic sensor data generated in simulation and processed by a perception system of a stack.

17. The method of claim 1, wherein a filter is also applied to the two timelines, based on one or more of driving rules, perception errors, or scene parameters.

18. A computer system for assessing autonomous vehicle performance, the computer system comprising:

at least one memory storing computer-readable instructions; and at least one processor coupled to the at least one memory and configured to execute the computer-readable instructions, which upon execution cause the at least one processor to:

receive performance data of at least one autonomous driving run, the performance data comprising at least one time series of perception errors and at least one time series of driving performance results, wherein the at least one time series of perception errors are generated by a real-time perception system during the at least one autonomous driving run; and generate rendering data for rendering a graphical user interface, the graphical user interface for visualizing the performance data and comprising:

(i) a perception error timeline, and (ii) a driving assessment timeline, wherein the timelines are aligned in time, and divided into multiple time steps of the at least one autonomous driving run, wherein, for each time step: the perception error timeline comprises a visual indication of whether a perception error occurred at that time step, and the driving assessment timeline comprises a visual indication of driving performance at that time step.

19. A non-transitory computer readable medium embodying computer program instructions, the computer program instructions configured so as, when executed on one or more hardware processors, to implement operations comprising:

receiving performance data of at least one autonomous driving run, the performance data comprising at least one time series of perception errors and at least one time series of driving performance results, wherein the at least one time series of perception errors are generated by a real-time perception system during the at least one autonomous driving run; and generating rendering data for rendering a graphical user interface, the graphical user interface for visualizing the performance data and comprising:

(i) a perception error timeline, and (ii) a driving assessment timeline, wherein the timelines are aligned in time, and divided into multiple time steps of the at least one autonomous driving run, wherein, for each time step: the perception error timeline comprises a visual indication of whether a perception error occurred at that time step, and the driving assessment timeline comprises a visual indication of driving performance at that time step.

20. The non-transitory computer readable medium of claim 19, wherein the driving assessment timeline aggregates driving performance across multiple individual driving rules, and wherein the driving assessment timeline is expandable to view respective driving assessment timelines for individual driving rules.

* * * * *